US006185409B1

(12) United States Patent
Threadgill et al.

(10) Patent No.: US 6,185,409 B1
(45) Date of Patent: *Feb. 6, 2001

(54) NETWORK ENGINEERING/SYSTEMS ENGINEERING SYSTEM FOR MOBILE SATELLITE COMMUNICATION SYSTEM

(75) Inventors: Michael E. Threadgill, Annapolis, MD (US); ShihChao Lin, Reston, VA (US)

(73) Assignee: AMSC Subsidiary Corporation, Reston, VA (US)

( * ) Notice: Under 35 U.S.C. 154(b), the term of this patent shall be extended for 0 days.

This patent is subject to a terminal disclaimer.

(21) Appl. No.: 09/007,172

(22) Filed: Jan. 14, 1998

Related U.S. Application Data

(63) Continuation-in-part of application No. 08/931,622, filed on Sep. 16, 1997, which is a continuation of application No. 08/601,749, filed on Feb. 15, 1996, now Pat. No. 5,713,075
(60) Provisional application No. 60/007,804, filed on Nov. 30, 1995.

(51) Int. Cl.[7] .............................. H04B 7/185; H04Q 7/20
(52) U.S. Cl. ........................................ 455/12.1; 455/427
(58) Field of Search .................................. 455/12.1, 430, 455/427

(56) References Cited

U.S. PATENT DOCUMENTS

| | | | |
|---|---|---|---|
| 4,858,225 | * | 8/1989 | DeSantis . |
| 5,526,404 | | 6/1996 | Wiedeman et al. . |
| 5,555,444 | | 9/1996 | Diekelman et al. . |
| 5,586,165 | | 12/1996 | Wiedeman . |
| 5,590,395 | | 12/1996 | Diekelman . |
| 5,594,740 | | 1/1997 | Ladue . |
| 5,594,780 | | 1/1997 | Wiedeman et al. . |
| 5,713,075 | * | 1/1998 | Threadgill et al. .................. 455/427 |
| 5,850,602 | * | 12/1998 | Tisdale et al. ........................ 455/430 |
| 5,926,745 | * | 7/1999 | Threadgill et al. ................ 455/12.1 |

OTHER PUBLICATIONS

Leung, Powell, "Traffic Engineering for Satellite–Mobile Voice Services", IEEE, 1991.*
Sun, Komisarczuk, Coakley, Evans, Traffic management in Satellilite ATM Bridge, Teletraffic Synposium, 11th Performance Engineering in Telecommunications Networks, 1994.*
Ryn, "Modeling and Simulation of Broadband Satellite Newtworks", IEEE Communication Magazine, Jul. 1999.*
"Feederlink Earth Station to Provide Mobile Satellite Services in North America", Robert H. McCauley, et al., American Institute of Aeronautics and Astronautics, Jan./Feb. 1994, pp. 1–9.
"Implementation of a System to Provide Mobile Satellite Services in North America", Gary A. Johanson, et al., presented at International Mobile Satellite Conference '93, Jun. 16–18, 1993.
"Call Control in the AMSC Mobile Satellite Service System", by W. R.H. Tisdale et al., Pre–Publication Review Copy, American Institute of Aeronautics and Astronautics, Mar. 1, 1994, pp. 1–13.

* cited by examiner

Primary Examiner—William Cumming
(74) Attorney, Agent, or Firm—Irah H. Donner; Hale and Dorr LLP

(57) ABSTRACT

A mobile satellite system includes at least one satellite and at least one network engineering/systems engineering (NE/SE) system. The NE/SE system performs at least one of the processes of comparing expected traffic loads with capability and availability of space and ground resources in the mobile satellite system; formulating tactical plans to maximize available resources of the at least one satellite, and producing frequency plans for different geographical regions; performing the processes of defining contingency plans for failure situations, including failure in the at least one satellite or a ground-based equipment outage; configuring the mobile satellite system including logical resources and physical components; and configuring communication paths to external organizations operatively connected to the mobile satellite system.

35 Claims, 48 Drawing Sheets

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2
PRIOR ART

| FES STATISTIC ID | ABH | DAILY & MONTHLY TOTALS | PEAK VALUE | CURRENT VALUE |
|---|---|---|---|---|
| EARTH STATION OPERATING STATE | | | | x |
| EARTH STATION EIRP | x | | x | |
| CALLS IN PROGRESS | x | | x | |
| CALL ARRIVAL RATE | x | | x | |
| TOTAL CALLS PROCESSED | x | x | x | |
| FES-I MESSAGES | x | x | x | |
| GC-I MESSAGES | x | x | x | |
| TOTAL COMPLETED CALLS | x | x | x | |
| TOTAL UNCOMPLETED CALLS | x | x | x | |
| COUNTER CREATION TIME | | | | x |

FIG. 47

| NCC STATISTIC ID | ABH | DAILY TOTALS | PEAK VALUE | CURRENT VALUE |
|---|---|---|---|---|
| MT-C AVERAGE UTILIZATION RATE (PER MT-C CHANNEL) | x | | | |
| MT-C PEAK UTILIZATION RATE (PER MT-C CHANNEL) | x | | x | |
| AVERAGE UTILIZATION (PER CONTROL GROUP) | x | | | |
| PEAK UTILIZATION (PER CONTROL GROUP) | x | | x | |
| FES-I CHANNEL UTILIZATION PERCENT | x | | x | |
| GC-I CHANNEL UTILIZATION PERCENT | x | | x | |
| CURRENT CIRCUIT POOL UTILIZATION | x | | x | |
| CURRENT CALL ARRIVAL RATE | x | | x | |
| CURRENT CALLS IN PROGRESS | x | | x | |
| MTs COMMISSIONED | x | | | x |
| MT ST MESSAGES WITH ERRORS | x | x | x | |
| MT ST MESSAGES | x | x | x | |
| MT SR MESSAGES WITH ERRORS | x | x | x | |
| MT SR MESSAGES | x | x | x | |
| CALLS BLOCKED-FES CHANNEL RESOURCES | x | x | x | |
| CALLS BLOCKED-UNAVAILABLE CIRCUITS | x | x | x | |
| CALLS BLOCKED-INSUFFICIENT POWER | x | x | x | |
| INCOMPLETED CALLS | x | x | | |
| CALLS COMPLETED | x | x | | |
| TOTAL CALLS PROCESSED | x | x | | |

FIG. 48

| GWS STATISTIC ID | ABH | DAILY TOTALS | PEAK VALUE | CURRENT VALUE |
|---|---|---|---|---|
| CALL STATISTICS (OFZ) | | | | |
| INANN | x | x | | |
| INOUT | x | x | | |
| NIN | x | x | | |
| INTONE | x | x | | |
| OUTNWATT | x | x | | |
| INABNM | x | x | | |
| INABNC | x | x | | |
| SWITCH STATISTICS (OFZ2) | | | | |
| OFZNCIM | x | x | | |
| OFZNCIT | x | x | | |
| OFZNCLT | x | x | | |
| OFZNCOF | x | x | | |
| OFZNCON | x | x | | |
| OFZNCOT | x | x | | |
| OFZNCRT | x | x | | |
| OFZNOSC | x | x | | |
| PDLM | x | x | | |
| PSGM | x | x | | |

FIG. 49

| GWS STATISTIC ID | ABH | DAILY TOTALS | PEAK VALUE | CURRENT VALUE |
|---|---|---|---|---|
| PSTN TRUNK (TRK) STATISTICS | | | | |
| INCATOT | x | x | x | |
| PRERATB | x | x | x | |
| NATTEMPT | x | | | |
| NOVFLATB | x | x | x | |
| GLARE | | x | | |
| TRU | x | | | |
| MBU | x | | | |
| CONNECT | x | x | | |
| ANSWER | x | x | | |
| TANDEM | x | x | | |
| INFAIL | x | x | x | |
| OUTFAIL | x | x | x | |
| TRU2WIN | x | | | |
| TOTU | x | | | |

FIG. 50

| GWS STATISTIC ID | ABH | DAILY TOTALS | PEAK VALUE | CURRENT VALUE |
|---|---|---|---|---|
| UNIVERSAL TONE RECEIVER (UTR) STATISTICS | | | | |
| UTRSZRS | x | x | | |
| UTROVFL | x | x | x | |
| UTRQOCC | x | x | | |
| UTRQOVFL | | | x | |
| UTRABAN | x | x | | |
| UTRTRU | x | | x | |
| CONFERENCE FOR 3 PORT (CF3P) STATISTICS | | | | |
| CNFSZRS | x | x | x | |
| CNFOVFL | x | x | x | |
| CNFQOCC | x | x | | |
| CNFQOVFL | | | x | |
| CNFTRU | x | | | |
| CNFSBU | x | | | x |
| CNFMBU | x | | | x |

FIG. 51

BEAM PROVISIONING WINDOW

SATELLITE ID

BEAM ID

SATELLITE BEAM GROUP

BEAM EIRP

LATITUDE--MIN
         MAX

LONGITUDE--MIN
          MAX

DESCRIPTION

COMMENTS

[ COMMIT ]  [ SAVE AS DEFAULT ]  [ CANCEL ]

FIG. 52

NETWORK ENGINEERING/SYSTEMS ENGINEERING SYSTEM FOR MOBILE SATELLITE COMMUNICATION SYSTEM

RELATED APPLICATIONS

This application is a continuation-in-part application from U.S. application (1506-012A) filed Sep. 16, 1997, Ser. No. 08/931,622, entitled "NETWORK ENGINEERING/ SYSTEMS ENGINEERING SYSTEM FOR MOBILE SATELLITE COMMUNICATION SYSTEM," which in turn is a continuation application from U.S. application (1506-012) filed Feb. 15, 1996, Ser. No. 08/601,749 now U.S. Pat. No. 5,713,075, entitled "NETWORK ENGINEERING/SYSTEMS ENGINEERING SYSTEM FOR MOBILE SATELLITE COMMUNICATION SYSTEM," which in turn claims priority from U.S. provisional application filed Nov. 30, 1995, Ser. No. 60/007,804 entitled "NETWORK ENGINEERING AND SYSTEM ENGINEERING SYSTEM", the details of which are incorporated herein by reference.

TECHNICAL FIELD

The present invention relates generally to a provisioning and management tool for managing a mobile satellite communication system, and more particularly, to a management tool for provisioning components in the satellite communication system including a mobile earth terminal satellite communication device. The mobile earth terminal provides voice, data, and facsimile transmission between mobile earth terminals and feederlink earth stations (FESs) that act as gateways to public networks or base stations associated with private networks.

BACKGROUND ART

Wireless technology is not new. The age of electronic communication began with the invention of a practical telegraph in 1844, over 150 years ago. It has been said that the telegraph was a major factor in the explosive development of the Western United States in the mid-1800's.

In 1983, the FCC issued licenses to provide mobile communications in a new frequency hand using a technique called cellular transmission which had been developed by both AT&T and Motorola. The proponents invested over $400 million in the new business before the FCC licensed cellular service. Many people thought that consumers needed mobile communications as much as they needed a second Jaguar automobile. Much to the surprise of everyone the growth rate was phenomenal. An enormous mass market developed for this service.

There are over 500 million users of wireline communications in the world today. By the early part of the next century, wireline will continue to grow, and wireless will be a major factor in telecommunications. According to the U.S. Commerce Department, there are at least 52 million cellular subscribers in the world (23 million in the U.S.). Within five years, experts estimate that there may be 150 million (50 million U.S.) and by 2005 we expect the worldwide total will be 260 million (65 million U.S.).

Cellular service is available in most urban regions, excluding, large, less developed areas. Service is not provided beyond the range of cells at which distances the signals are too weak. Cells typically do not exceed 10 miles in diameter, although super large cells have been created in the Caribbean. The new PCS service, which operates at much higher frequencies, requires even smaller cells, three times as many cells must be built as are required for cellular service. In regions where population density is low, the cost of building and operating transmission facilities may exceed the potential revenues. Wireless is sometimes blocked by terrain even in highly populated regions because the transmission signal arrives at low elevation angles.

Surveys show that customers currently are unhappy with unavailability and call blockage. Because of the low elevation angle transmission, service is sometimes interrupted during transmission or handover from cell to cell. During the peak busy hours, circuits are often blocked by other callers. Subscribers would like to enjoy wireless service all of the time, wherever they are.

Another major problem is that wireless transmission standards differ throughout the world. International travelers ar required to use different telephones when they travel to other regions. Even within the U.S. the new digital cellular service will be based on both time division multiple access (TDMA) and code division multiple access (CDMA) technology. Current plans suggest that digital cellular customers who roam up the East Coast will travel alternatively between systems that use different access methods.

Most of the world's telephone service is concentrated in the industrialized world. The 800 million people in industrialized countries have access to 400 million telephone lines, but 5 billion people in developing countries have access to only 200 million telephone lines. In Asia, more than 3 billion people have only 75 million telephone lines, and in Africa, with 500 million people, there is only one telephone per 1000 population.

The cost of closing the gap in developing countries has been estimated to be $3 trillion. Space based services are a faster and less costly solution. Large regions that are not served today could be economically served in the future with satellites. New systems hold the potential for extending service into regions that have been inaccessible or uneconomical to serve because of low population density or weak economic conditions.

Even in affluent, densely populated countries like Japan nd Germany, mountainous conditions prevent full coverage. Japanese cellular service operators expect that half of the land area will not be covered by terrestrial wireless. We are on the threshold of being able to provide universal, affordable wireless service throughout the world.

Wireless service is more expensive than wireline service, especially in urban regions. From a service provider perspective, the cost is higher because the call routing, call maintenance and billing is more complex. From a subscriber perspective, wireless telephone service adds great value. Wireless telephones allow mobile workers to talk while traveling. Mobile calls provide greater flexibility and permit communications in situations in which they were previously impossible.

Today, cellular systems offer service with a wide range of tariffs. typically, the systems charge a monthly service fee of about $30 plus an additional charge based on airtime. For local services, the airtime rates vary between $0.10 to $0.90 per minute, depending on the region of the country or the world. Often, service providers offer cellular telephones at a discount but require a one year service contract, payment for the telephone equipment being embedded within the service price structure.

Currently, satellite service is available worldwide as an alternative to cellular service, but the terminal cost and service rates are very high. Inmarsat signatories offer service for airtime rates ranging from $5 to $15 per minute. "Portable" terminals that cost at least $15,000 and have a mass of 10 kilograms (22 pounds) can be lugged on trips. Terrestrial cellular has 1000 times more customers at service rates which are a factor of ten lower than present space based systems. The prices are very elastic.

Manufacturers of handsets and satellite systems recognized that cellular type communications from space could be much less expensive in the future than it is today. Several companies have determined that space based wireless service can be provided at service rates which are affordable by a mass market.

The primary consideration for business success is having a cost effective product which customers desire. This means balancing the service charges to own a personal telephone as well as the air time rates with the needs of the subscriber. Cost must also be kept affordable and economical compared to alternatives. However, each system must strike a balance between low cost and high quality. As a business, the service and distribution functions must provide an outlet to the ultimate customer, the consumer.

In the mid 1960's we had correctly determined that the best orbit for fixed satellite service was a geostationary orbit. This choice was logical because a stationary orbit permitted satellites to appear fixed in the sky. Large, high gain ground terminals could be positioned to ensure that the transmission path always would be clear. Although large, the antennas had no need to track, since the satellites appeared motionless to it. Only three or four satellites were needed to view most of the globe (excepting the polar regions). Unfortunately, the distance to Geostationary Earth Orbit (GEO) is great (about 23,000 miles) and the propagation time delay produces overtalking and confusion.

During the 1980's, conditions developed for a major change in the satellite communications paradigm: Orbiting satellites closer to the Earth would permit more powerful transmission with reasonable sized satellites and antennas. In addition, inclined orbits could ensure high elevation angles to minimize blockage by buildings, and other obstacles. The microelectronics for a ground station had become so compact that an affordable, light, hand held terminal could be built for satellite service. The lower power, application specific integrated circuit (ASIC) was built with GaAs, High density Bipolar Transistors (HBT) and high electron mobility power transistors (HEMPT's).

A conceptual view of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCS) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. Then the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

NET Radio (NR). This service provides point-to-multipoint circuit switched connections between mobile terminal subscriber stations and a central base station. Mobile users are able to listen to two-way conversations and to transmit using a push-to-talk mode of operation.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area.

Some of the key performance parameters of the satellite are listed in FIG. 2.

The satellite network system interfaces to a number of entities which are required to access it for various purposes. FIG. 3 is a context diagram of the satellite network system conceptually illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC): The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC: The satellite network system interfaces with the satellites located therein via the NOC for a variety of operational reasons including message delivery and coordination.

Independent NOCs: The satellite network system interfaces with outside organizations which lease resources on satellite network satellites and which are responsible for managing and allocating these resources in a manner suited to their own needs.

Other System NOCs: This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System: This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering: This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering: This entity engineers the subsystems, equipment and software which is needed to expand capacity to meet increases in traffic demands and to provide new features and services which become marketable to subscribers.

The satellite network system comprises a number of system elements and their interconnecting communications links as illustrated conceptually in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC. The NOC manages and controls the resources of the satellite network system and carries out the administrative functions associated with the management of the total satellite network system. The NOC communicates with the various internal and external entities via a local area network (LAN)/wide area network (WAN) based satellite network Internetwork and dial-up lines.

NCC. The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES. The FES supports communications links between METs, the PSTN, private networks, and other METs. Once a channel is established with an MET, call completion and service feature management is accomplished via In-Band signaling over the communication channel. Two types of FESs have been defined for the satellite network system; Gateway FESs and Base FESs. Gateway FESs provide MTS and MTCRS services. Base FESs provide MRS and NR services.

MET. The MET provides the mobile user access to the communications channels and services provided by the satellite network system. A range of terminal types has been defined for the satellite network system.

RMS. The RMS monitors L-band RF spectrum and transmission performance in specific L-band beams. An RMS is nominally located in each L-band beam. Each RMS interfaces with the NOC via either a satellite or terrestrial link.

STS. The STS provides an L-band network access capability to support FES commissioning tests and network service diagnostic tests. The STS is collocated with, and interfaced to, the NOC.

Communications channels transport voice transmissions between METs and FESs via the satellite. Connectivity for MET-to-MET calls is accomplished by double hopping the communications channels via specially equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, DC (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic conceptual block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MET Access Security Key (ASK) storage equipment. The Processing Equipment consists of one or more digital processors that provide overall NCC control, NCS call processing, network access processing and internetwork communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MET ASK storage Equipment provides a physically secure facility for protecting and distributing MET Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS(R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services. Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

There is a general need to manage and provision the various components in the mobile satellite communication system in an efficient manner. Accordingly, it is desirable to develop plans and perform analysis in support of the satellite communication system as well. It is also desirable to analyze the requirements of the satellite communication system.

It is also desirable to reconcile expected traffic loads with the capability and availability of space and ground resources to produce frequency plans for the different beams within the system. Further, it is desirable to define contingency plans for failure situations.

It is also beneficial and desirable to efficiently engineer the subsystems, equipment and software which are needed to expand capacity to meet increases in traffic demands and to provide new features and services which become marketable to subscribers.

SUMMARY OF THE INVENTION

It is a feature and advantage of the satellite communication system to manage and provision the various components in the mobile satellite communication system in an efficient manner.

It is another feature and advantage of the present invention to develop plans and perform analysis in support of the satellite communication system as well.

It is another feature and advantage of the present invention to analyze the requirements of the satellite communication system.

It is another feature and advantage of the present invention to reconcile expected traffic loads with the capability and availability of space and ground resources to produce frequency plans for the different beams within the system.

It is another feature and advantage of the present invention to define contingency plans for failure situations.

It is another feature and advantage of the present invention to efficiently engineer the subsystems, equipment and software which are needed to expand capacity to meet increases in traffic demands and to provide new features and services which become marketable to subscribers.

The present invention is based, in part, on the identification of the problem of efficient management of the satellite communication system. In accordance with the features of the present invention, various processes are introduced for efficient management. To accomplish the above, we have discovered that the following factors/features must be considered/incorporated to properly manage the satellite communication system:

1. The NE/SE system needs to compare expected traffic loads with the capability and availability of space and ground resources.
2. NE/SE aids in formulating tactical plans to maximize the available resources of the MSS satellite.
3. NE/SE needs to allow a network engineer to produce frequency plans for different geographical regions and to define circuit pools for different groups of Mobile Terminal (MT) users.
4. Contingency plans for failure situations, such as the loss of a satellite or a ground-based equipment outage need to be provided.
5. As a part of the configuration activity, NE/SE needs to perform consistency checks on the data sent to Customer Management Information Systems (CMIS) and CGS.
6. NE/SE is also responsible for configuring the communication paths to External Organizations (EO).
7. NE/SE also tracks the logistics of network additions via generation of work orders.

To achieve these and other features and advantages of the present invention, a network engineering/systems engineering (NE/SE) system is provided in the mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, diplexer, scrambler and frame formatter for at least one of voice, fax, and data. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

In one embodiment of the invention, a mobile satellite system includes a satellite communication switching office having a satellite antenna for receiving/transmitting a satellite message via a satellite from/to a vehicle using a mobile communication system, a satellite interface system, and a central controller receiving/transmitting the satellite message from/to the satellite communication switching office issued from the vehicle via the satellite and the satellite interface system. The mobile satellite system is responsively connected to the mobile communication system. The mobile satellite system also includes a network operations controller (NOC) managing and controlling the resources of the mobile satellite system and performing administrative functions associated with the management of the mobile satellite system, a feederlink earth station (FES) managing communications links between mobile earth terminals (METs), a public switched telephone network (PSTN), and private networks once a communication channel is established with a MET, and performing call completion and service feature management via signaling over the communication channel, and a network control center (NCC), operatively connected to the FES and the NOC. The NCC manages real time allocation of communication channels between the METs and the FES, and available communication channels are held in circuit pools managed by at least one Group Controller (GC) within the NCC. The NCC also communicates with the NOC via a satellite network Internetwork, and communicates with the FES via Ku-to-Ku band interstation signaling channels or terrestrial links, and communicates with the METs via Ku-to-L band signaling channels.

The mobile satellite system includes a network engineering/systems engineering (NE/SE) system. The NE/SE performs the processes of comparing expected traffic loads with capability and availability of space and ground resources in the mobile satellite system, formulating tactical plans to maximize available resources of the satellite, and producing frequency plans for different geographical regions and defining circuit pools for different groups of users of the METs. The NE/SE also performs the processes of configuring the mobile satellite system including logical resources and physical components generating logical and physical configurations, the logical and physical configurations designed to expand the mobile satellite system capacity for increases in traffic demand, while also supporting new features and services of the mobile satellite system. The NE/SE further configures communication paths to external organizations operatively connected to the mobile satellite system, and tracks logistics of network additions to the mobile satellite system via generation of work orders.

In another embodiment of the invention, a method for engineering the mobile satellite system is provided. The method includes the steps of comparing expected traffic loads with capability and availability of space and ground resources in the mobile satellite system, formulating tactical plans to maximize available resources of the satellite, and producing frequency plans for different geographical regions and defining circuit pools for different groups of users of the METs. The method also includes the steps of configuring the mobile satellite system including logical resources and physical components generating logical and physical configurations, the logical and physical configurations designed to expand the mobile satellite system capacity for increases in traffic demand, while also supporting new features and services of the mobile satellite system, configuring communication paths to external organizations operatively connected to the mobile satellite system, and tracking logistics of network additions to the mobile satellite system via generation of work orders, including collecting and reporting traffic and performance data for long term planning.

In another embodiment of the invention, a mobile satellite system includes at least one satellite and at least one network engineering/systems engineering (NE/SE) system. The NE/SE system performs at least one of the processes of comparing expected traffic loads with capability and availability of space and ground resources in the mobile satellite system; formulating tactical plans to maximize available resources of the at least one satellite, and producing frequency plans for different geographical regions; performing the processes of defining contingency plans for failure situations, including failure in the at least one satellite or a ground-based equipment outage; configuring the mobile satellite system including logical resources and physical components; and configuring communication paths to external organizations operatively connected to the mobile satellite system.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIGS. 47–51 comprise the CGS statistics and reflect the method(s) of calculation required for each statistic; and FIG. 52 is an illustration of a sample provisioning screen.

BEST MODE FOR CARRYING OUT THE INVENTION

Figure 1:
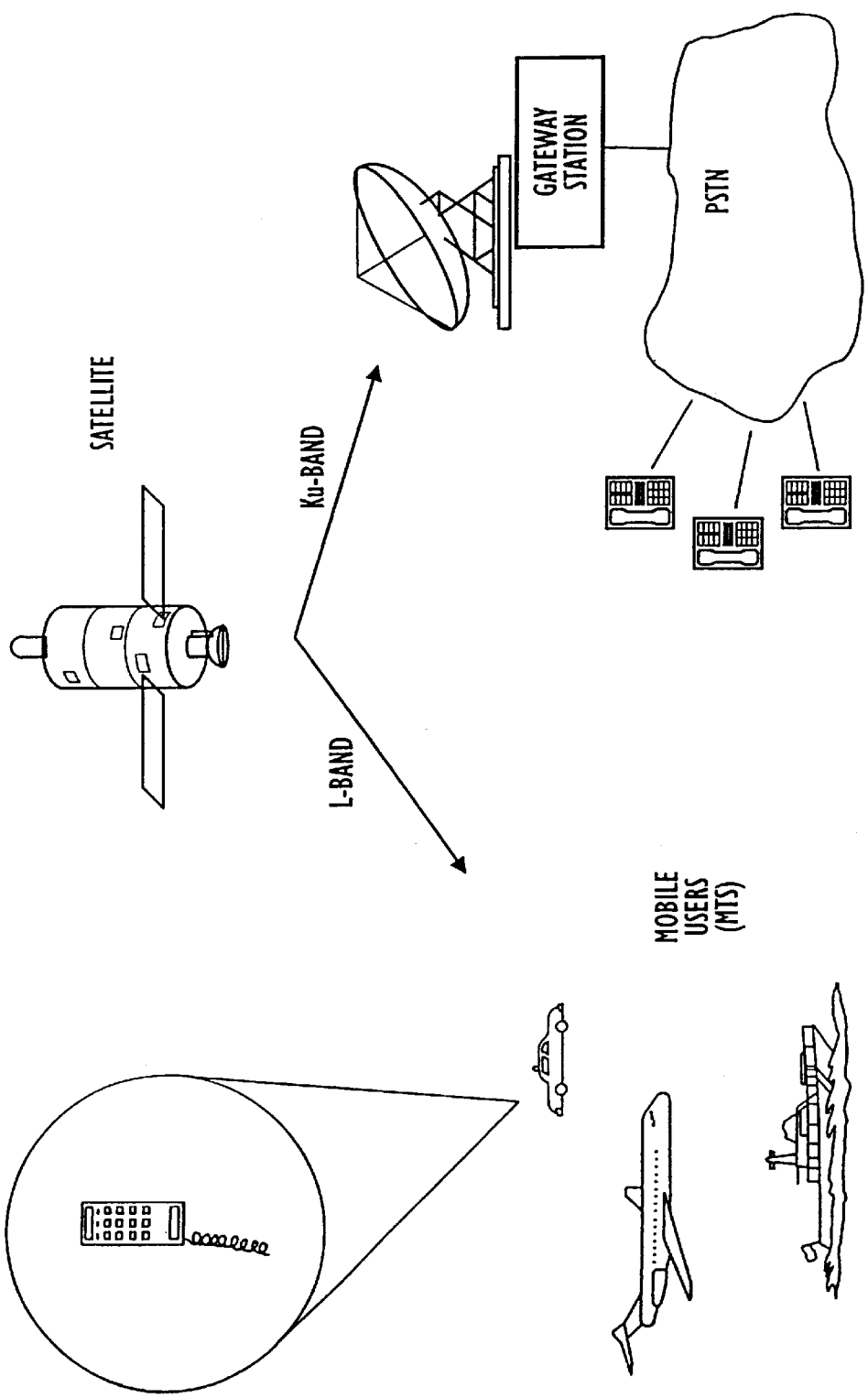
FIG. 1 is a diagram illustrating an overview of the satellite network system.
Figure 3:
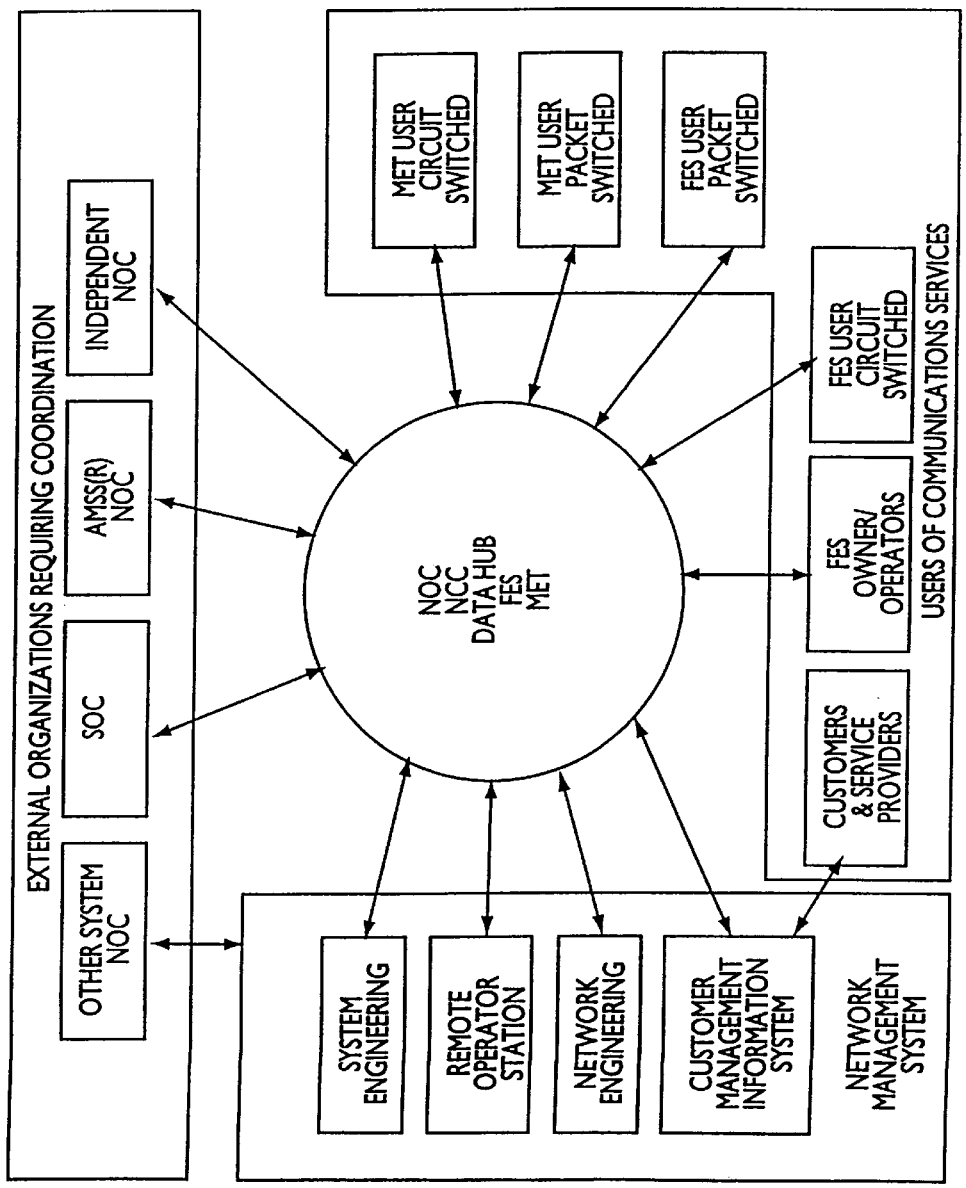
FIG. 3 is a diagram of the satellite network system illustrating components and respective interfaces.
Figure 4:
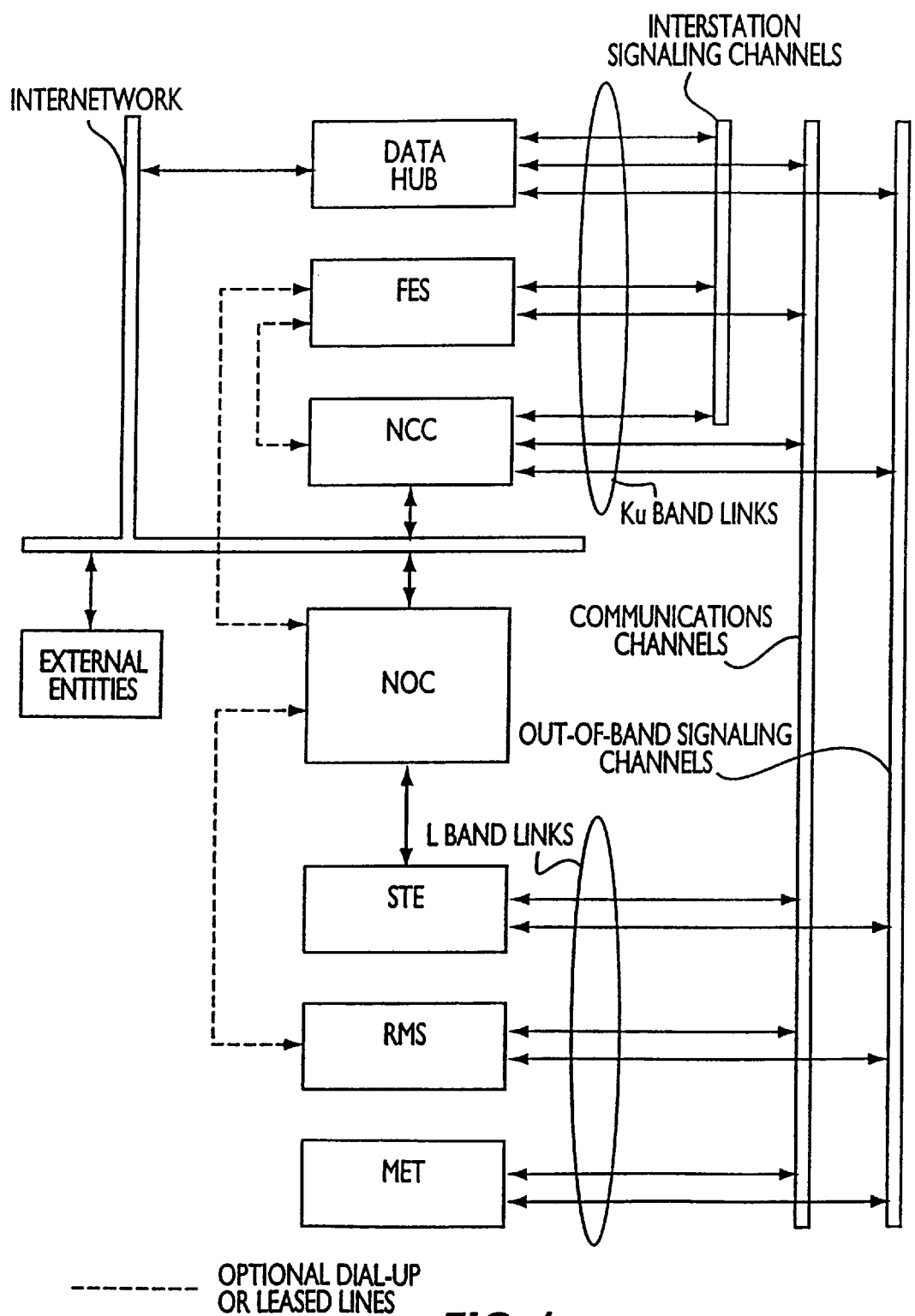
FIG. 4 is a diagram of a satellite network system illustrating a number of system elements and their interconnecting communications links.
Figure 5:
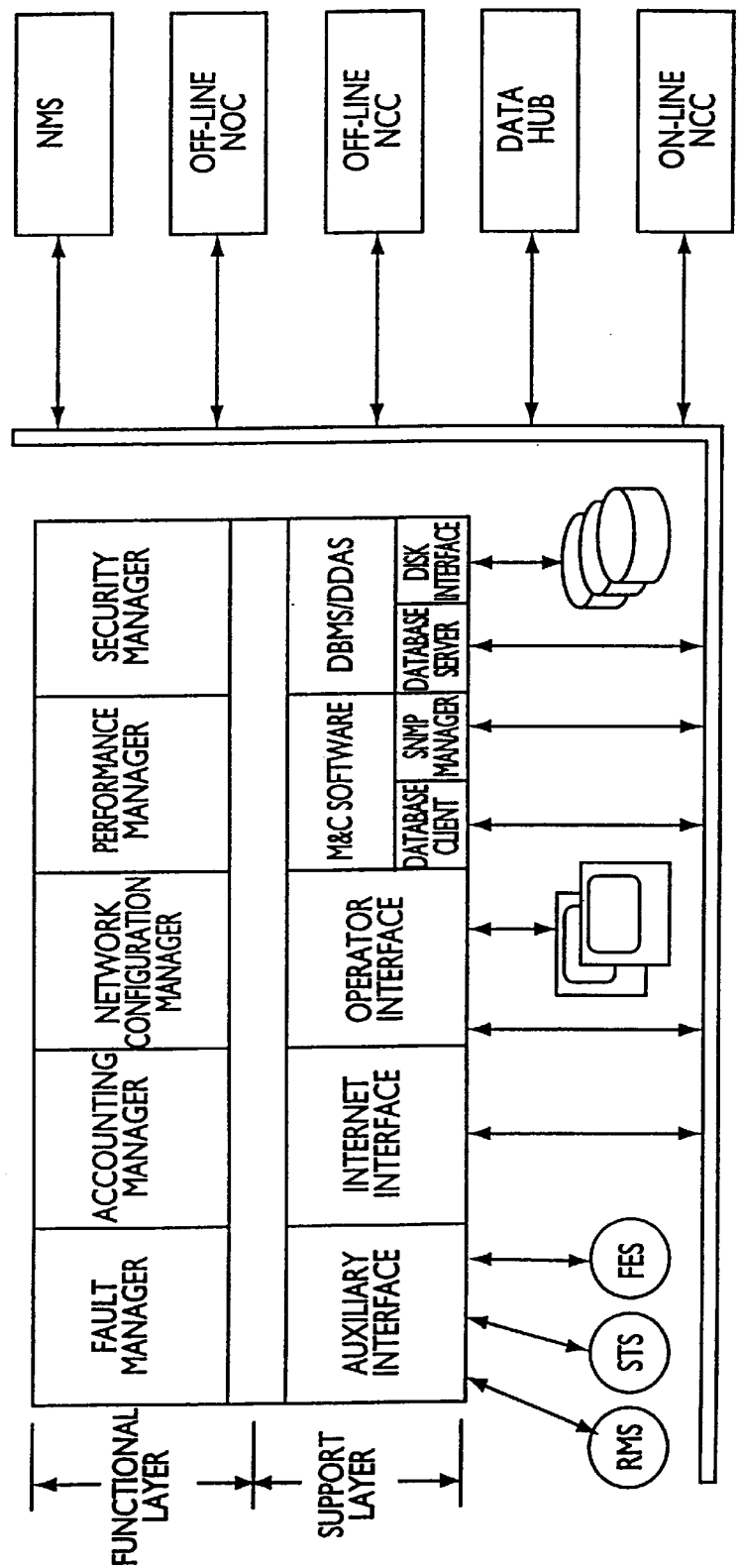
FIG. 5 is a basic block diagram of the NOC and its interfaces.

Digital speech compression means that each satellite can serve a much larger number of customers, substantially reducing the cost of the space segment. Unfortunately compression introduces 80 to 100 milliseconds of additional delay, rendering GEO systems almost unusable due to overtalking.

Omnidirectional antennas are also essential for personal telephones because the mobile users move. Accordingly, the GEO satellite loses its motionless advantage, and the satellites might just as well move also. Improved battery technology for higher power density meant lower mass. Satellites are able to transmit over obstacles from above the user.

There are generally three classes of service that can be identified:

1. Data Transmission And Messaging From Very Small, Inexpensive Satellites. Sometimes these are called the Little low earth orbits (LEO's). These systems are the space equivalent of paging systems. Examples include Orbcomm, Starsys, and VITA. The GEO predecessor was GEOSTAR, which continues to operate using small packages on Spacenet 3 and GSTAR. Orbcomm has already launched experimental satellites. The messaging data rates range from 100 to 4800 bits per second (bps).

2. Voice And Data Communications From the Big LEO's. They include Iridium, Globalstar, Odyssey, and Inmarsat P.

Motorola expects to launch experimental satellites next year. All of these systems claim that they will be in service by the year 2000.

3. Wideband Data Transmission. This is the extension of the Global Information Initiative (GII). Systems proposed include Teledesic, Spaceway, and CyberStar. Several other counties and companies are working on systems of this type. These systems will offer computer to computer links and video conferencing. Higher data rates (160×9.6 kbps) 1.544 Mbps (T-1 carrier or higher).

Frequency spectrum was originally st aside for Maritime Mobile Satellite Service (MSS). The original set of bands was established with Inmarsat service in mind. These bands are in the region of 1.6 and 1.5 GHz. More recently, additional bands have been designated for Aeronautical MSS and Land MSS. These bands are also used for domestic service in the U.S., Canada, Mexico, Australia, and Japan.

The spectrum that was allocated for Radio Determination Satellite Service at WARC-88 was made coprimary with MSS at WARC-92. The U.S. FCC has allocated the top 5 MHz of the 1.6 GHz band for TDMA and the lower 11.5 MHZ for CDMA. The lower part of the 1.6 GHz band has also been used by Russian Glonass Navigation system and the Radio Astronomy service won a primary allocation for the lower part as well.

Inmarsat P has campaigned for additional service link spectrum in the new Personal Communication Service band which is also called the Future Personal Land Mobile Telephone Service (FPLMTS). Many of the developing countries and some developed countries use the 2.0/2.2 GHz bands for terrestrial services including troposcatter and microwave links.

In addition to the question of moving service link displacement dates, special provision must be made for feeder links. This could be a more important issue than the provision of communications services, since a wider bandwidth is required for the backhaul to the Land Earth Stations. Generally, wider bandwidths are available at higher frequencies. Currently, there is major competition for spectrum all the way up to 20/30 GHz (Ka bands).

Some of the satellite companies would like to operate in lower bands because the lower bands are less susceptible to rain attenuation and weather conditions.

These bands are currently used by a number of critical services, including the Aeronautical Services. The International Civil Aviation Organization (ICAO) and the FAA use the C-band spectrum near 5 GHz for both communications and wind shear radar. Several of the Big LEO's, including Globalstar and Inmarsat P also want to use these bands.

Figure 6:
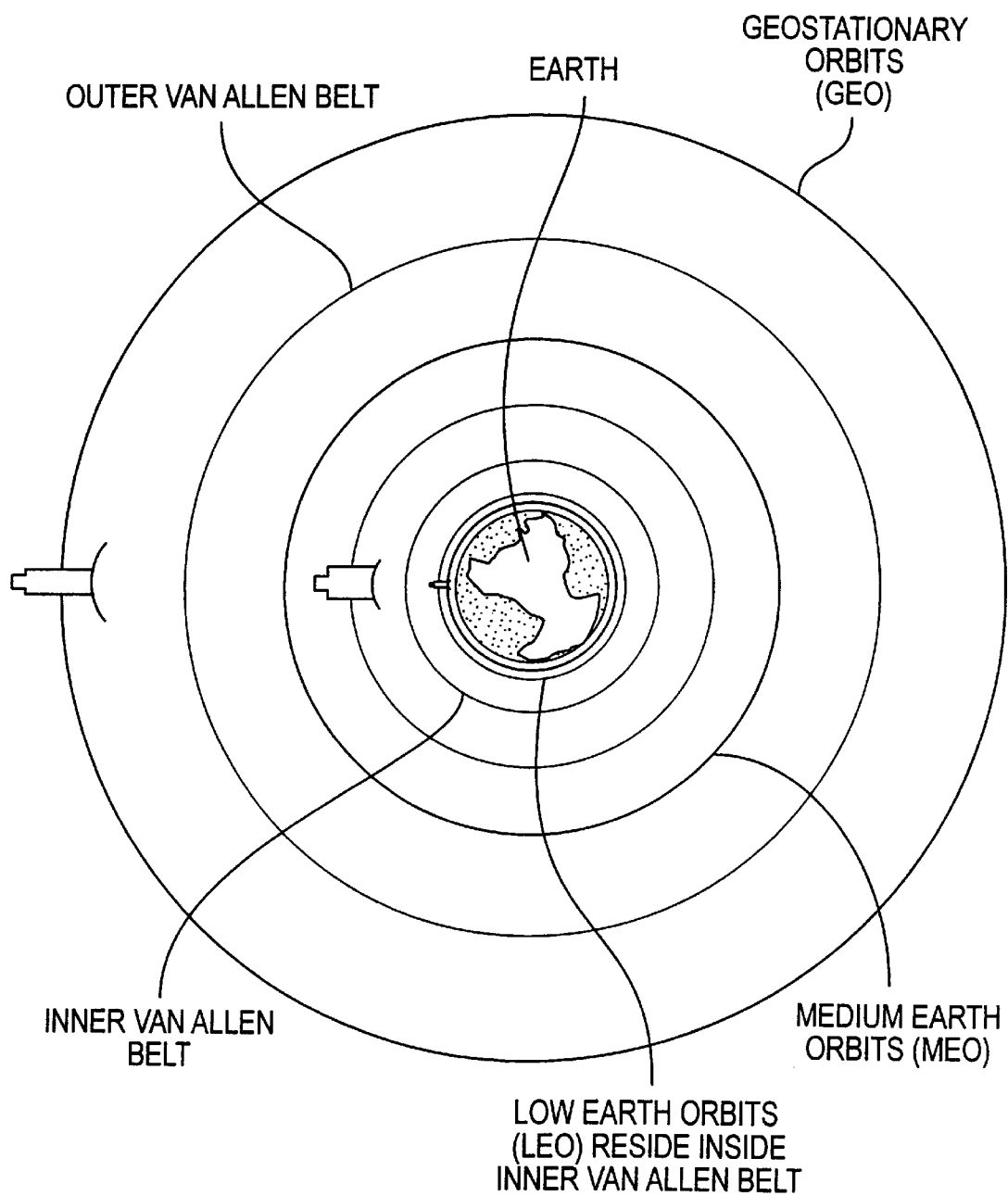
FIG. 6 shows the relative altitude of the orbits for various satellite systems.

Some of the systems would employ the use of reverse band transmissions for feeder links. This technique involves paired bands by which the Earth to space transmissions are used in the space to Earth direction and vice versa. FIG. 6 shows the relative altitude of the orbits. GEO satellites are located in orbits farthest from the Earth. Time delay is 250 msec or more plus processing delays.

Most of the non-geostationary satellites are located in LEO orbits, between the Earth's atmosphere and the inner Van Allen Belt. The inner belt contains trapped particles which have been ejected from the sun. The particles in the inner belt are high intensity, high energy electrons which are dangerous to electronic components. Collisions with satellites produce X-rays and additional energetic electrons. Shielding within the belt is not practical and satellites in this region would survive only for a few months.

Medium earth orbit (MEO) satellites take advantage of gap between the inner and outer Van Allen belts and orbit satellites in inclined orbits. This region enables service without encountering the extremely dangerous radiation levels within the Van Allen belts. Although the radiation level is about twice as intense as that for GEO, the MEO satellite can be protected by selective shielding and use of hardened electronic components.

American Mobile Satellite Corporation (AMSC)

Figure 7:
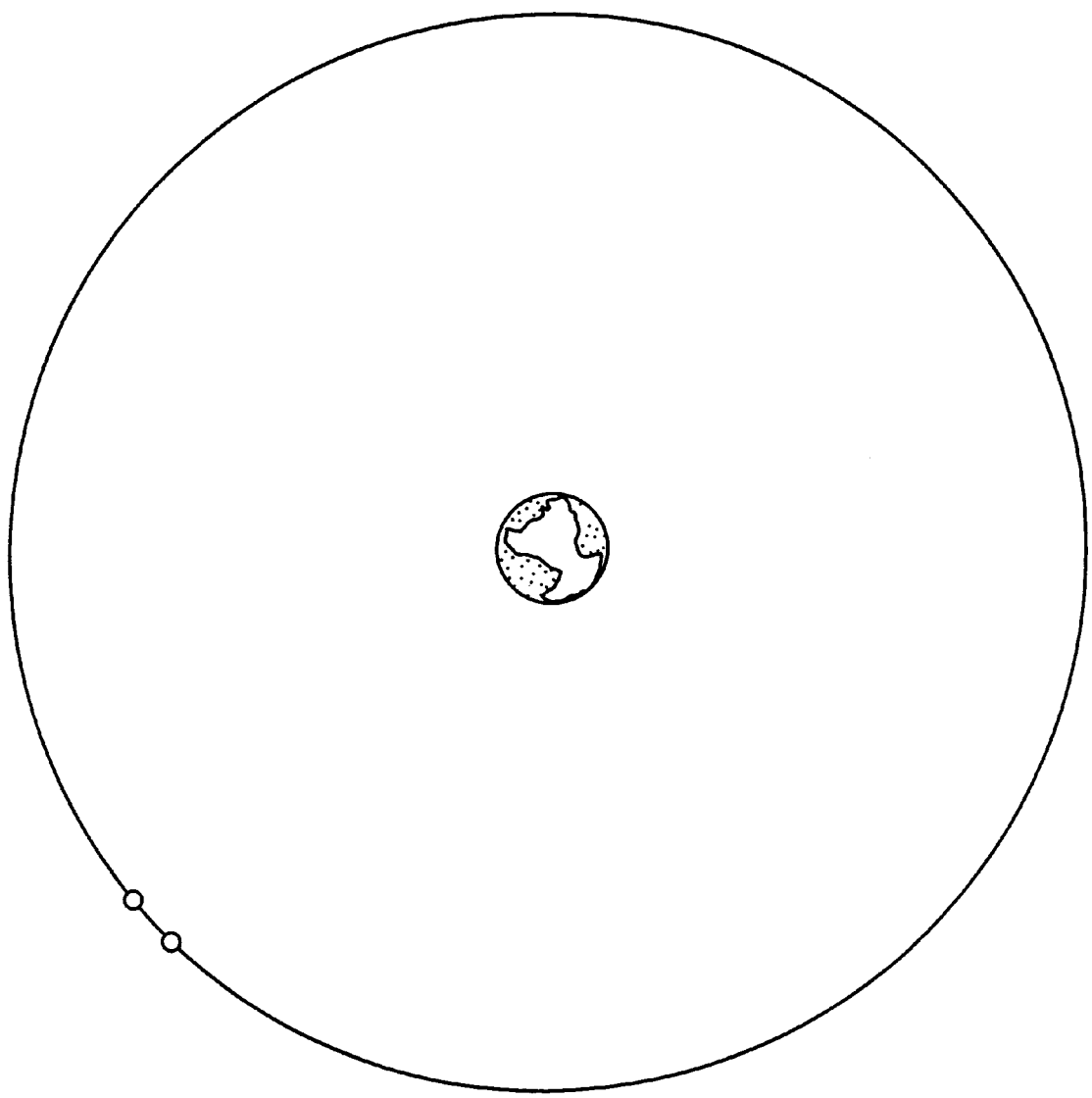
FIG. 7 is an illustration of the Geostationary Earth Orbit (GEO) satellite system for American Mobile Satellite Corp. (AMSC) designed to service vehicles with transportable terminals.

The race to provide lower cost, space based mobile communications started with the U.S. domestic proposals to the FCC by Skylink and MOBILSAT which merged with other proponents into the consortium which is called American Mobile Satellite Corp. (AMSC). This GEO system, illustrated in FIG. 7, is designed to service vehicles with transportable terminals. The satellite antennas are 5 to 6 meters in diameter. Each satellite can provide 1900 circuits.

The system is designed to provide domestic service to the U.S. and Canada. MSAT uses the existing spectrum which is shared with Inmarsat. Other countries are also using this spectrum for domestic services. The constellation includes two GEO satellites, one for AMSC and one for Telsat Mobile Inc. of Canada which is also developing a comparable service. The satellite inclination is approximately 0°, having an altitude of approximately 35,000 km. Two ground stations or control stations are provided. The access method to the system is frequency division multiple access (FDMA). The communication spectrum is approximately 1.6/1.5 GHz, the feeder links are 13/11 GHz, and special features include service to land mobile vehicles.

Several other systems are designed around the goal to provide a desirable, cost effective service from GEO, as well. These include the Asi-African Satellite Corp. (ASC) and the ASEAN Cellular System called ACeS. China and Singapore Telecom are proceeding with development of a GEO system called Asia Pacific Mobile Telephone (APMT).

These GEO systems are planned to provide service to hand held terminals and will require very large satellite antennas, which could be 20 meters in diameter or larger. Each satellite would be required to provide hundreds of transponders. Separate antennas would be desirable for the satellite mobile link receive and transmit functions, but this may be impractical given such large aperture antennas. If a single, large antenna is used there will be the risk of passive intermodulation products.

Orbcomm

Figure 8:
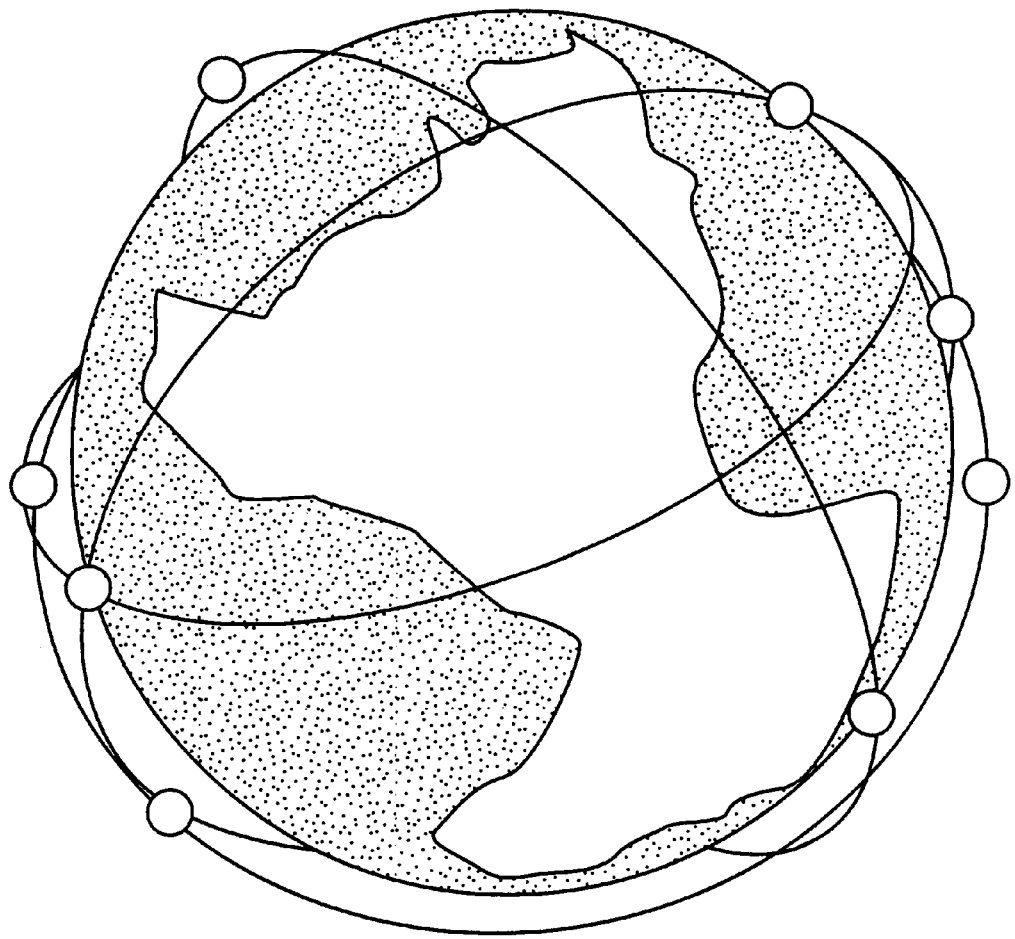
FIG. 8 is an illustration of a Low Earth Orbit (LEO) satellite system for Orbcomm designed to relay messages throughout the world by means of on board processing.

Orbcomm is one of the major players among the little LEO's and has launched two satellites. The satellite configuration for Orbcomm is illustrated in FIG. 8. This system is planned to provide real time messaging at data rates of 2400 bps from user to satellite and up to 4800 bps back to the user. The satellites are designed to relay messages throughout the world by means of on board processing.

The sponsers of the Orbcomm program include OSC/Teleglobe. The satellite constellation includes two satellites in four orbit planes. The satellite inclination is 70° (2) 45° (24). The LEO altitude is approximately 750 km, and includes approximately four ground stations located in the United States. The communication access method is TDMA with a communication spectrum of approximately 137.5/150.0 MHz, and feeder link spectrum of 137.5/150.0 MHz.

Iridium

Iridium was one of the earliest systems to consider voice communications from non-geostationary orbits. Much of the exploration and optimization of space based mobile communications services has taken Iridium into consideration. Iridium is designed to provide global communications by means of state of the art electronics. The architecture reflects the need to network LEO communications in space.

Because the satellites operate from relatively low altitude (460 statute miles), each satellite can only observe about 2% of the Earth's surface at a given time. Consequently 66 satellites are needed to provide the service. The satellites therefore are frequently out of contact with land facilities which could carry transmissions into the terrestrial wireline infrastructure. Iridium attempts to overcome this obstacle by passing communications between satellites until a land Earth station can make the terrestrial connection. This architecture provides a space network which links the entire Iridium system to the Public Switched Telephone Networks (PSTNs).

Figure 9:
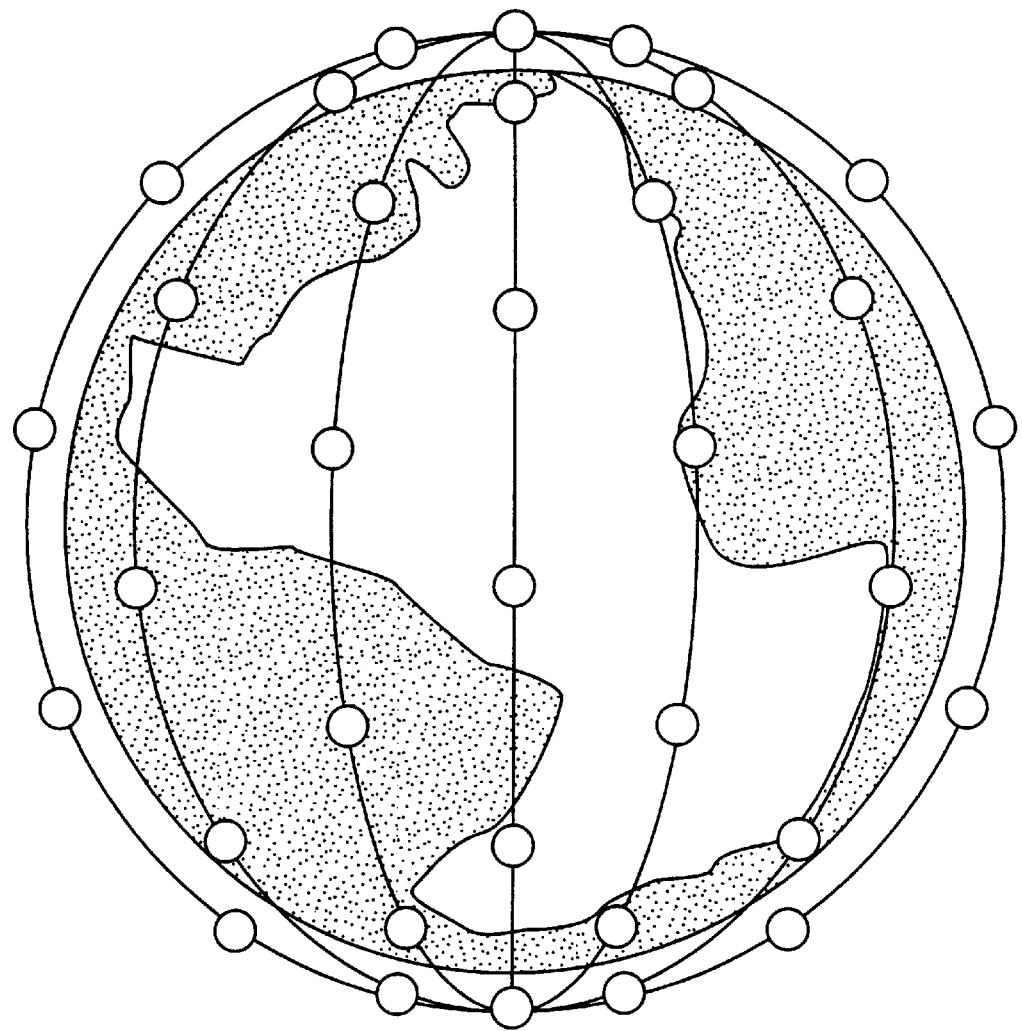
FIG. 9 is an illustration of a Low Earth Orbit (LEO) satellite system for Iridium designed to pass communications between satellites until a land earth station can make the necessary terrestrial connection, and provides a space network which links the entire Iridium system to the Public Switched Telephone Networks (PSTN)

As illustrated in FIG. 9, each satellite projects 48 beams to the Earth, and the satellites provide very high link margins. The system is designed so that one satellite beam always provides service to a given spot on the Earth. Several satellites are available to provide service in more northerly locations, but only one satellite is used. Because the satellites orbit at the low altitude, the elevation angles can be as low as 10 degrees, and the average elevation angle is about 28 degrees. These motion of 15 degrees and 35 degrees per minute.

The main sponsor of the Iridium project is Motorola. The satellite constellation includes 66 satellites in six orbit planes. The satellite inclination is approximately 90°, and the LEO altitude is approximately 740 km. Approximately twenty ground stations are used to control and/or administer the Iridium project. The communication access method is TDMA, and the communication spectrum is approximately 1616 to 1626.5 MHz with feeder links of approximately 20/30 GHz. Special features of Iridium include time division duplex transmission, and cross-links for global networking.

Globalstar

Figure 10:
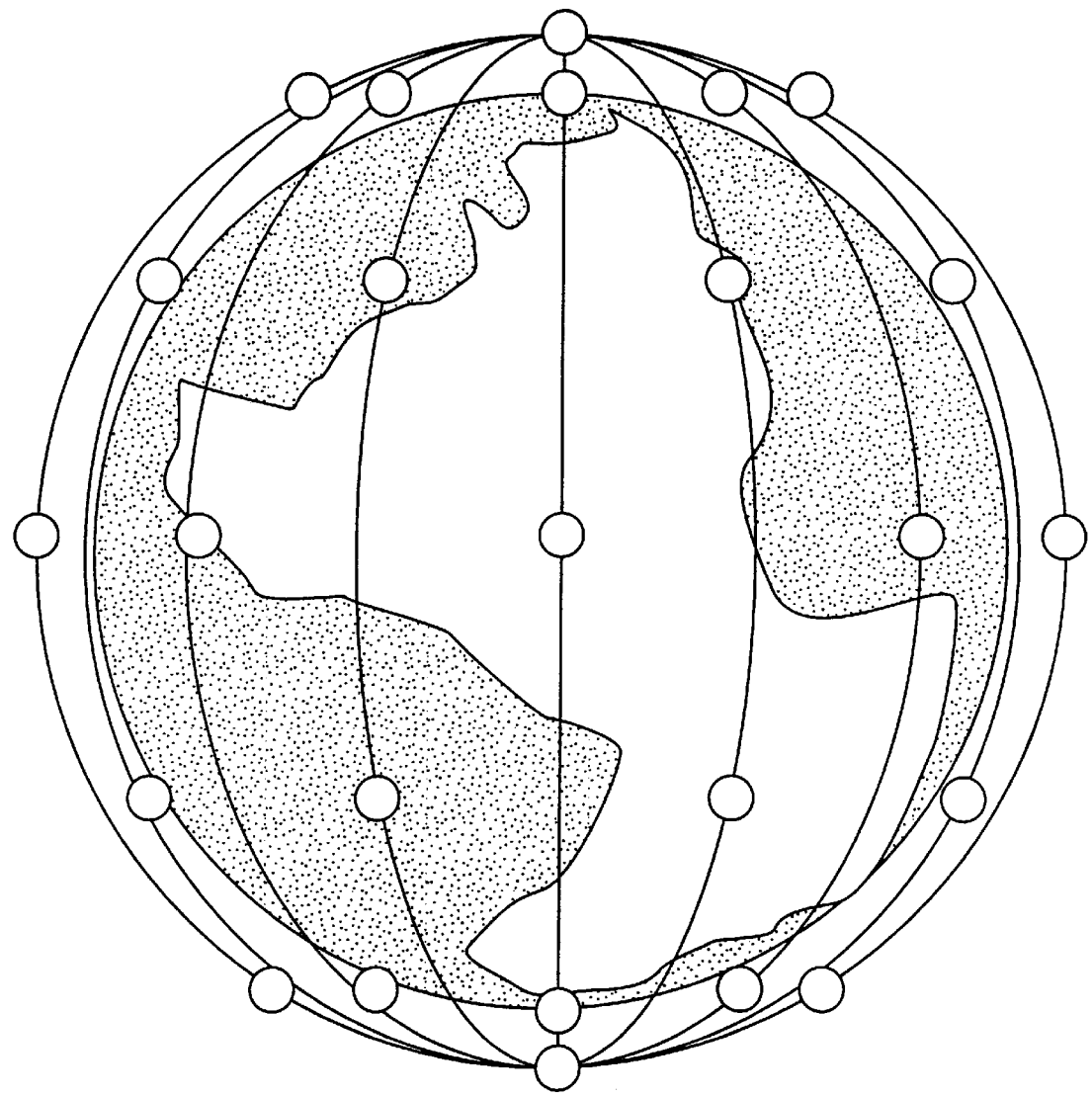
FIG. 10 is an illustration of a Low Earth Orbit (LEO) satellite system for Globalstar that does not use satellite cross links, uses CDMA communication protocol, and does not process signals on board.

FIG. 10 is an illustration of a Low Earth Orbit (LEO) satellite system for Globalstar that does not use satellite cross links, uses CDMA communication protocol, and does not process signals on board. The Globalstar satellite system is similar to Iridium. The satellites operate at a higher altitude (about 830 statute miles), and can observe as much as 5% of the surface of the Earth at a time. Consequently, service can be provided by using a somewhat smaller number of satellites (i.e., approximately 48). Each satellite is simpler than the Iridium satellites, since Globalstar does not use satellite cross links. The system uses CDMA, but the satellites do not process the signals on board. This "bent pipe" transponder approach keeps complexity low. Each satellite projects 16 beams to the Earth.

Globalstar employs spatial diversity by transmitting signals through two satellites. The Qualcomm "stereo transmission" technique reduces the amount of power required for transmission. Each handset communicates through two satellites. The two CDMA signals are combined in each handset using standard Rake receivers (which add the two CDMA signals constructively). This technique provides the most robust service when two satellites are available. The double path provides a "soft" handover from beam to beam and satellite to satellite as the constellation of satellites moves overhead.

The proponents of the Globalstar satellite system include Loral and Qualcomm. The satellite constellation includes 48 satellites in 6 orbit planes. The inclination for the satellite is approximately 47°, with a LEO altitude of approximately 1390 km. The number of ground stations are approximately 90 to 200. The communication access method for Globalstar is CDMA, with a communication spectrum of approximately 1.6/2.5 GHz, and feeder links of approximately 5/7 GHz. Special features of the Globalstar satellite system include diversity service using "stereo" transmission.

Odyssey

Figure 11:
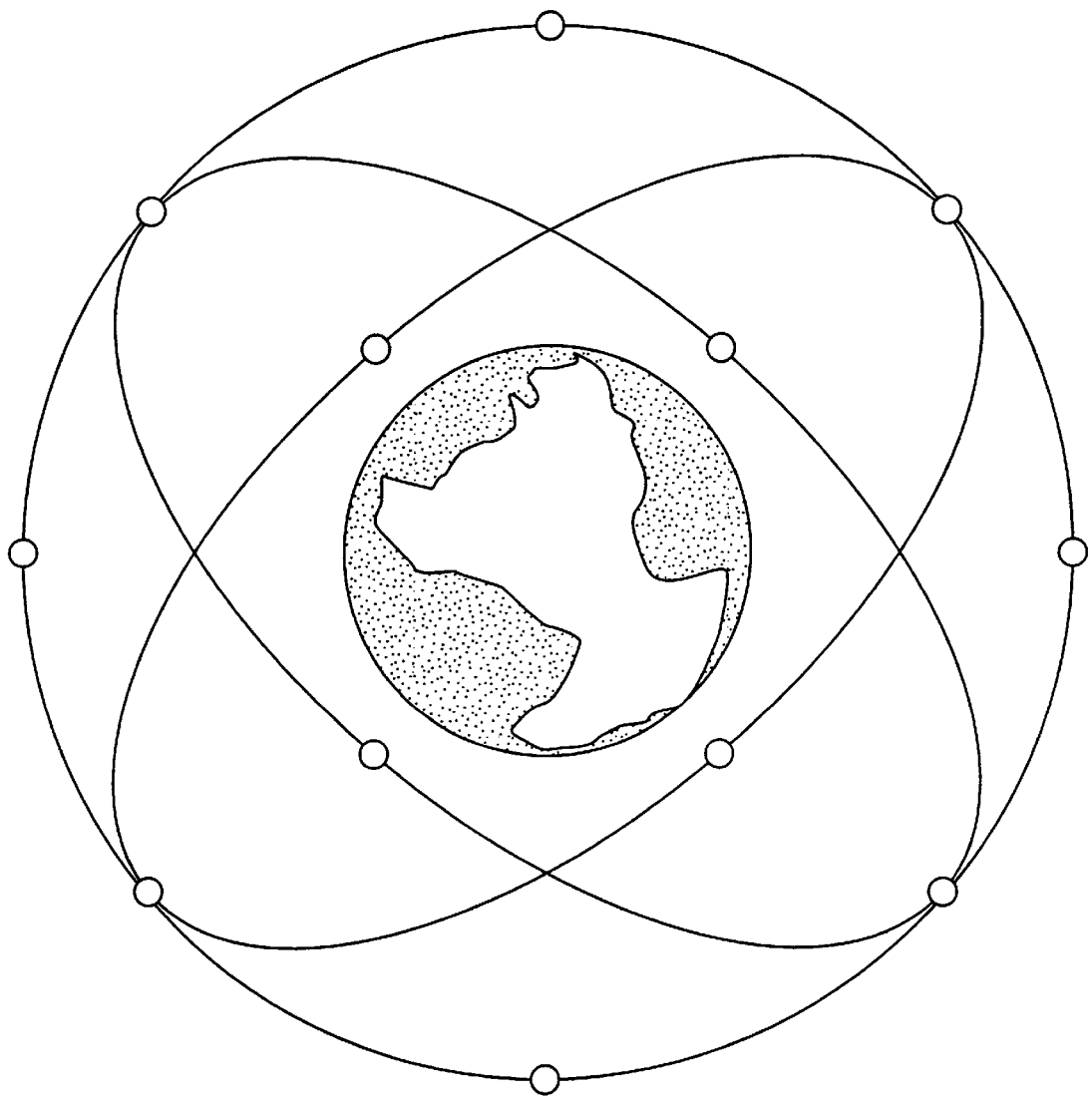
FIG. 11 is an illustration of a Medium Earth Orbit (MEO) satellite system for Odyssey with satellites operating inside the Van Allen Belts.

FIG. 11 is an illustration of a Medium Earth Orbit (MEO) satellite system for Odyssey with satellites operating inside the Van Allen Belts. Odyssey employs orbiting satellites in Medium Earth Orbit or Intermediate Circular Orbits (ICO) for mobile satellite service. The Odyssey designers recognized that a cost effective system which would not cause time delay could use a relatively small number of satellites. Furthermore, a small constellation of satellites would require a smaller number of ground antennas and less complex operations. However, this meant that the satellites would operate inside the Van Allen Belts.

Ag These considerations led to the selection of the MEO, which can furnish initial service with only six satellites, and full global coverage with only nine satellites. With twelve satellites, at least two satellites are visible from any point in the world. The system is baselined with twelve satellites so that the satellite constellation would have built in redundancy. This configuration provides the foundation of diversity service. Satellites have an apparent motion of 1° per minute.

Odyssey provides the highest elevation angles of all the mobile satellite systems proposed for voice service. Since two or more satellites are available for service anywhere in the world, service can be routed through whichever satellite provides the better transmission. This type of diversity service provides very high availability for the user. The system is also designed with directed coverage to concentrate capacity into the regions where demand is the greatest. Less demand is expected in ocean regions, consequently the system provides only single satellite service at sea.

The proponents of the Odyssey system include TRW and Teleglobe. The satellite constellation includes twelve satellites in three orbit planes. The satellite inclination is approximately 50°, with the MEO altitude of approximately 10,350 km. The ground stations used in the Odyssey system are approximately eight. The communication access method is CDMA, with a communication spectrum of approximately 1.6/2.5 GHz, and feeder links operating at approximately 20/30 GHz. Special features of the Odyssey satellite system include directed coverage, and diversity service, generally from either of two satellites.

Inmarsat P (or I-CO Global)

Figure 12:
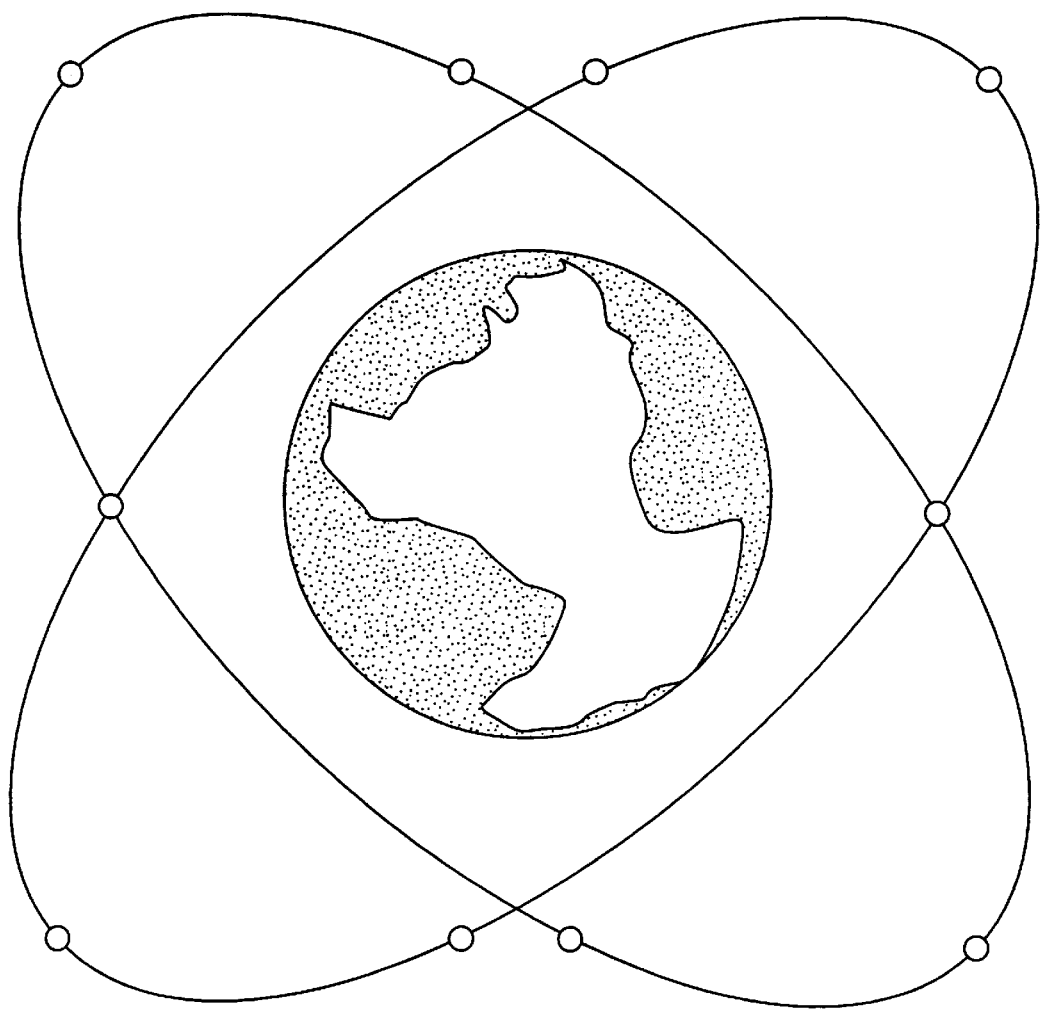
FIG. 12 is an illustration of a Medium Earth Orbit (MEO) satellite system for Inmarsat P with satellites operating inside the Van Allen Belts using the TDMA communication method.

FIG. 12 is an illustration of a Medium Earth Orbit (MEO) satellite system for Inmarsat P with satellites operating inside the Van Allen Belts using the TDMA communication method. The Inmarsat Affiliate system is very similar to the Odyssey constellation and ground infrastructure. I-CO has adopted the same altitude, nearly the same inclination, multibeam antennas, and service features, as the Inmarsat P system. Both systems orbit twelve satellites, but I-CO only operates ten satellites, and has two nonoperating spares in orbit.

Inmarsat has elected to use TDMA access, the 2.0/2.2 GHz frequencies (which require a larger number—163 smaller beams). Ample capacity is available in ocean areas. Inmarsat P is funded by many of the same signatories that have operated the treaty based Inmarsat monopoly for the part 16 years. The satellite constellation includes at least ten satellites in two orbit planes, with a satellite inclination of approximately 45° at an altitude of approximately 10,350 km. The Inmarsat satellite system includes approximately eight to twelve ground stations with feeder links operating at approximately 5/15 GHz. Special features of the Inmarsat system include diversity service or redundant satellite coverage area.

Teledesic

Figure 13:
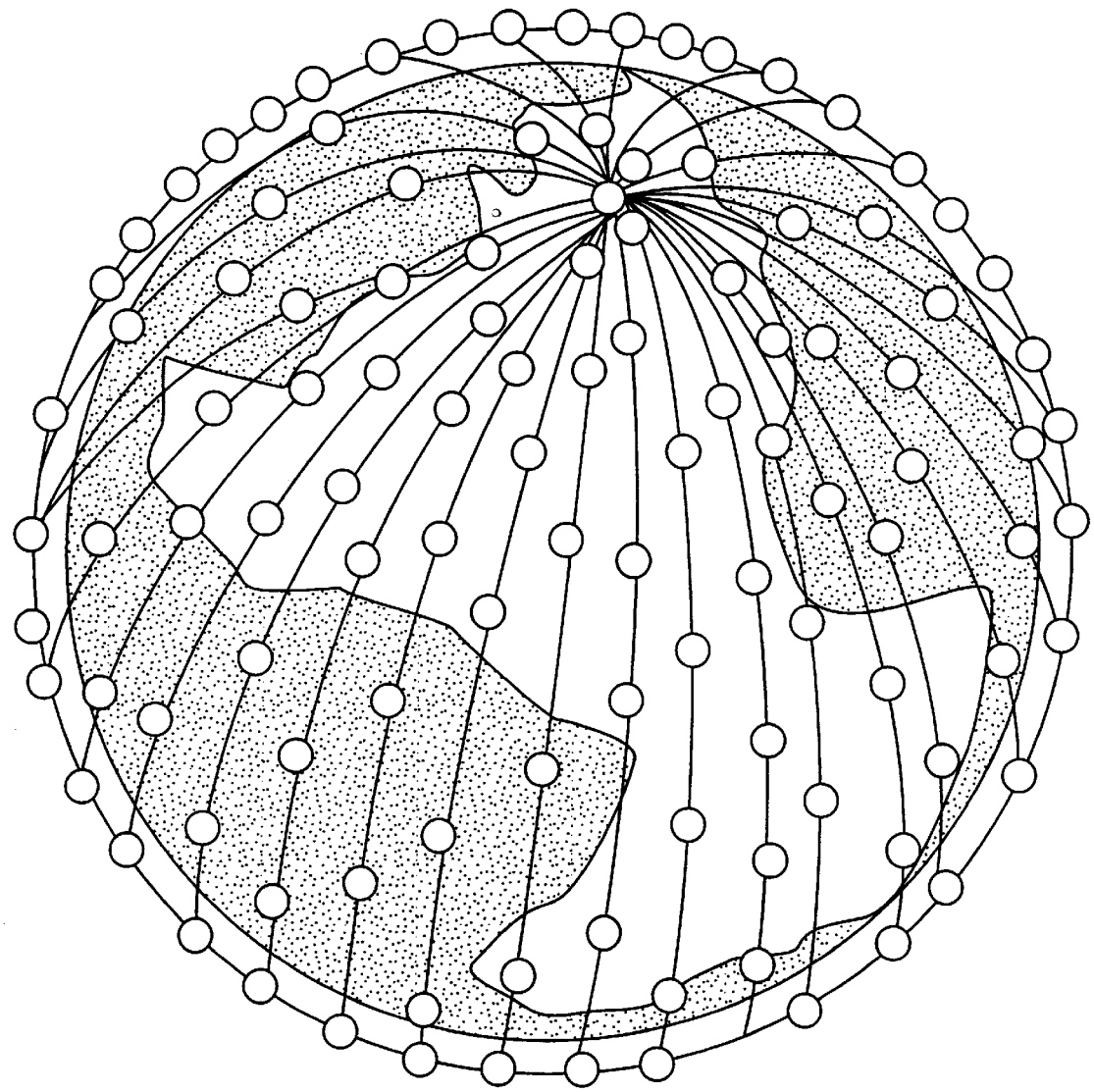
FIG. 13 is an illustration of a Low Earth Orbit (LEO) satellite system for Teledesic with satellites operating under or providing wideband data communication using TDMA communication method.

FIG. 13 is an illustration of a Low Earth Orbit (LEO) satellite system for Teledesic with satellites operating under or providing wideband data communication using TDMA communication method. Teledesic is considered to be the most ambitious service. This system would provide wideband data from LEO. The Teledesic constellation requires the largest number of satellites proposed to date. The system as proposed would provide high data rate digital communications. The constellation of 840 satellites provides service at elevation angles that always exceed 40°.

The system is planned for operation of the communication spectrum at approximately 20/30 GHz. Transmission data rates of 1.2 Mbps (E-1) to 2 Gbps are under consideration for this system. The satellite inclination is approximately 98.2° with an altitude of approximately 700 km. Approximately sixteen ground stations are used, with feeder links at approximately 20/30 GHz. Special features of the Teledesic system include a minimum satellite elevation angle 40°

Spaceway and Cyberstar

Figure 14:
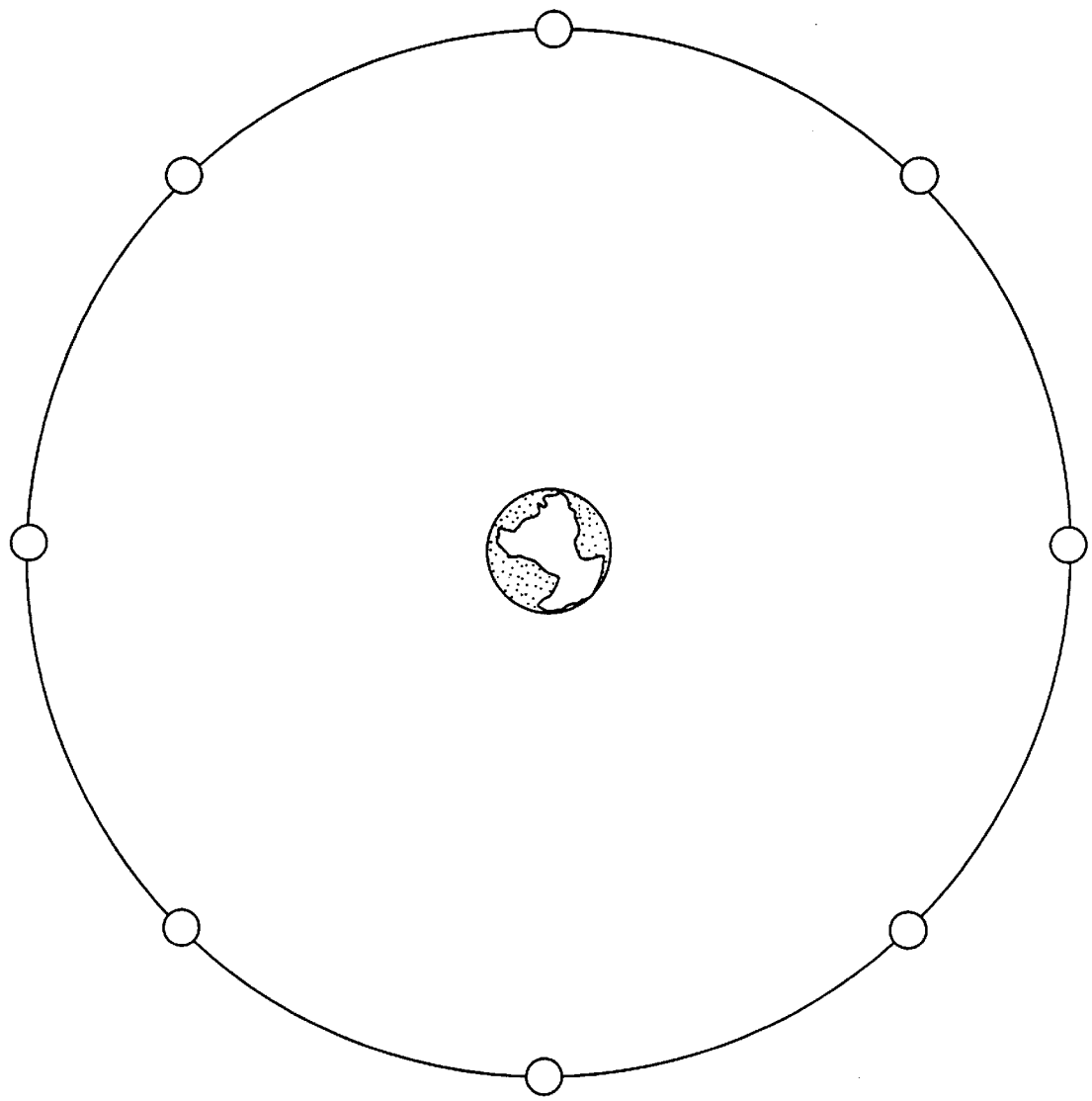
FIG. 14 is an illustration of a Geostationary Earth Orbit (GEO) satellite system for Spaceway and Cyberstar with satellites using TDMA communication method.

FIG. 14 is an illustration of a Geostationary Earth Orbit (GEO) satellite system for Spaceway and Cyberstar, with satellites using TDMA communication method. The Spaceway system has been proposed by Hughes Communications and has the same objectives as Teledesic. This system operates from GEO, and may encounter some time delay limitations in the case of interactive communications, such as video conferencing. Transmission data rates of 1.544 Mbps (T-1) are under consideration for this system.

Recently Loral filed for a similar system called CyberStar. Both applications have been accepted for processing by the FCC. The satellite constellation includes eight satellites in one orbit plane, with an inclination angle of 0°, and altitude of 35,000 km. The Spaceway and Cyberstar systems include two ground stations, utilizing the TDMA access method. The communication spectrum is approximately 20/30 GHz, with feeder links operating under approximately 20/30 GHz. Special features of the Spaceway and Cyberstar systems include the use of two GHz of bandwidth at Ka-band The above description of the various satellite systems is described in more detail in "The Market and Proposed Systems for Satellite Communications," by Roger Rusch, in Applied Microwave & Wireless, pp. 10–34 (Fall 1995), published by Noble Publishing, Tucker, Georgia 30084, the details of which are incorporated herein by reference.

Overview of MET Communication Protocol and Architecture

Figure 15:
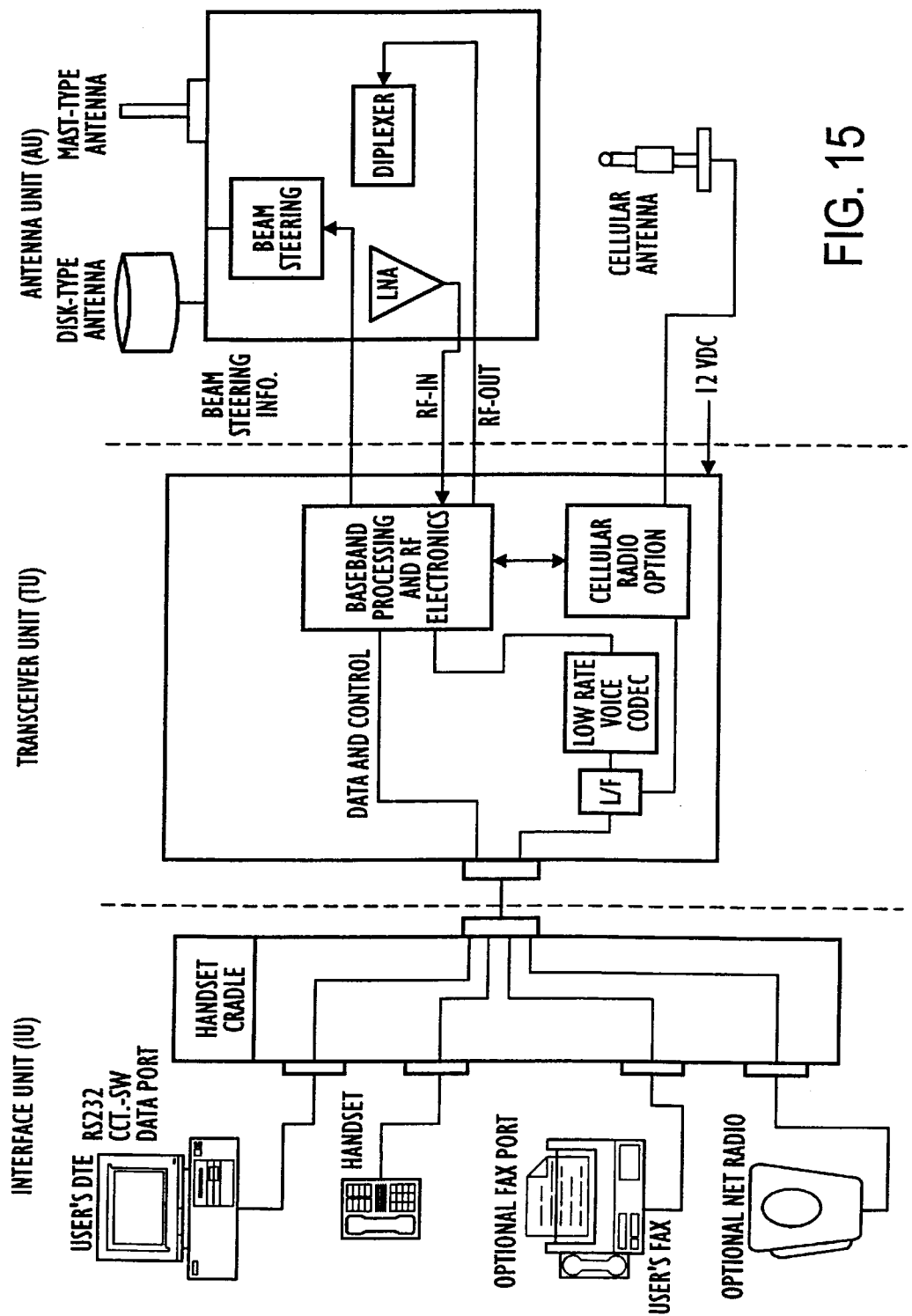
FIG. 15 is a basic block diagram of the physical architecture of the mobile earth terminal.
Figure 16:
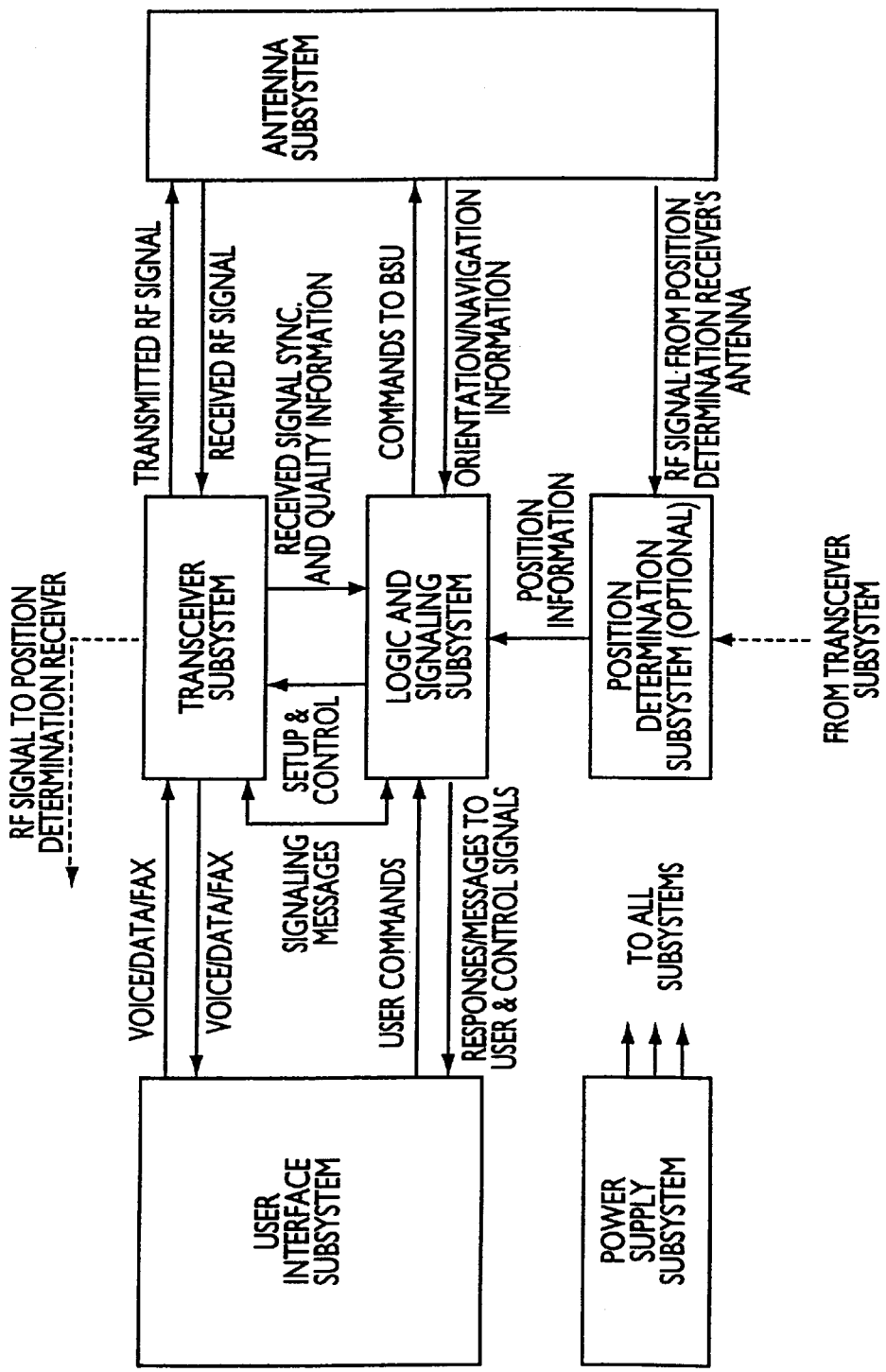
FIG. 16 is a basic block diagram of the functions of the mobile earth terminal.

While the description below focuses on the AMSC Satellite System, this description is conceptually appropriate for the other above described satellite systems. The MET includes all of the communication and control functions necessary to support communications from a vehicle or fixed remote site using the resources of the satellite network system. FIGS. 15 and 16 are basic block diagrams of the physical architecture and functions of the mobile earth terminal. The basic functional diagram of FIG. 16 is implemented by baseband processing and RF electronics of FIG. 15. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed below. Advantageously, the mobile earth terminal is functional with antennas that are either steerable or nonsteerable.

The functional subsystems comprising the MET are shown in FIG. 16 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

Figure 17A:
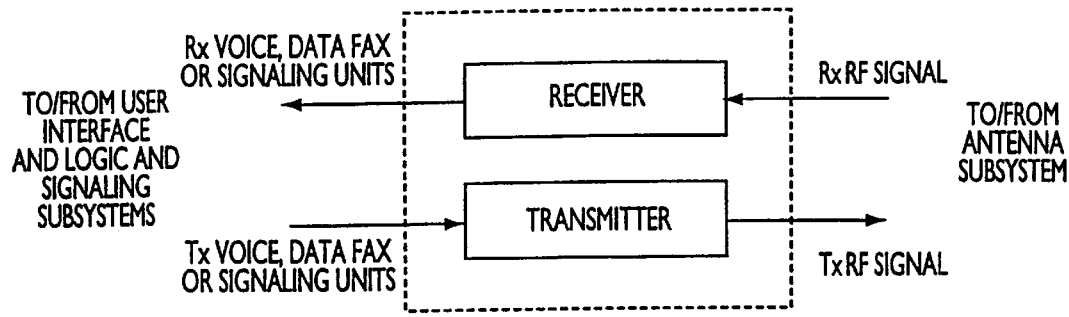
FIGS. 17a–17c are diagrams of different transceiver configurations.
Figure 17B:
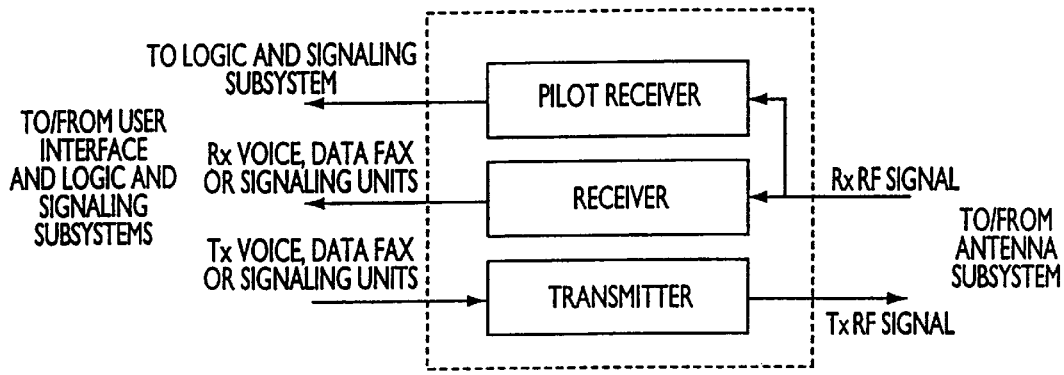
Figure 17C:
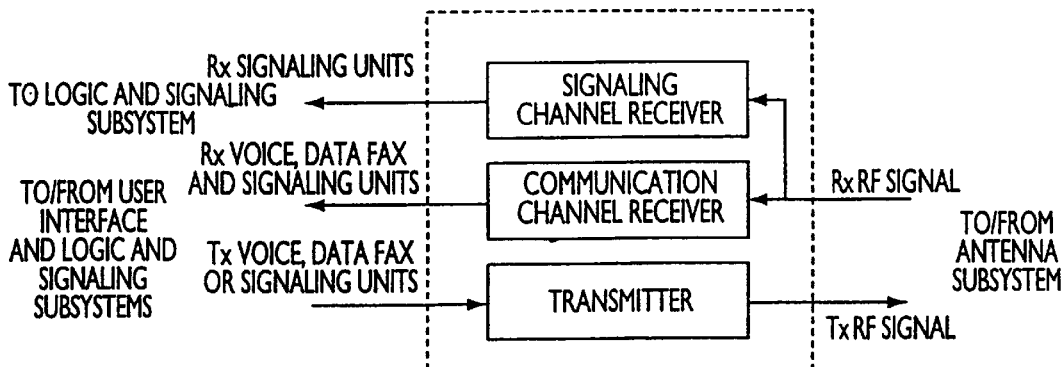

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller. Three different transceiver/receiver configurations are illustrated in FIGS. 17a–17c.

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundance Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and take the appropriate measures needed to prevent harmful interference to the satellite network or other system.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station—Land Station Compatibility Standard"; EIA/TIA-557; EIA/IS-54B.

The MSS signaling system provides the communications capability between network elements required to set up and release communications circuits, provide additional enhanced services, and support certain network management functions. The network elements discussed above include group controllers (GCs), feederlink earth stations (FESs), and mobile earth terminals (METs). The seven different channel types are:

| | |
|---|---|
| GC-S | Outbound TDM signaling channel from the GC to the METs. |
| MET-ST | Inbound TDMA signaling channel from the MET to the GC. |
| MET-SR | Inbound random access signaling channel from the MET to the GC. |
| FES-C | Outbound communications and inband signaling channel from a FES to a MET. |
| MET-C | Inbound communications and inband signaling channel from a MET to a FES. |
| GC-I | Interstation signaling channel from the GC to an FES. |
| FES-I | Interstation signaling channel from an FES to the GC. |

Figure 18:
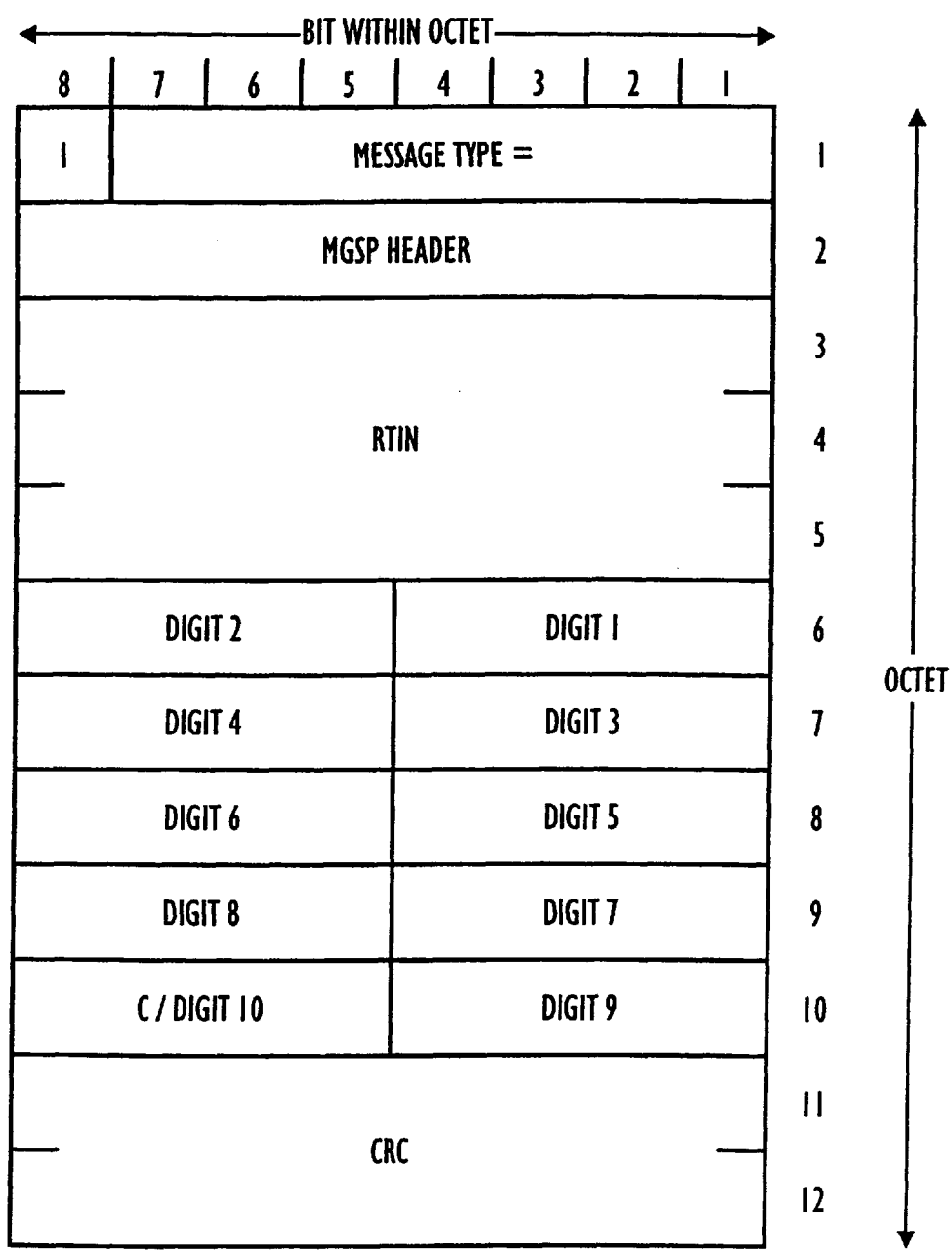
FIG. 18 is a diagram of the format of a typical signalling unit.

FIG. 18 illustrates the basic signalling architecture in the satellite communication system.

Figure 19:
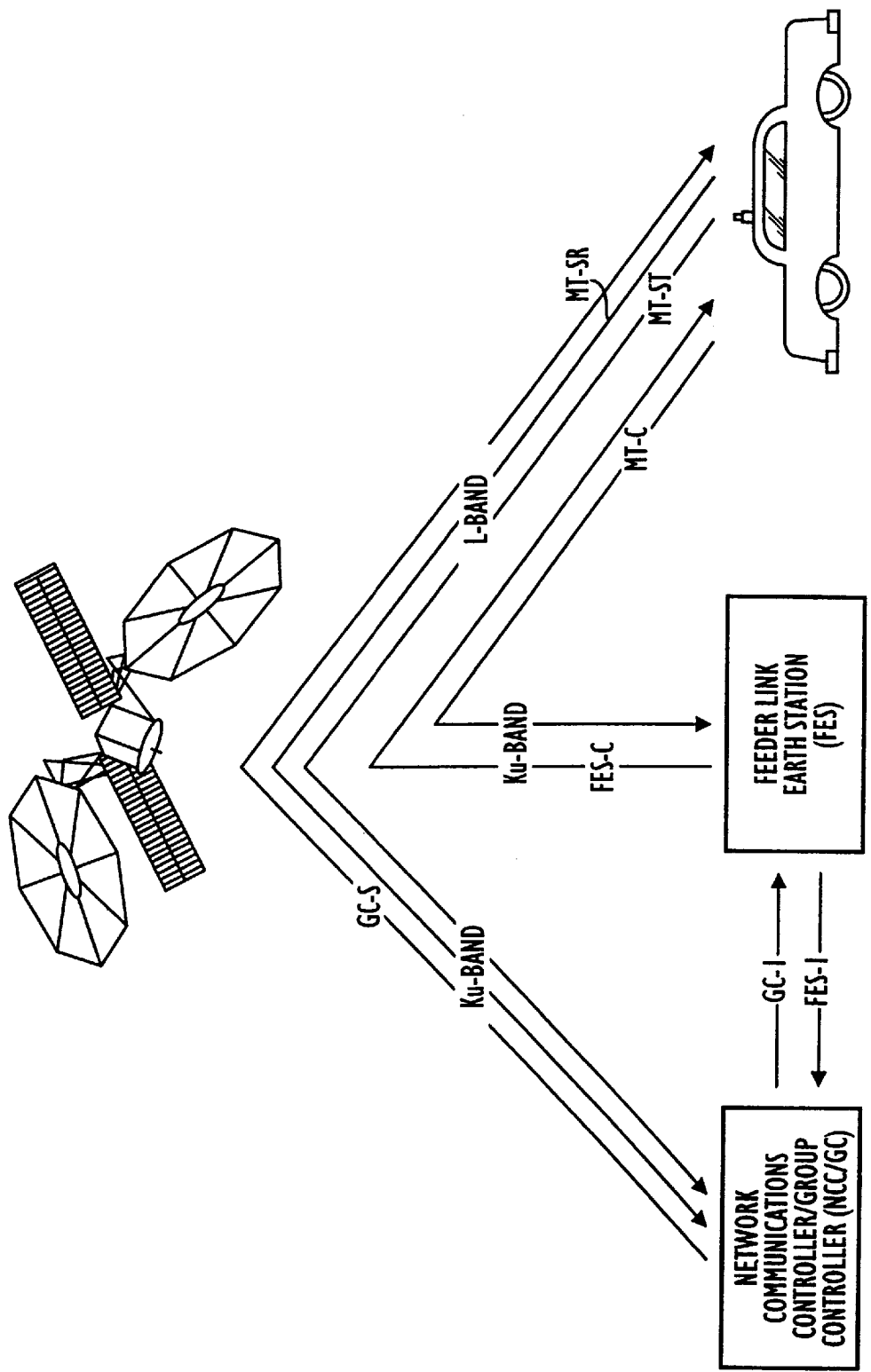
FIG. 19 illustrates the basic signalling architecture in the satellite communication system.

The basic element of communication for signaling and control for the MSS signaling system is the Signaling Unit (SU). The SU consists of 96 bits organized in 12 octets of 8 bits each. The first 80 bits comprise the message, and the last 16 a parity check, computed using the CCITT CRC-16 algorithm. The SU itself may take a variety of forms, depending on its use. The format of a typical SU, in this case a MET request for access, is shown in FIG. 19. For transmission, the SU is convolutionally encoded at either rate ¾ or ½, adding an additional 32 or 96 bits respectively.

For the example given in FIG. 19, the meanings of the various fields are as follows:

Message type: A 7 bit code which identifies the meaning of the SU; in this case a request for access to the MSS system for call placement.

MET-GC Signaling Protocol (MGSP) Header: A 8 bit field comprised of several sub-fields giving particular information related to the protocol: message type (command, response, message), message reference identification, and the number of times the message has been retransmitted.

RTIN: Reverse Terminal Identification Number—the MET's Electronic Serial Number, by which it identifies itself in transmissions on the MET-SR channel.

Digits 1–10: The first 10 digits of the addressed telephone number in the PSTN or private network, in hexadecimal. If the 10th digit is set to "C", an address of greater than 10 digits is indicated.

CRC: The 16-bit error detection code (Cyclic Redundancy Code).

The frame formats used in the GC-S, MET-SR and MET-ST channels are closely related, and are based on a common 360 millisecond superframe established on the GC-S channel. The frame formats and relationships of the out of band signaling channels are shown in FIG. 20.

Figure 20:
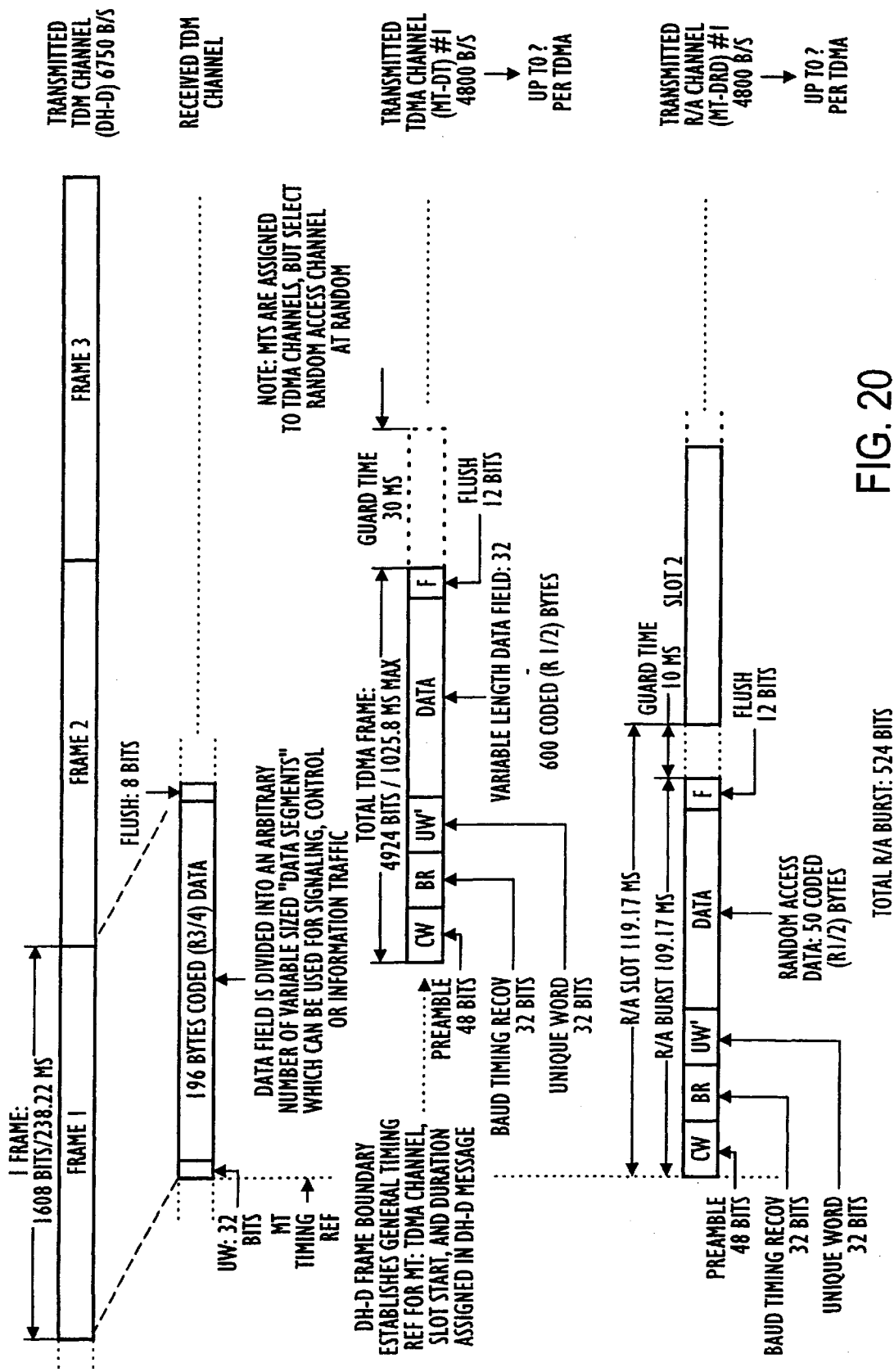
FIG. 20 is a diagram of the frame formats and relationships of the out of band signaling channels.

In FIG. 20, all timing relationships in the MSS system signaling scheme are determined from the GC-S frame structure. The GC-S is operated in the QPSK mode at an aggregate rate of 6750 b/s. The stream is divided into superframes of 360 ms, comprising three 120 ms frames. Each frame is in turn comprised of a 24-bit unique word (UW), six SUs, eight flush bits and 10 unused bits, for a total of 810 bits and 120 ms. The first frame of a superframe is identified by inversion of the UW.

Mobile terminals throughout the area covered by any beam receive GC-S channels with a total uncertainty of approximately 32 ms, primarily due to their geographical locations. The received superframe boundary establishes the four 90 ms "slots" in the MET-SR random access channels, which operate in the BPSK mode at 3375 b/s. The actual random access burst is comprised of a 24-bit preamble, a 32-bit UW, a 128-bit SU (96 bits rate ¾ coded), and eight flush bits, for a total of 192 bits in 56.9 ms. This allows a 33.1 ms guard time between bursts. Mobile Terminals select a MET-SR channel and slot at random from among the permitted choices.

The MET-ST TDMA channels, which also operate in the BPSK mode at 3375 b/s, are comprised of bursts which are equal in length to the GC-S frame, and which are also timed on the received frame boundary. The TDMA burst is made up of a 24-bit preamble, a 32-bit UW, a 192-bit SU (96 bits rate ½ coded), and eight flush bits. The total length of the TDMA burst is 256 bits in 75.9 ms, which allows a guard time of 44.1 ms. Mobile Terminals always respond to commands received on the GC-S on a MET-ST channel which corresponds in number to the position of the command SU in the TDM frame. For example, the MET will respond to a command in SU slot 2 on MET-ST channel 2, and so forth. The response is always transmitted in the second frame time after receipt of the command, so that there is a minimum of 120 ms in which the MET can prepare its response.

The initial phase of establishing a call is handled by out-of-band signaling on the GC-S, MET-SR and MET-ST channels. This phase culminates in assignment of a pair of communication channels to the MET and FES. When these elements receive and tune to the communication channels, further signaling and control functions are accomplished using inband signaling. The communication channels, FES-C and MET-C, use a variety of related TDM formats which are determined by the intended use of the link, i.e., voice, data, or facsimile and one of three possible primary modes: call setup (entirely signaling), communication (no signaling), or in-band signaling (an occasional subframe of 128 bits is used for signaling/control).

Figure 21:
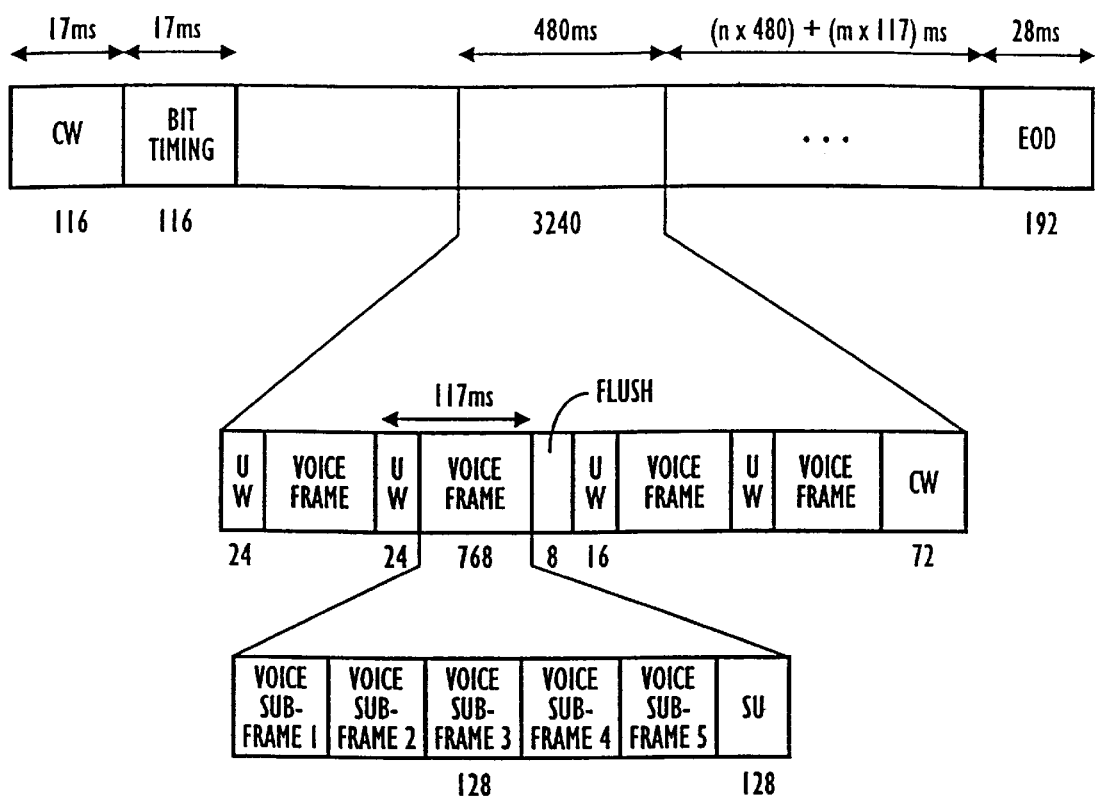
FIG. 21 is a diagram of a typical example of a communication channel format, in this case voice mode in-band signaling.

The same 96-bit SU described above is used to accomplish in-band signaling. A typical example of a communication channel format, in this case voice mode in-band signaling is shown in FIG. 21.

The outbound TDM, inbound TDMA, and inbound random access channels provide signaling between the GC and each of the METS in the associated control group. All communications on these channels will be passed in the form of 96 bit (12 octet) messages known as signaling units. Each signaling unit will begin with a 1-octet messages type field and end with a two-octet cyclic redundancy check. The MET to GC Signaling Protocol (MGSP) serves as the layer two protocol for these channels.

Communications from the group controller (GC) to the mobile terminals is provided by the Outbound TDM or GC-S channel. The primary function of this channel is to carry frequency assignments from the GC to individual METs. In addition, the Outbound TDM channel carries network status information which is received by all METs in a particular beam and control group. The outbound TDM channel operates at a rate of 6750 bits/s with rate ¾ FEC. QPSK modulation and nominally 6.5 kHz channel spacing (other spacings are under investigation) is employed. These parameters are identical to those of the communications channel and were chosen to reduce MET complexity.

Inbound TDMA (MET-ST) channels are used by the MET to respond to actions initiated by the GC, such as responding to the call announcement issued by the GC to check a MET's availability to receive a PSTN originated or MET to MET call. The Inbound Random Access (MET-SR) channels are used by METs to request frequency assignments and for other MET initiated actions. The inbound random access and TDMA channels each operate at a rate of 2400 bits/s with rate ¾ FEC. DPS modulation and nominally 7.5 kHz channel spacing is employed. This modulation scheme has been selected because of its robust performance in the presence of frequency offset and timing errors. It also exhibits superior performance relative to conventional BPSK in the presence of band-limiting and hard-limiting.

Each control group has associated with it a number of L-band beams over which it operates. In each of these L-band beams a control group has associated with it a distinct set of outbound TDM, inbound TDMA, and inbound random access channels. The number of signaling channels of each type in each set is determined based on the level of signaling traffic flowing between the GC and the METs in that control group in that L-band beam. As signaling traffic levels change, new signaling channels of each type are allocated to or deallocated from a particular set of channels. The frequencies used for outbound TDM, inbound TDMA, and inbound random access channels are included in the status information carrier in the bulletin board signaling units transmitted on the outbound TDM channel.

Each MET is assigned to one of the outbound TDM channels in the control group and beam to which it belongs. Each control group supports up to 16 outbound TDM channels in each beam. Each outbound TDM channel has associated with it up to 6 inbound TDMA channels. An A inbound TDMA channel will only carry messages that are responses to messages received on the outbound TDM channel with which it is associated inbound random access channels will not associated with a particular outbound TDM channel. A MET chooses a inbound random access channel at random from among those associated with its control group and beam each time a message is to be transmitted. Each control group can support up to 64 inbound random access channels in each beam. Up to 64 of these channels may be used system wide to meet the signaling requirements of a fully loaded system supporting 5000 circuits.

Inband signaling channels (FES-C and MET-C) are provided between the FES and the MET. These channels are used to provide signaling for call setup and call release, and also provide the capability to pass other signaling information while a call is in progress. The FES-C and MET-C channels are operated in two separate modes in "call setup mode" only signaling messages are carried by the channel. In voice mode voice frames are carried by the channel, but the capability to inject signaling messages by occasionally dropping voice subframes exists. Frames IA containing inband signaling messages employ a unique word different from that used for frames containing only voice subframes.

Interstation signaling channels (GC-I and FES-I) are zPused to pass signaling information between the GC and each of the FESs. These channels operate at a rate of 9.6 to 64 kbit/s and are implemented using either the available 5 MHz Ku-band satellite capacity or terrestrial links. The LAP-F protocol will be employed on those links to ensure reliable transfer of variable length signaling and network management messages.

When a MET is idle (powered on and ready to receive a call) it will continuously receive an Outbound TDM channel in order to receive call announcements associated with incoming calls and obtain status information from bulletin board signaling units. Each MET will be capable of transmitting signaling information to the GC on any of the inbound random access channels or on any of the inbound TDMA channels associated with the outbound TDM channel that it is receiving. During a call a MET will receive and transmit all signaling information via the In-Band signaling channels. No signaling information will be sent to a MET via the outbound TDM channel during a call. Any signaling messages from the GC to the MET will be sent to the MET via the FES through the GC-I and FES-C channels.

Each group controller supports at least one outbound TDM channel in each of its associated L-band beams. Each outbound TDM signaling channel is continuously transmitted and carries frequency assignments and networks status information from the GC to the METs. The outbound TDM channels are also used to poll idle METs to see if they can accept incoming calls. As this channel is the only way to signal information to a MET not engaged in communications, it must be as robust as possible under harsh fading and shadowing conditions.

Another key element in the MSS system is the need for the METs to be as inexpensive as possible. Towards this end, the outbound TDM channel will have the same rate and modulation as the communications channels. This will maximize the commonality of the receive chain of the MET for communications and signaling. Note that as the demodulation process is much more complex than the modulation process, the inbound random access and inbound TDMA channels do not really require this level of commonality with the communications channel.

The number of outbound TDM channels assigned to each set of signaling channels is determined by the traffic supported by the group controller in that L-band beam. Assignment of METs to outbound TDM channels is made based on a special identifier assigned to each MET as commissioning. This identifier is called the GC-S Selector Identifier code (GSI). The MET selects the outbound TDM channel to be used by dividing the GSI by the total number of outbound TDM channels available in the given beam. The number of TDM channels available is given in the BB of each TDM channel. The remainder of the four bit binary division process will form the number of the channel to be used. Each MET will receive only the outbound TDM channel assigned to it. This method allows METs in the same logical grouping to be assigned to the same outbound TDM channel as is needed for the Net Radio Service provided by the MSS System. It also allows the load on the outbound TDM channels to be redistributed quickly if a channel fails or a new channel is added.

The 120 ms frame length was chosen because it would support 6 messages per frame and correspond to the slot size requirement (>120 ms) of the inbound TDMA channel. This allows a direct correspondence between outbound TDM frames and inbound TDMA slots for the purposes of TDMA synchronization and scheduling responses to outbound messages. Eight flush bits are included at the end of each frame to allow the decoder to reset to a known state at the beginning of each frame. This allows more rapid reacquisition following channel fade events. The modulation scheme and transmission rate for this channel will be the same as for the transmission channel, namely QPSK modulation at a transmission rate of 6750 bps. Signaling units within each frame will be coded with a rate ¾ constraint length K=7 convolutional code.

The outbound TDM superframe has a duration of 360 ms and is made up of three outbound TDM frames. The superframe duration is the basic time interval over which message repetitions are done. Repetitions are used to increase the reliability of outbound TDM signaling units. Messages can be repeated in consecutive superframes. Studies by AUSSAT have shown that L-band fade events typically have durations ranging between 10 ms and 100 ms (2). Because the 120 ms frame would not provide adequate separation between message repetitions, the 360 ms superframe is used to reduce the chance of losing two copies of a message during the same L-band fade event. This repetition method is similar to that used in the AUSSAT system. Different numbers of repetitions may be used for different message types to provide different levels of reliability. The number of repetitions used for a particular message type will be a part of the signaling protocols and can be varied by the system operator. In addition to message repetitions, interleaving will be used to protect against burst errors. The interleaving is provided over a TDM frame and provides improved performance in the presence of short burst errors.

The bulletin board is a set of signaling unit (SUs) that are periodically transmitted by the MCC on all outbound TDM channels. The bulletin board contains global information such as current network status, signaling channel frequencies and inbound random access channel congestion control parameters. Every MET processes the information in the bulletin board METs, on startup, and acquires the entire bulletin board before attempting to use the MSS system. At least one bulletin board SU is transmitted in every outbound TDM frame. Bulletin board SUs are also sent as "filler" SUs, i.e., sent when there are no other SUs pending on the outbound TDM channels. Bulletin board SUs do not occupy any fixed position in the outbound TDM frame.

Bulletin board SUs are grouped into pages of related SUs. Each Bulletin Board page has an update number associated with it, which will be sent with each SU of that page. This number will be incremented by the NCC whenever the information in that page is updated. METs are required to build a local data structure that contains the contents of the bulletin board. Whenever a change in update number is detected for any page, the MET will update the entire data structure for that page with the contents of the bulletin board SUs that follow.

The inbound TDMA channel is used by the METs to transmit responses to call announcement messages and for responses to other messages received on the outboard TDM channel. Each of the inbound TDMA channels is assigned to a particular outbound TDM channel. The number of inbound TDMA channel assigned to a particular outbound TDM channel depends on the traffic supported by that outbound TDM channel and is selectable by the network operator. The TDMA channel is divided into slots of 120 ms duration. Inbound messages consist of 96 bits before coding and 128 bits after rate ¾ convolutional coding. The resulting burst will occupy 80 ms of the slot, allowing 40 ms of guard time.

This guard time arises due to the uncertainty in round trip transmission time between the satellite and a mobile terminal. Mobile terminals derive their inbound frame timing (for both the TDMA and random access channels) from the outbound TDM frames. Inbound TDMA slots have the same duration as an outbound TDM frame. At a MET each TDMA slot boundary occurs at an outbound TDM frame boundary. If MET A is nearer to the satellite than MET B, MET A will receive the outbound TDM channel At sooner than MET B, where At corresponds to the difference in propagation times to the satellite for the two terminals. As a result, if both METs synchronize their transmit timing to their reception of the outbound TDM channel, MET B's responses to messages will take 2Δt longer to reach the satellite than MET A's responses. As additional guard time of 1 symbol time also must be included to account for the ±½ symbol synchronization uncertainty in the MET. This results in a total guard time requirement of 2Δt+1 symbol time.

TDMA scheduling is done using a fixed relationship between outbound TDM channel time slots and inbound TDMA channels and slots. The response to a message received in the nth slot of the outbound TDM frame is transmitted on the nth TDMA channel assigned to that outbound TDM channel. The frequencies of the assigned inbound TDMA channels are contained in one of the bulletin board signaling units periodically transmitted in the outbound TDM channel. The response to an outbound message is transmitted in the TDMA time slot that begins 120 ms after the end of the TDM frame in which the outbound message was received. This should provide adequate time for message processing in the MET.

The inbound random access channel is used by the METs to transmit call requests to the GC. It is also used to carry other inbound messages for MET originated actions. The number of inbound random access channels assigned to a particular control group in a particular L-band beam depends on the traffic supported by that control group in that beam and is selectable by the network operator. To provide reasonable call setup times and call loss probabilities these channels are typically be operated at a throughput of approximately 25% or less. As the random access channel is operating at a relatively low efficiency, one of the prime goals in its design is that it be bandwidth efficient.

The frequencies used for the random access channels are transmitted in the bulletin board signal units. For each transmission, METs choose at random among the inbound signaling channels assigned to their control group. After transmitting a message, the MET waits a given amount of time for a response. If no response is received within this amount of time, the MET retransmits in a slot selected at random over some given number of slots. This procedure is repeated until either a response is received or a maximum number of transmissions is reached. The bursts on the random access channel are identical to those on the TDMA channel (i.e., modulation, coding, preamble, etc.).

The MET-GC Signaling Protocol (MGSP) procedures send signaling units between GCs and METs via the GC-S, MET-ST and MET-SR channels. This protocol encapsulates functions such as channel selection, channel access, slot timing, error recovery and congestion control. Higher layer functions, such as call processing, use the protocol for communicating among themselves between the METs and GCs.

Figure 22:
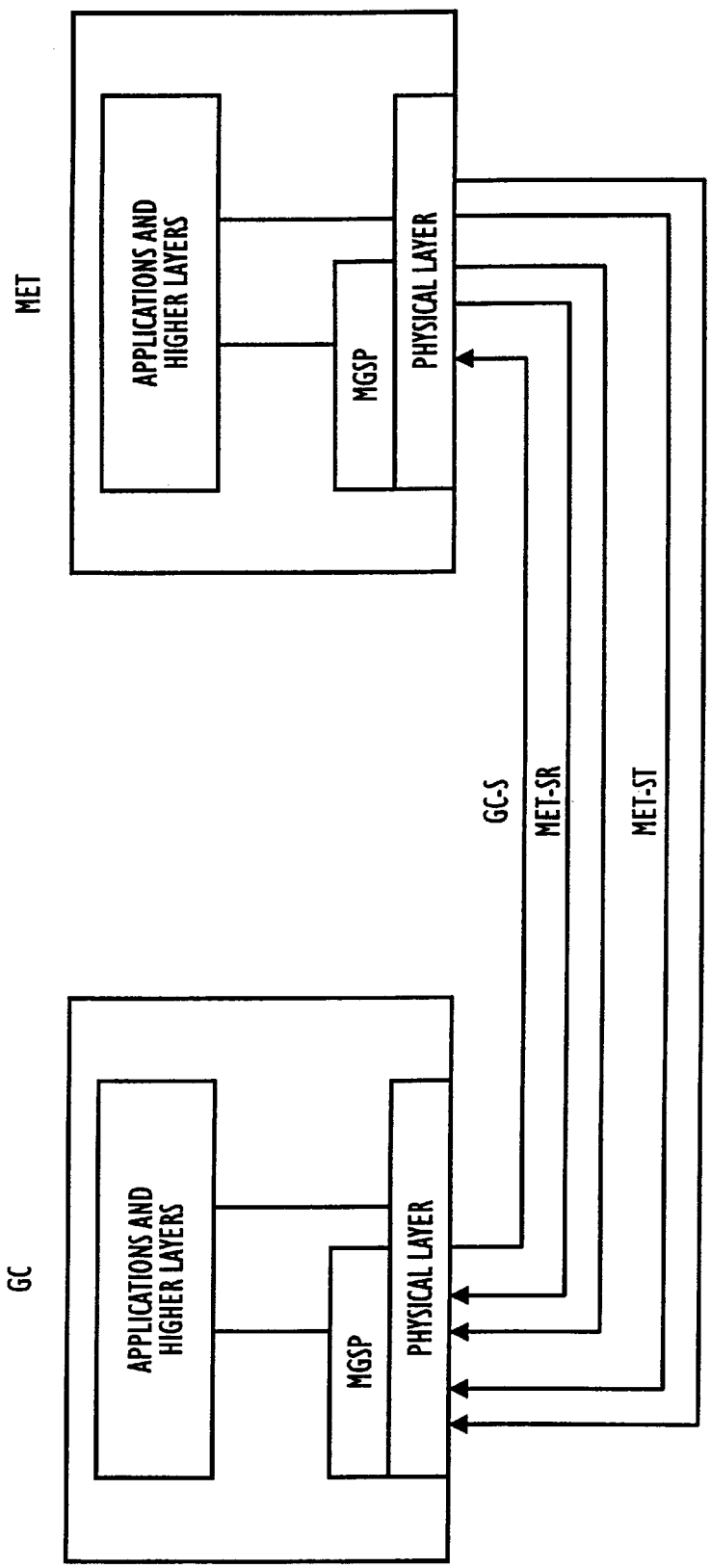
FIG. 22 is a diagram of the relationship of MGSP to other signaling layers in the GC and the MET.

The relationship of MGSP to other signaling layers in the GC and the MET is shown in FIG. 22. A transaction consists of a command message that is sent from an originating application to a destination application, to which the destination application replies with a response message. Each command and response consists of a signaling unit. The MGSP performs functions such as channel selection, error recovery using retransmission, and repetition of SUs to improve channel reliability. The MGSP at a MET also implements congestion control procedures for the MET-SR channels. Only one outstanding transaction exists between a MET and a GC in a given direction. However, two simultaneous transactions, one in each direction, are supported between a GC and a MET. MGSP also provides a only-way message service, that does not require a response from the receiver.

Figure 23:
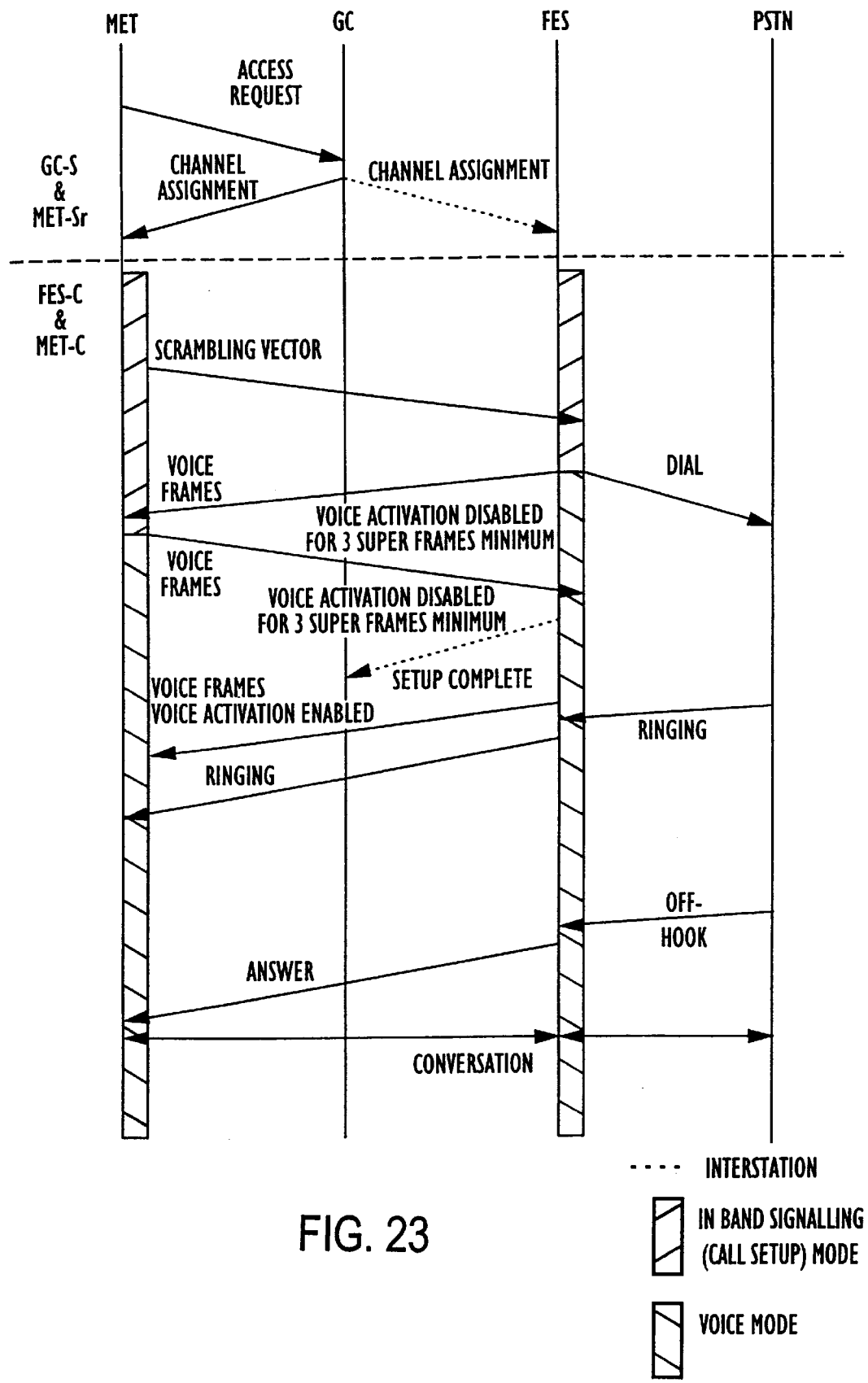
FIG. 23 is a diagram of the improved call setup protocol used to establish a MET originated voice call.

The improved call setup protocol used to establish a MET originated voice call is shown in FIG. 23. When a MET user initiates a call, the MET formats and transmits an access request message via a random access channel. This message includes the call type and the destination phone number. The group controller chooses an FES to handle the call and sends frequency assignments to the MET via the TDM channel and to the FES via the interstation signaling channel. The FES frequency assignment also includes the call type, the destination phone number to allow the FES to complete the call, and an access security check field used to verify the METs identity. The access security check field is generated by the group controller using the MET frequency assignment and the MET key which is known only to the MET and the group controller.

After the MET receives the frequency assignment, it transmits a scrambling vector message to the FES. This message contains the initial vector to be preloaded into the FES scrambler at the beginning of each voice channel frame. Letting the MET randomly pick this vector provides some degree of privacy on the Ku to L-band link. The scrambling vector message also contains an access security check field generated by the MET using its frequency assignment and its key. The FES compares this field with that received from the group controller to verify the identity of the MET. After receiving the scrambling vector message, the FES and the MET switch from call setup mode to voice frame mode and the FES completes the call to the terrestrial network user.

Figure 24:
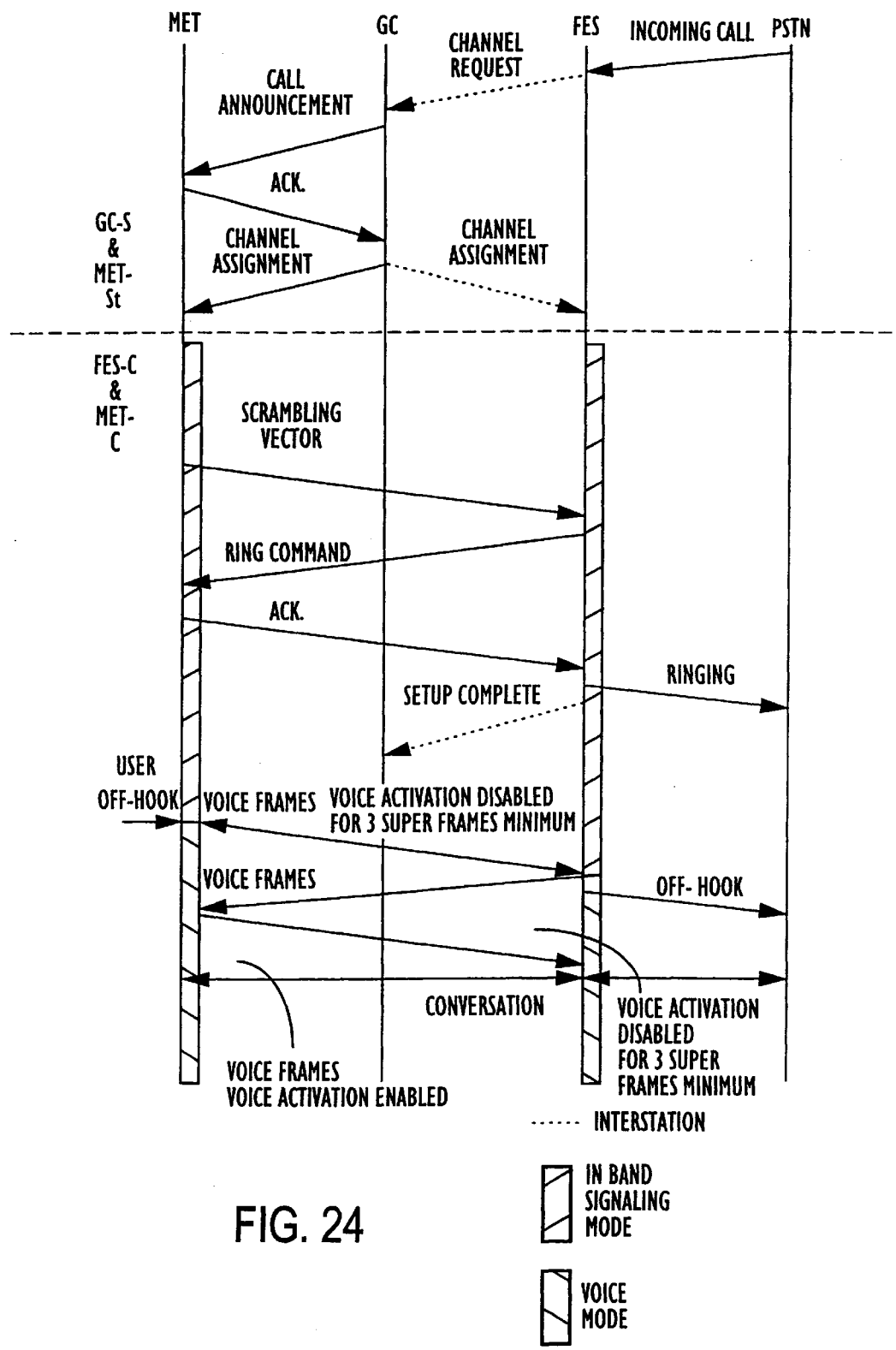
FIG. 24 is a diagram of the improved protocol used for PSTN originated calls.

The improved protocol used for PSTN originated calls is shown in FIG. 24. When a call from a terrestrial network user arrives at an FES, the FES makes a channel request using interstation signaling. This request contains the phone number received from the terrestrial network user. The group controller determines the MET identity based on the phone number and transmits a call announcement via the TDM channel. The MET acknowledges this announcement via the TDMA channel. This exchange allows the group controller to verify that the MET is available before assigning bandwidth to the call. Frequency assignments are then made and the scrambling vector is transmitted by the MET. The call is then completed to the MET user.

MET to MET calls are set up using a double hop connection through an FES. These calls are set up by the group controller and the FES as a MET to PSTN call setup concatenated with a PSTN to MET call setup. As a result the METs require no additional call processing for MET to MET calls.

Network Engineering/Systems Engineering Architecture

Advantageously, the mobile satellite communication system includes a network engineering and systems engineering (NE/SE) support tool. The NE/SE system is used to support the activities of the communications engineering organization. This system enables the engineering organization to administer, provision and configure the Communications Ground Segment (CGS) systems resources to reflect communication service offerings. It also provides Mobile Satellite Service (MSS) management with a high-level view of the CGS network from both a configuration and performance perspective.

Figure 25:
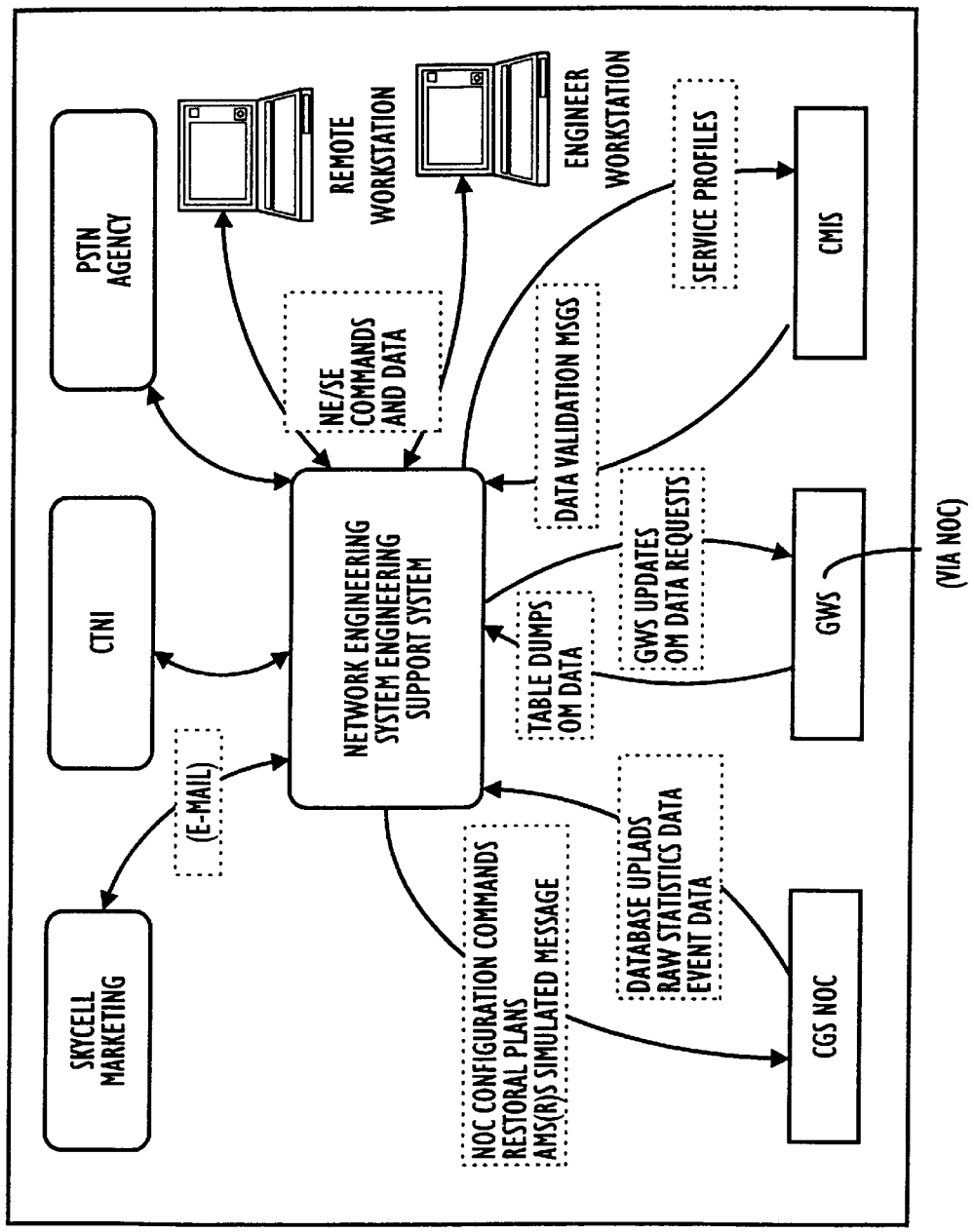
FIG. 25 is an illustration of the NE/SE interfaces to CGS components and external organizations.

FIG. 25 illustrates the NE/SE interfaces to CGS components and external organizations. The NE/SE system allows engineering to interface with internal business entities such as the Marketing organization for the exchange of forecast and capacity data, and the CMIS organization in support of customer registration. It also supports ability to communicate with the commercially available Bulletin Board Services (BBS) such as Cibernet On-line Roaming Database (CORD), North American Cellular Network (NACN), and other Public Switched Telephone Network (PSTN) agencies via Electronic Mail (E-Mail). The NE/SE system supports the organization's ability to define the configuration of the CGS network in support of the Mobile Satellite (MSAT) systems operation. Based on input from marketing and sales organizations, it contrasts expected traffic loads with the capability and availability of space and ground resources. NE/SE aids in formulating tactical plans to maximize the available resources of the MSS satellite. It allows a network engineer to produce frequency plans for different geographical regions and to define circuit pools for different groups of Mobile Terminal (MT) users. In addition, NE/SE defines contingency plans for failure situations, such as the loss of a satellite or a ground-based equipment outage. Engineering activities include configuration of the network, its logical resources and its physical components, including cellular switches. As a part of the configuration activity, NE/SE performs consistency checks on the data sent to Customer Management Information Systems (CMIS) and CGS. It is also responsible for configuring the communication paths to external Organizations (EO). The software configurations that are necessary to expand capacity to meet increases in traffic demand, while also supporting new features and services that become available to subscribers. It also tracks the logistics of network additions via generation of work orders. These activities are supported by collecting and reporting traffic and performance data for long term planning and providing MT registration support to CMIS.

Figure 26:
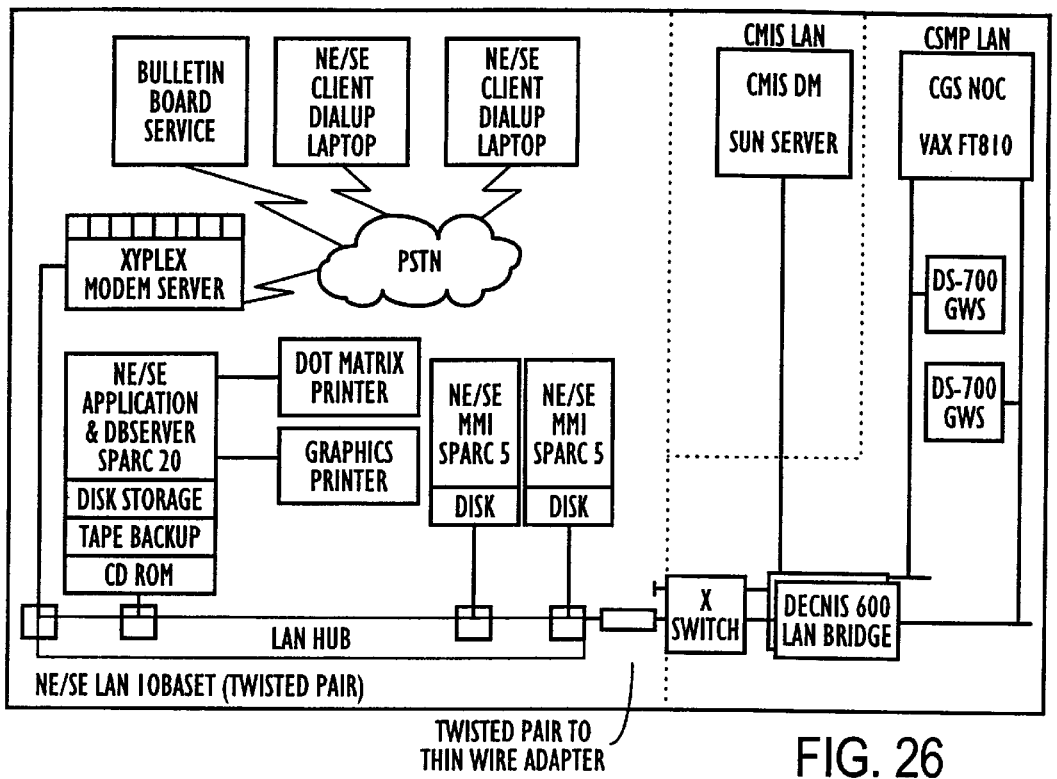
FIG. 26 is an illustration of the basic computer architecture of the NE/SE system.

FIG. 26 is an illustration of the basic computer architecture of the NE/SE system. In FIG. 26, the network elements includes, according to one embodiment, twisted pair (10baseT) LAN, twisted pair to thinwire ethernet adapter, BNC thinwire "X" switch with terminator and a LAN HUB. The NE/SE application server includes a SUN SPARCserver 20 Model 50 with 64 Mbyte RAM, a 20 inch TurboGX Color Monitor, a Sun CD Plus CD ROM drive, a 644 Mbyte internal SCSI disk storage, a 12.6 Gbyte (6.3 Gbyte mirrored) SCSI external disk storage, and a 5 Gbyte 8 mm Tape Backup Drive. Two Man-Machine Interface (MMI) Workstations consists of a SUN SPARCstation 5 Model 70 with 64 Mbyte of RAM, a 20 inch TurboGX Color Monitor, and a 535 Mbyte SCSI internal disk storage.

The NE/SE software system operates under the Sun Solaris 2.3 operating system, which is a version of the System V Release 4 (SVR4) UNIX operating system. Solaris 2.3 is a 32-bit operating system that provides the flexibility of multitasking, shared computing resources, and distributed services to provide a foundation for developing distributed applications.

The NE/SE software is developed on a network of Sun workstations running the Solaris 2.3 operating system. As shown in FIG. 26, the development hardware will consist of 1 Sun Sparcstation 20 workstation and 2 Sparcstation 5s. The server will contain all NE/SE development files in shadowed disk partitions, the Oracle database server software, the NE/SE database, and the COTS development software. The two Sparcstation 5s are connected by LAN to the primary server. The internal disks of the Sparcstation 5s are used for the operating system kernel and as a swap area for virtual memory; otherwise, each Sparcstation 5 relies on its connection to the primary server for all other disk-based files and services. Additionally, the server can be used as a development workstation in the same manner as the Sparcstation 5s. The NE/SE development system is connected to the CGS Software Engineering Environment (SEE) for the purpose of obtaining header and C source code files generated using the Open Systems Solutions' ASN.1 compiler on the SEE. Of course, other architectures may also be used to provide the basic NE/SE functions described herein.

The NE/SE system architecture is implemented as a set of client-server applications distributed across multiple processors that are interconnected via an Ethernet Local Area Network (LAN). Typically, the client workstations (Sun SparcStation 5 workstations) handle the user interface processing for the NE/SE system, while database access and NOC communication processes are located on the server workstation, a Sun SparcStation 20. For the purposes of the following architecture description, processes are divided between "client" processes and the "server" processes. The processes are UNIX processes. However, note that it is possible for the entire NE/SE system—both client processes and server processes—to be run from the server workstation.

Figure 27:
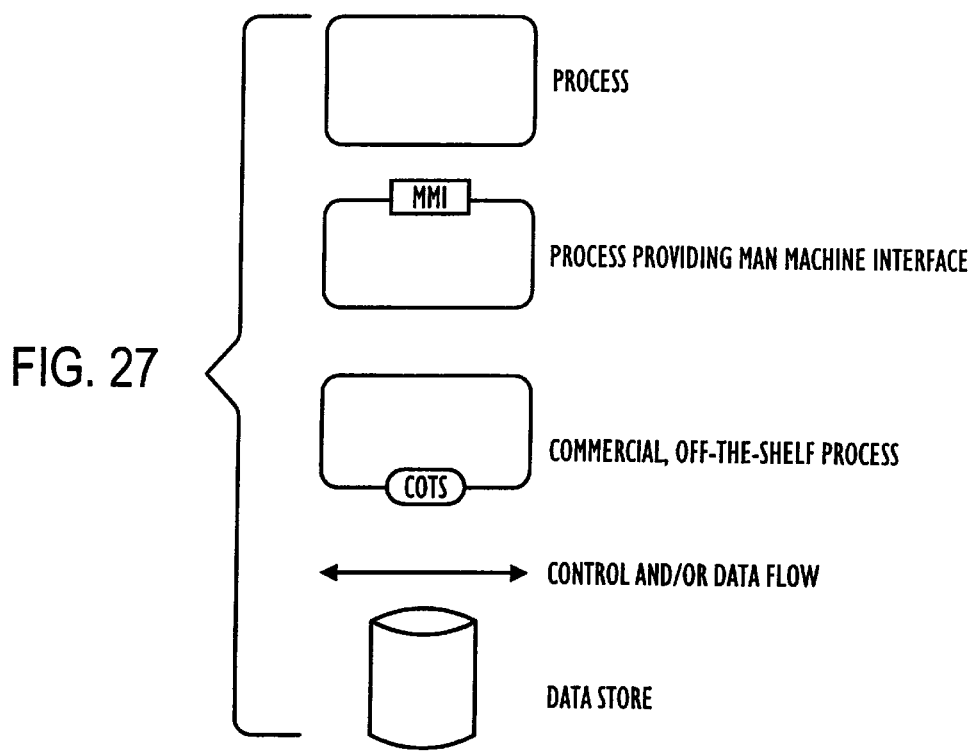
FIG. 27 lists descriptions of the symbols used in the architecture diagram.
Figure 28:
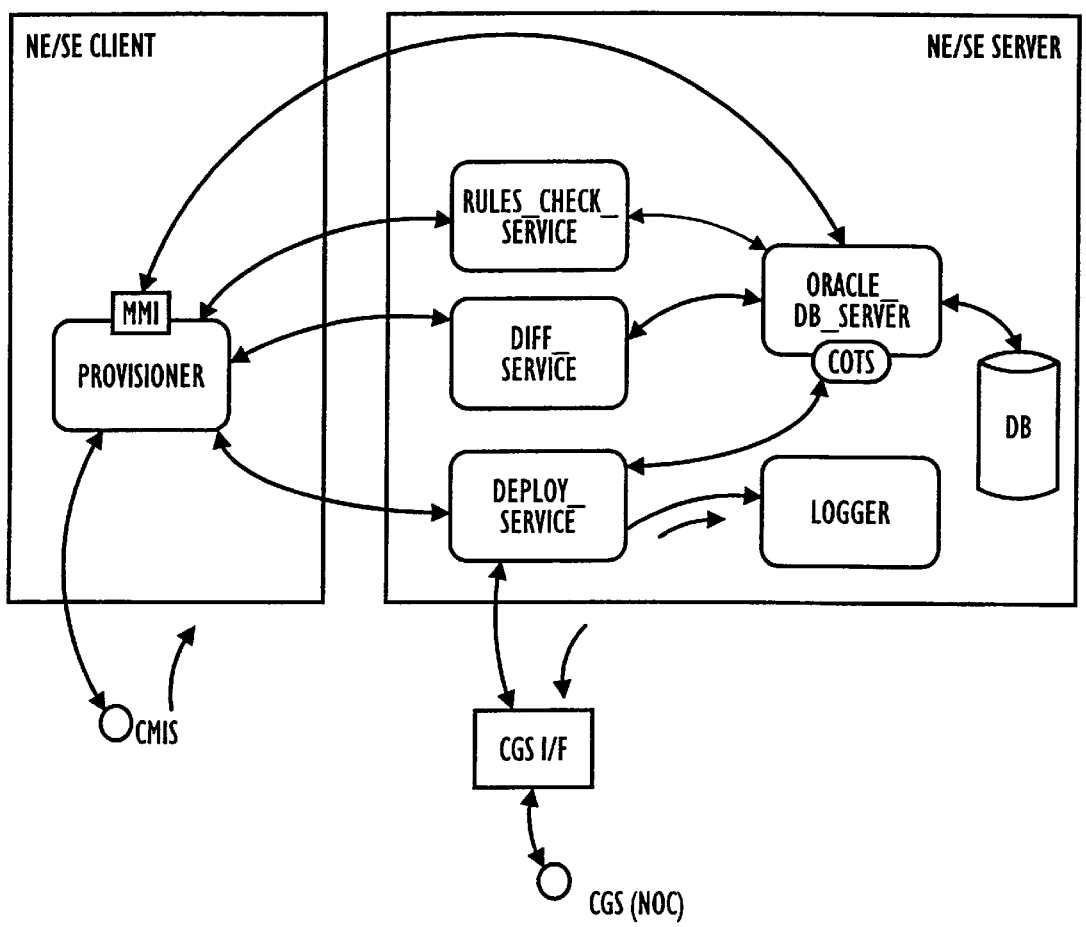
FIG. 28 shows the architecture of the processes associated with the Configuration Management.

The client-server architecture details the NE/SE MLCSCs and their division into client and server UNIX processes. Each process maps to the MLCSC most closely associated with it—note that not every MLCSC has a process associated with it. Those MLCSCs that do not map to a UNIX process are considered function code libraries and are compiled into the set of UNIX processes to the extent needed. FIG. 27 lists descriptions of the symbols used in the architecture diagram provided in this section. FIG. 28 shows the architecture of the processes associated with the Configuration Management TLCSC. The provisioner process for creating, updating and handling CGS configurations is started on the client by user command. Provisioner provides the MMI interface for performing provisioning tasks; user input during provisioning initiates the Rules_Check_Service for performing checks on configurations, the Diff_Service for comparing two configurations (NOC and NE/SE configurations), and the Deploy Service processes for downloading updates to the NOC. Data is passed between the service processes and Provisioner over the NE/SE network, and the service processes exchange data with the DB server. The Deploy Service exchanges data with CGS and sends data to the Logger process on the NE/SE server.

Figure 29:
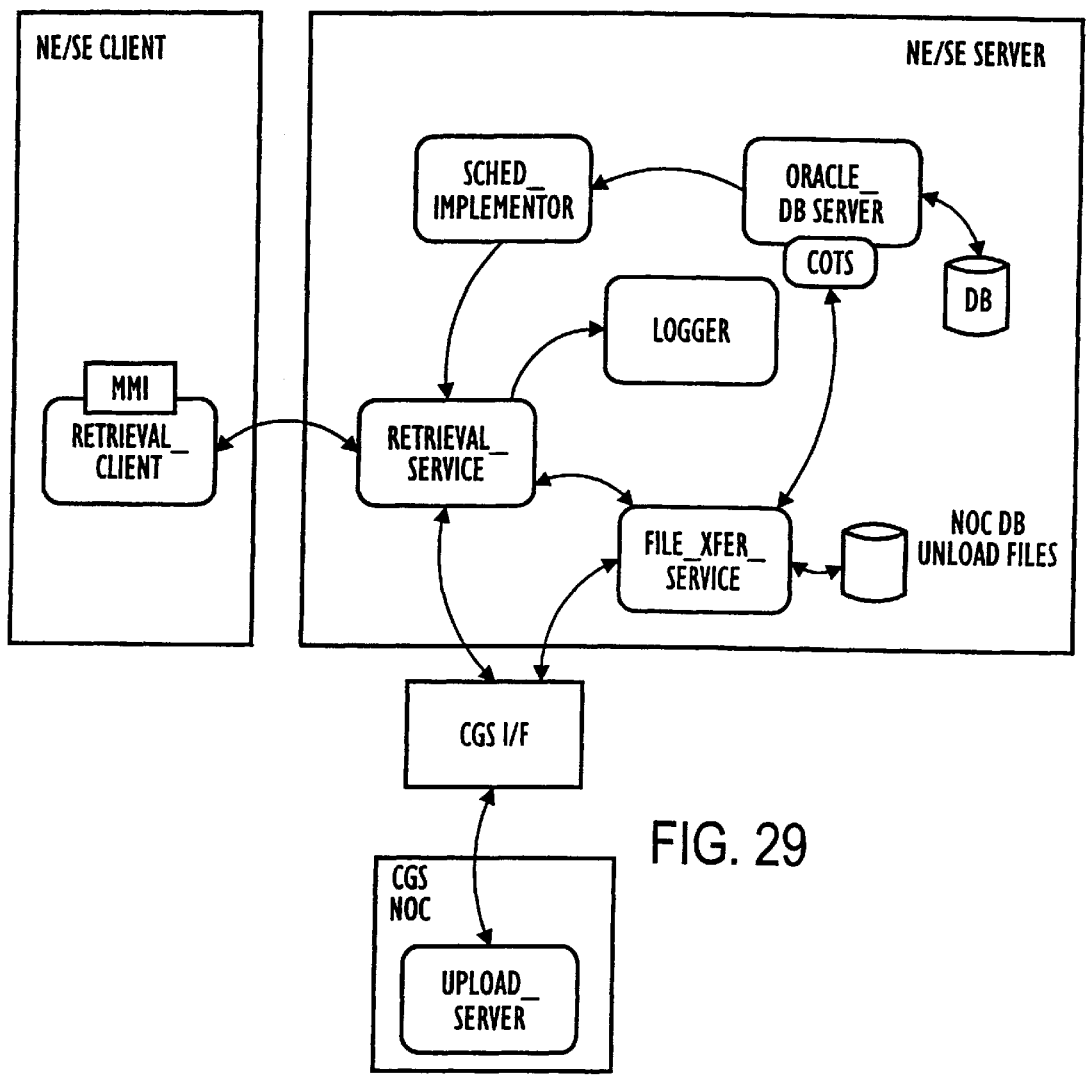
FIG. 29 is an illustration of the processes associated with the NOC Database Upload.

The processes associated with the NOC_DB_Upload TLCSC are shown in FIG. 29. The Retrieval_Client contains the MMI which allows the operator to initiate NOC DB uploads. User action from the MMI or schedule data via the Schedule_Implementor causes the Retrieval_Service to be initiated on the server; it manages the upload process from the NE/SE and initiates both the Upload_Server at the NOC which unloads the NOC's database tables to files and the File_Xfer_Service on the NE/SE server which uploads the files from the NOC to the NE/SE and populates the NE/SE database with them. Data is exchanged between the Retrieval_Service and the Upload_Server as per the interface definitions in the NOC-to-NE/SE ICD; also, data is exchanged between the File_Xfer_Service and the Upload_Server as per the interface definitions in the NOC_to_NE/SE ICD.

Figure 30:
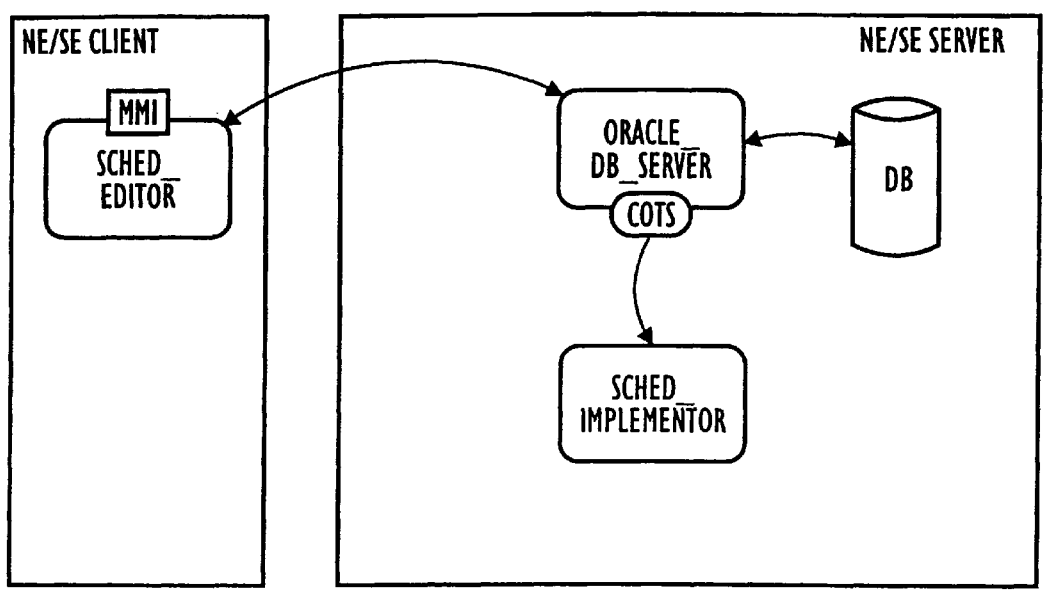
FIG. 30 illustrates the processes associated with the Scheduler.

The processes associated with the Scheduler TLCSC are shown in FIG. 30. The Sched_Editor process provides the MMI for manipulating schedules in the NE/SE database, and is initiated by user request via the NE/SE main window. The Sched_Implementor runs on the NE/SE server, periodically awakening to read the schedules from the NE/SE database and initiating requested processes.

Figure 31:
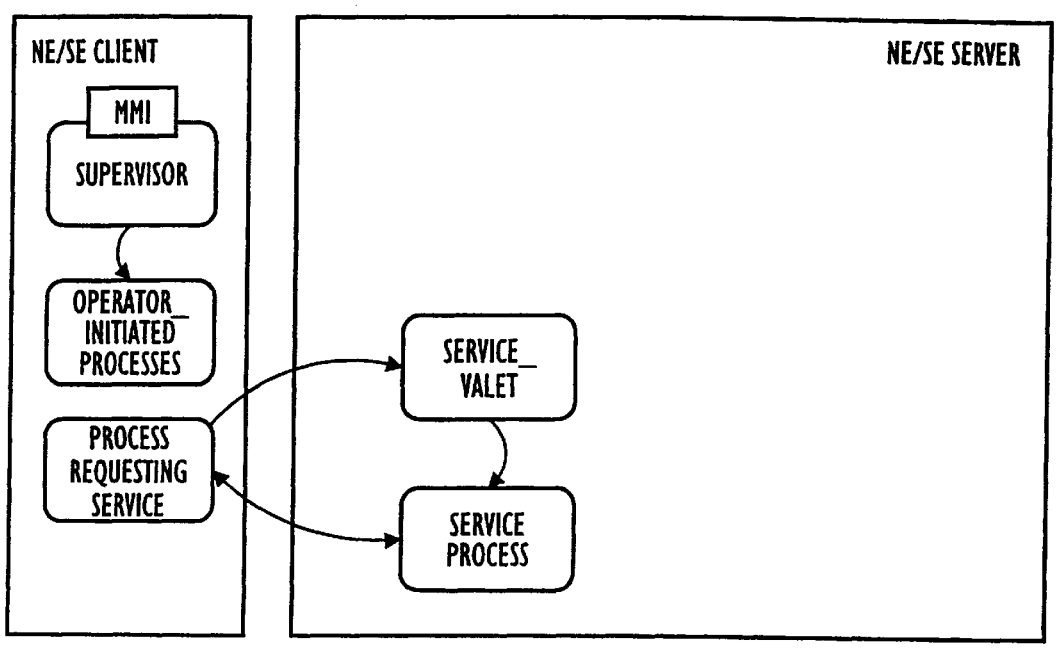
FIG. 31 shows the processes associated with the Utilities.

FIG. 31 shows the processes associated with the Utilities TLCSC. The Supervisor process contains the MMI for the NE/SE main window. The Service_Valet is initiated at NE/SE startup on the NE/SE server and waits for requests to initiate NE/SE service processes on the server.

Figure 32:
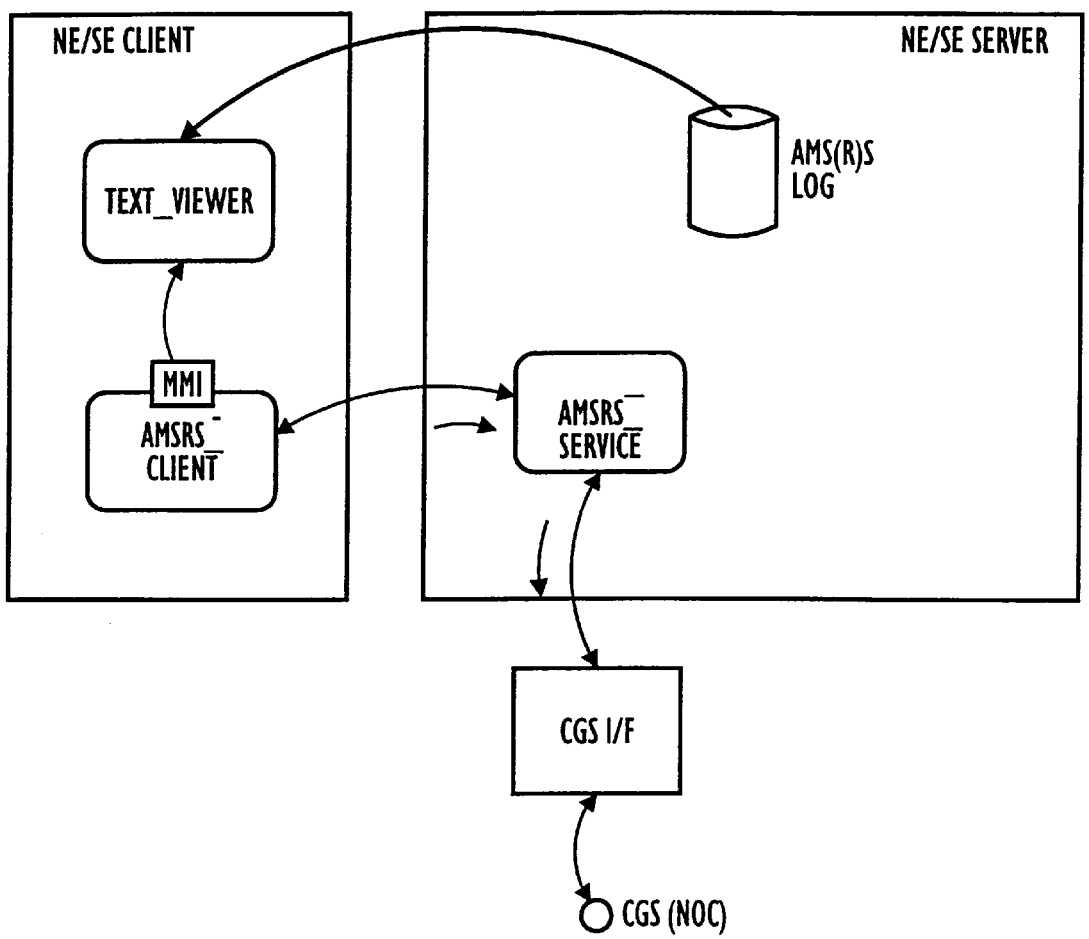
FIG. 32 illustrates the processes associated with the AMSRS_Emulation.

The processes associated with the AMSRS_Emulation TLCSC are shown in FIG. 32. The AMSRS_Client runs on the NE/SE client and provides the MMI for the AMS(R)S emulation. The AMSRS_Service process is initiated on the server in response to user input into the AMSRS_Client, and is used to exchange AMSRS messages between the AMSRS_Client and the CGS NOC.

Figure 33:
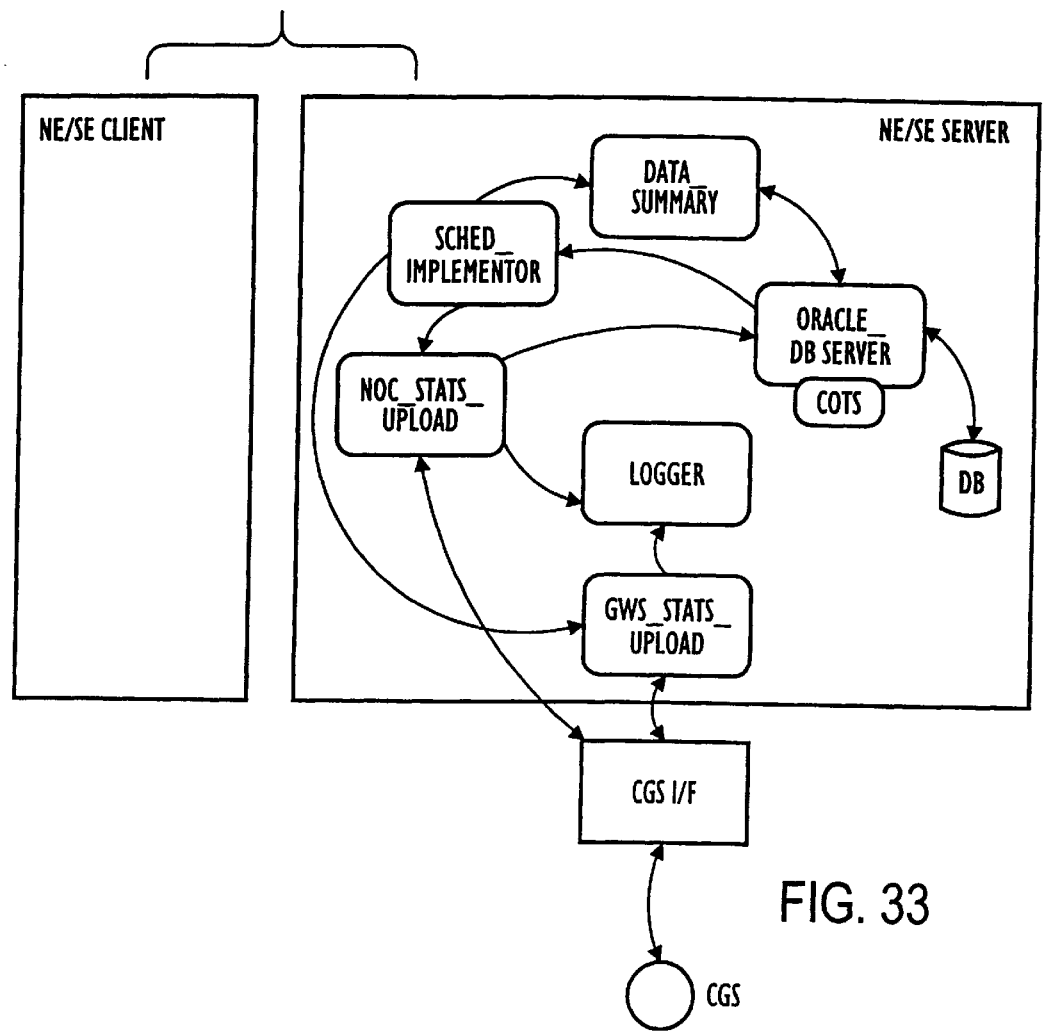
FIG. 33 shows the processes associated with the Statistics-Collection.

FIG. 33 shows the processes associated with the Statistics-Collection TLCSC. The Data Summary, NOC_Stats_Upload, and GWS_Stats_Upload processes reside on the NE/SE server and are initiated by the Sched_Implementor. They are used to collect traffic and system load statistics generated by the CGS system elements.

Figure 34:
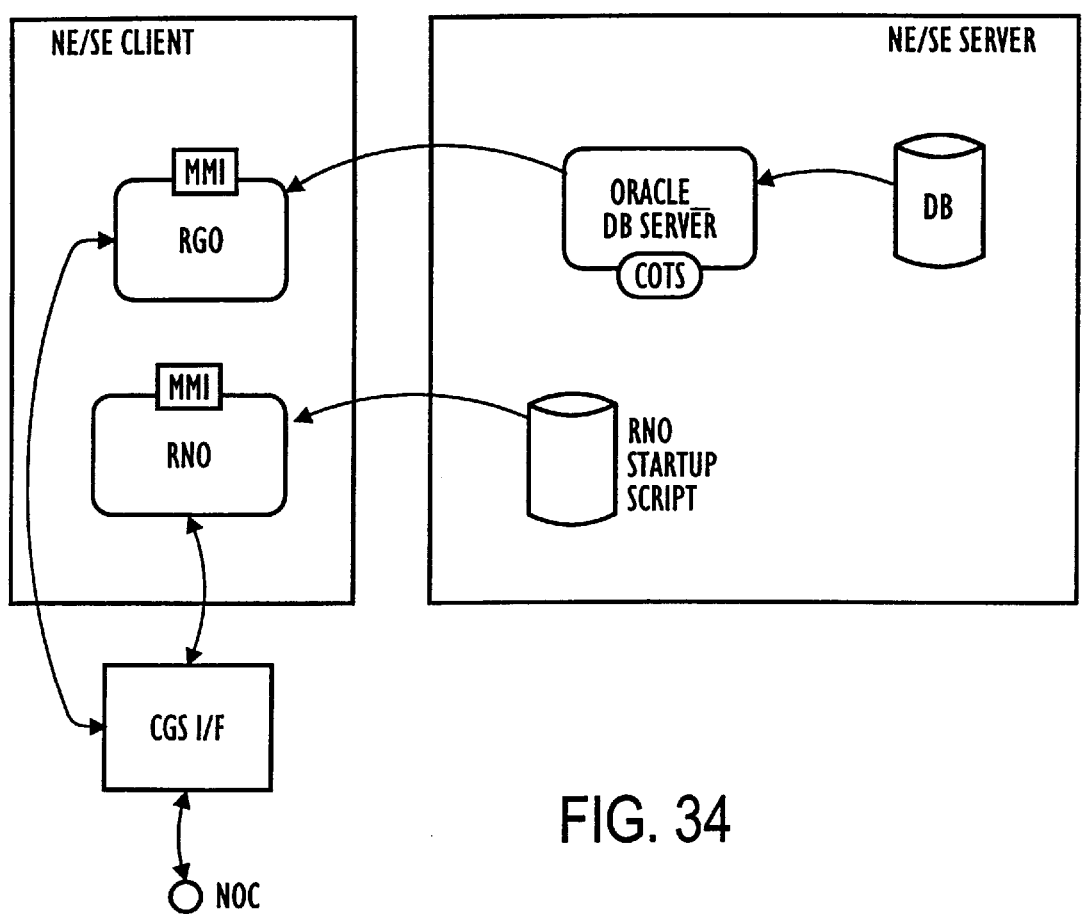
FIG. 34 illustrates the processes associated with the Remote_Connectivity.

The processes associated with the Remote_Connectivity TLCSC are shown in FIG. 34. The RNO and RGO process resides on the NE/SE client and provides an MMI for operations that require access to devices external to the NE/SE system. RNO is the remote NOC operator process. RGO is the remote GWS operator process.

Figure 35:
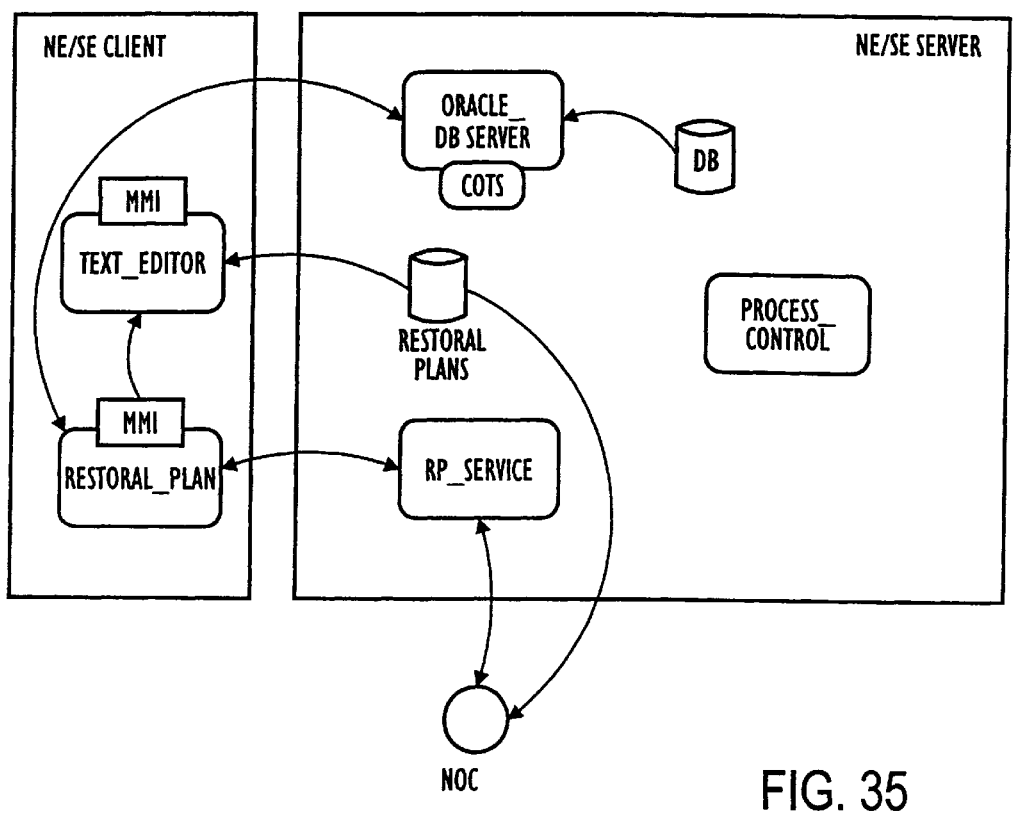
FIG. 35 illustrates the processes associated with the System Administration.

The processes associated with the Sys_Admin TLCSC reserved for the NE/SE system administrator are shown in FIG. 35. The Restoral_Plan process resides on the client and provides an MMI for the operator to download restoral plans to the NOC and to initiate the text editor to edit restoral plan files stored on the server. The RP_Service provides a communications link between the NOC and the Restoral_Plan process.

Figure 36:
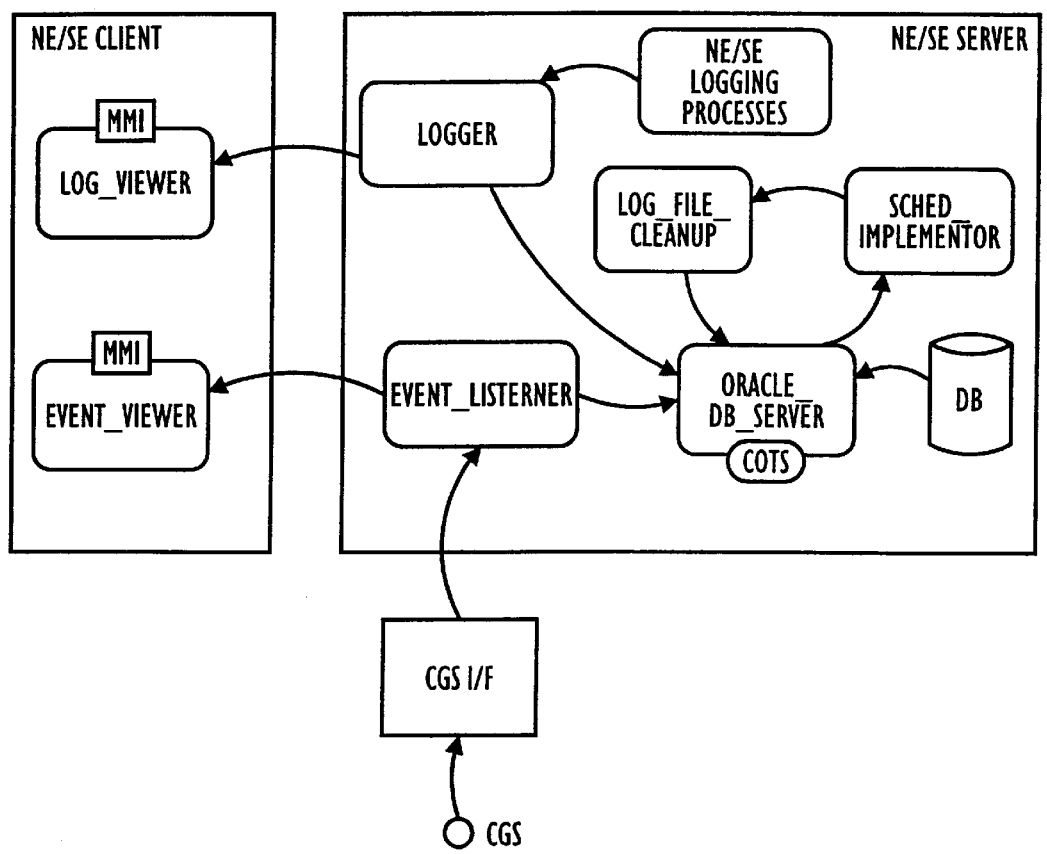
FIG. 36 illustrates the processes associated with the Auditor.

The processes associated with the Auditor TLCSC are shown in FIG. 36. The Event_Listener process is initiated on the NE/SE server at NE/SE startup and listens for event messages sent to NE/SE by CGS. The Event_Viewer process is initiated on the NE/SE client by user action from the NE/SE main window and connects to the Event_Listener via the NE/SE network to view CGS events. Similarly, the Log_Viewer process for viewing NE/SE log messages is initiated on the NE/SE client by user action from the NE/SE main window and connects to the Logger (which handles NE/SE log messages) via the NE/SE network. The Logger process is initiated at NE/SE startup on the NE/SE server. The Log_File_Cleanup process for managing the log messages in the database is started on the NE/SE server by the Sched_Implementor.

The NE/SE communications interfaces with external entities is now described and also how the NE/SE internal client-server applications communicate. Logical and physical connectivity is shown and following external interfaces are described:
NOC
CMIS
GWS MAP
GWS Traffic Data Collection
Bulletin Board Systems (BBS)
Mail The following NE/SE internal client-server application interfaces are also described in this section:
  NE/SE client-server application inter-process communication
  NE/SE client-server database connectivity The local NE/SE components are interconnected via ethernet LAN, and remotely via dial-up modems using the Public Switched Telephone Network (PSTN). The logical interfaces are detailed hereinafter, specifying each internal and external interface and protocol stack.

Figure 37:
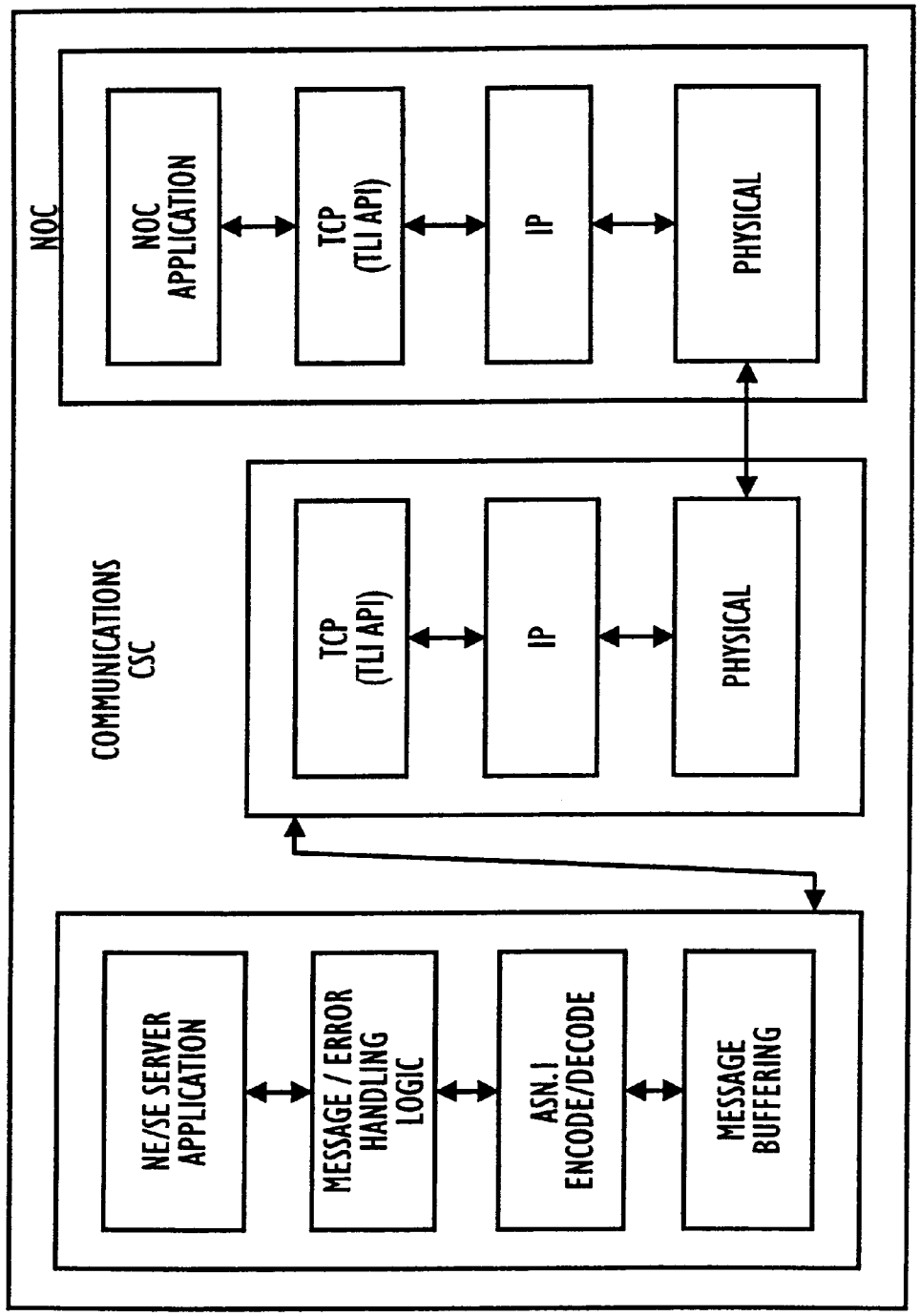
FIG. 37 illustrates the NE/SE NOC communication protocol stack.

Communication with the NOC is accomplished using ASN.1 encoded messages via a TCP/IP protocol stack for the following:
  Event messages
  Configuration updates
  Restoral plan download file name messages
  Logs and statistics collection requests
  File transfer requests In addition, File Transfer Protocol (FTP) is utilized for transferring files between the NE/SE and the NOE for:
  NOC configuration upload files
  NOC logs and statistics files
  Restoral plan files FIG. 37 illustrates the NE/SE NOC communication protocol stack.

Figure 38:
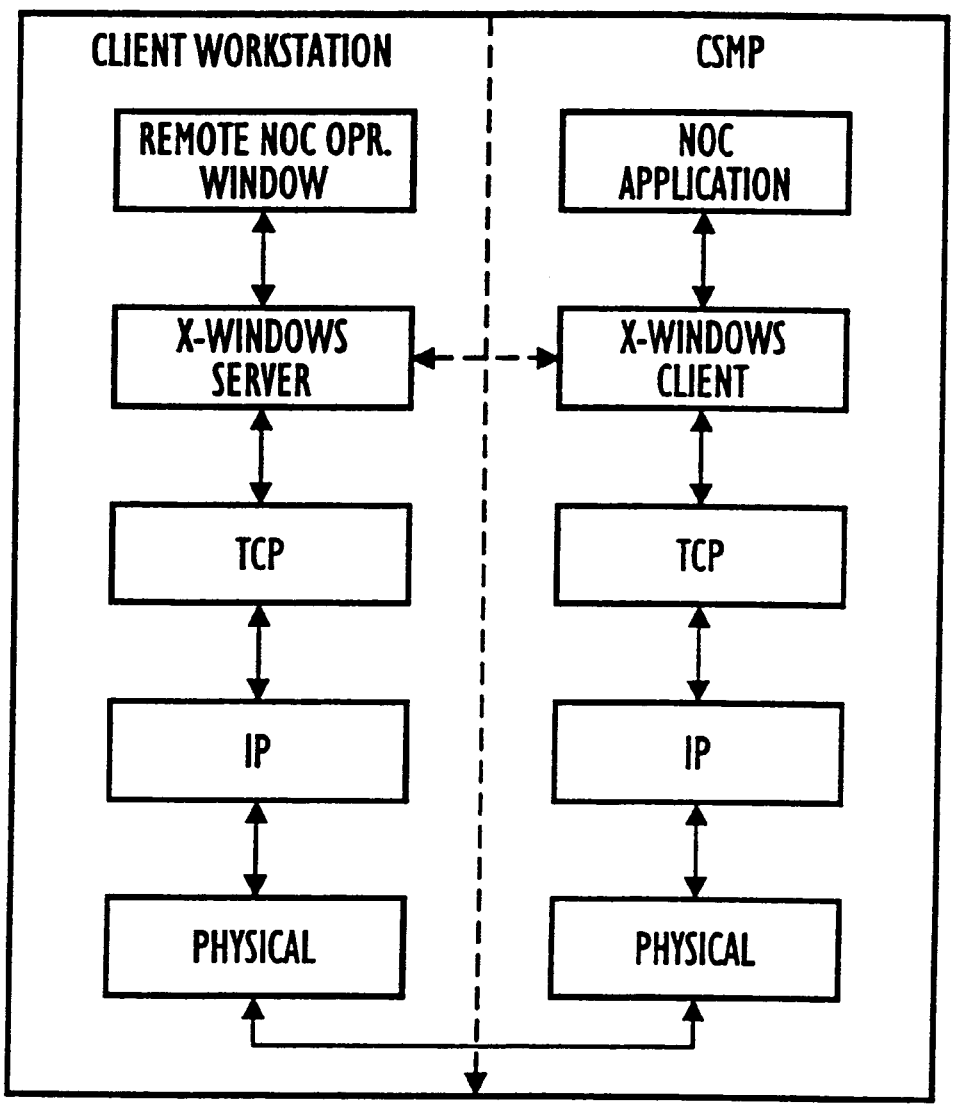
FIG. 38 illustrates the remote NOC operator protocol stack.

The NE/SE local workstation establishes a remote X-Windows session with the CGS NOC VAX in order to allow the user to logon as a NOC operator. FIG. 38 illustrates the remote NOC operator protocol stack.

Figure 39:
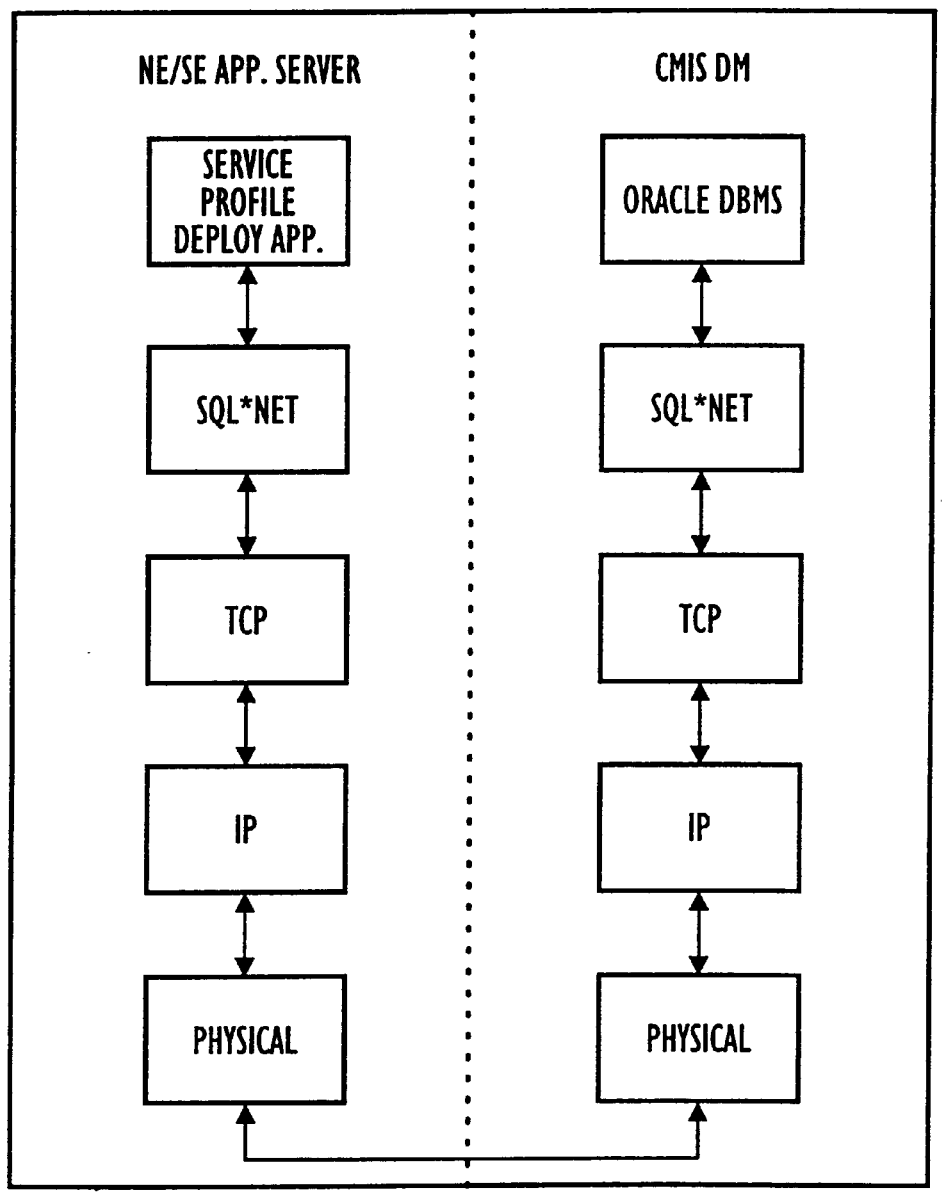
FIG. 39 is an illustration of the CMIS interface protocol stack.

Access to the CMIS database from the Service Profile Deploy processes is accomplished via SQL*NET, manufactured by Oracle. SQL*NET is the vehicle used to pass SQL insert messages to CMIS and return success indications and failure messages from the CMIS Oracle database management system. FIG. 39 is an illustration of the CMIS interface protocol stack.

Figure 40:
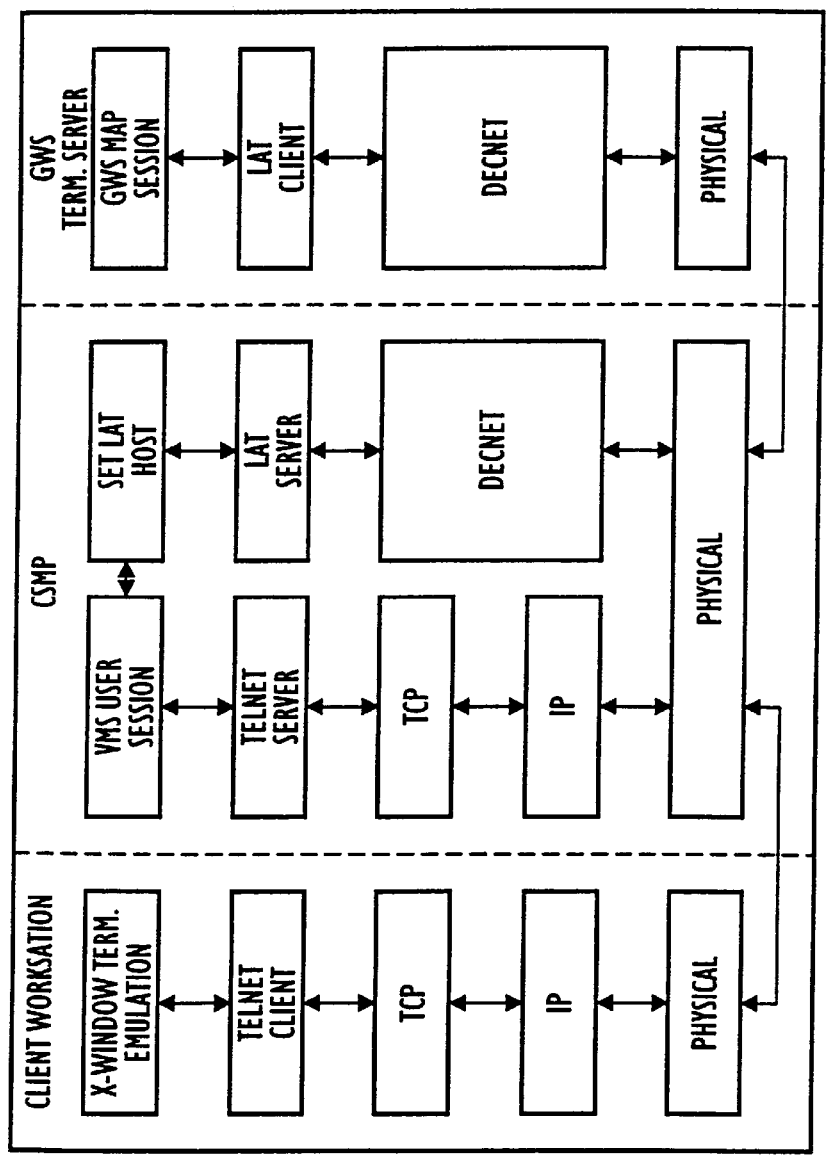
FIG. 40 is an illustration of the GWS Remote Map Session protocols.

Remote Maintenance Administrative Position (MAP) sessions with the GWS is accomplished by establishing an X-Windows session with the VAX host at the GWS site. The user logs into the VAX, establishes a Local Area Terminal (LAT) session and logs into the GWS MAP Port. FIG. 40 is an illustration of the GWS Remote Map Session protocols.

The Operational Measurement data collection interface between the GWS and FES Site Manager exists for the transfer of GWS Operational Measurement data from the GWS to the FES Site Manager. The interface exists with the FES Site Manager receiving OM reports by emulating a GWS log printer. The OM Data Collection process is briefly described hereinafter.

Figure 41:
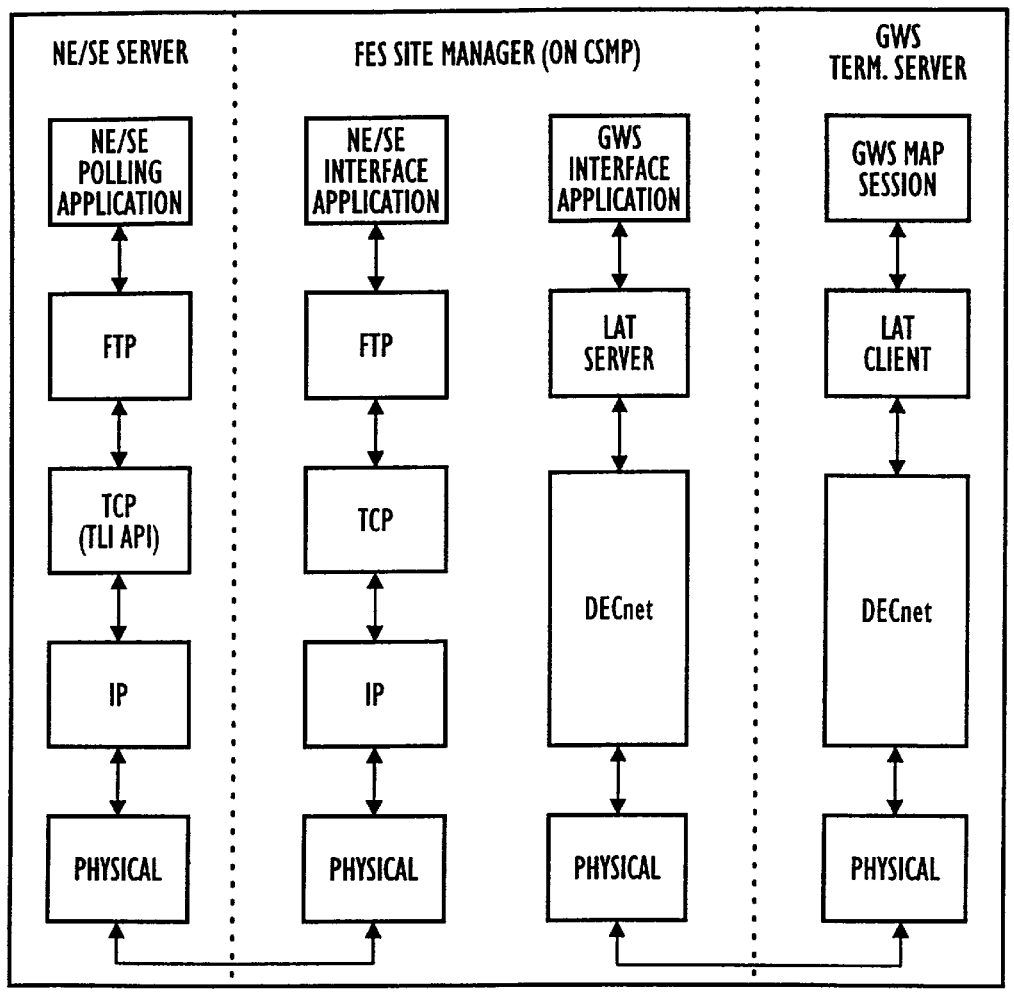
FIG. 41 is an illustration of the GWS statistics collection protocols.

At the scheduled interval, the GWS dumps its OM report data to the Site Manager process. When an OM report is received by the FES Site Manager, the collected data is stored in a file, whose filename contains an ID and Timestamp. This file exists in a FES directory available to the NE/SE. The NE/SE initiates a file transfer (FTP) and, upon receipt of the file, remotely deletes the OM file local to the FES. FIG. 41 is an illustration of the GWS statistics collection protocols.

Figure 42:
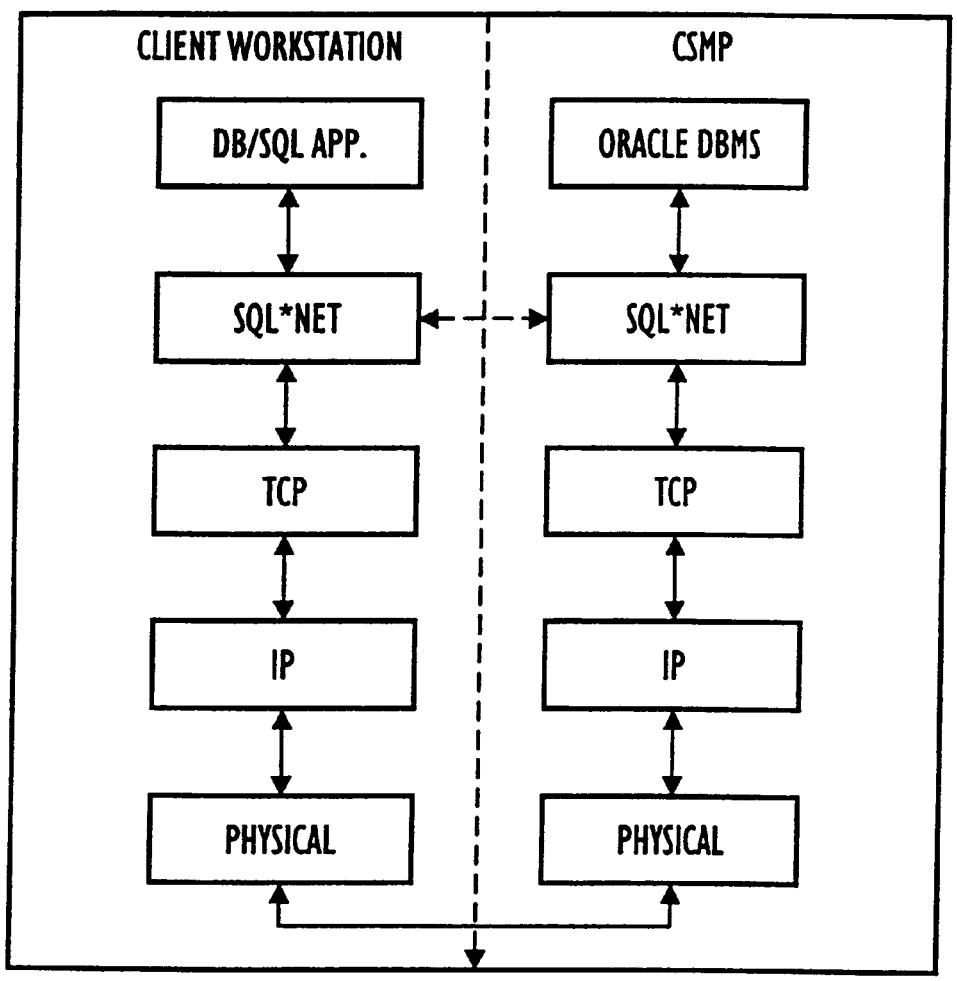
FIG. 42 is an illustration of the database connectivity protocol stack.

Access to the database from the MMI Client processes is accomplished via SQL*NET, standard software manufactured by Oracle. SQL*NET is the vehicle that X-Windows call-back routines uses to pass SQL messages to and from the Oracle database management system. FIG. 42 is an illustration of the database connectivity protocol stack.

Figure 43:
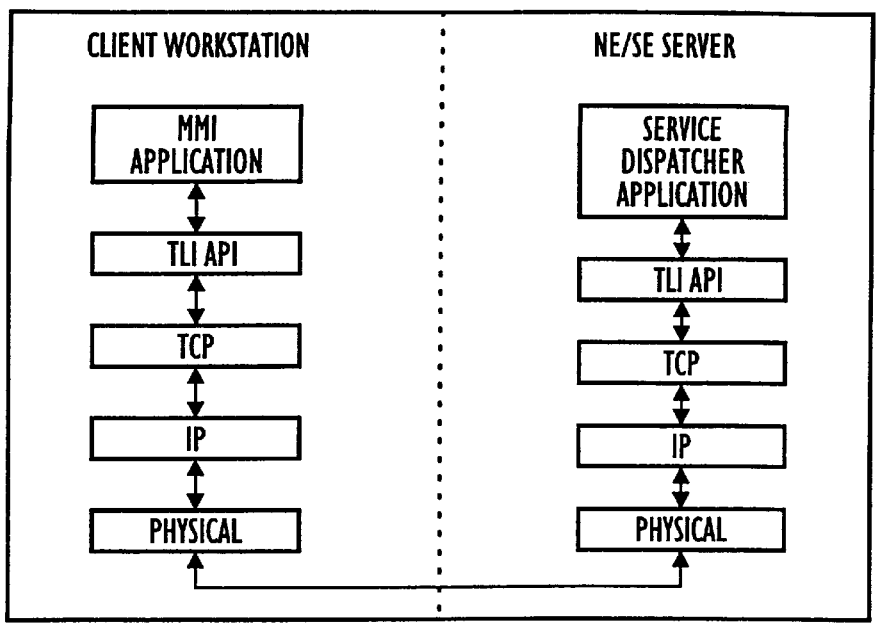
FIG. 43 is an illustration of the client-server inter-process protocol.

Applications may have components that reside on both the MMI workstation and the Application/Database server. A method of inter-process communication across nodes is implemented for applications not directly accessing the Oracle database. The Solaris operating system Transport Layer Interface (TLI) applications programming interface (API), provide for inter-application messaging. FIG. 43 is an illustration of the client-server inter-process protocol.

Figure 44:
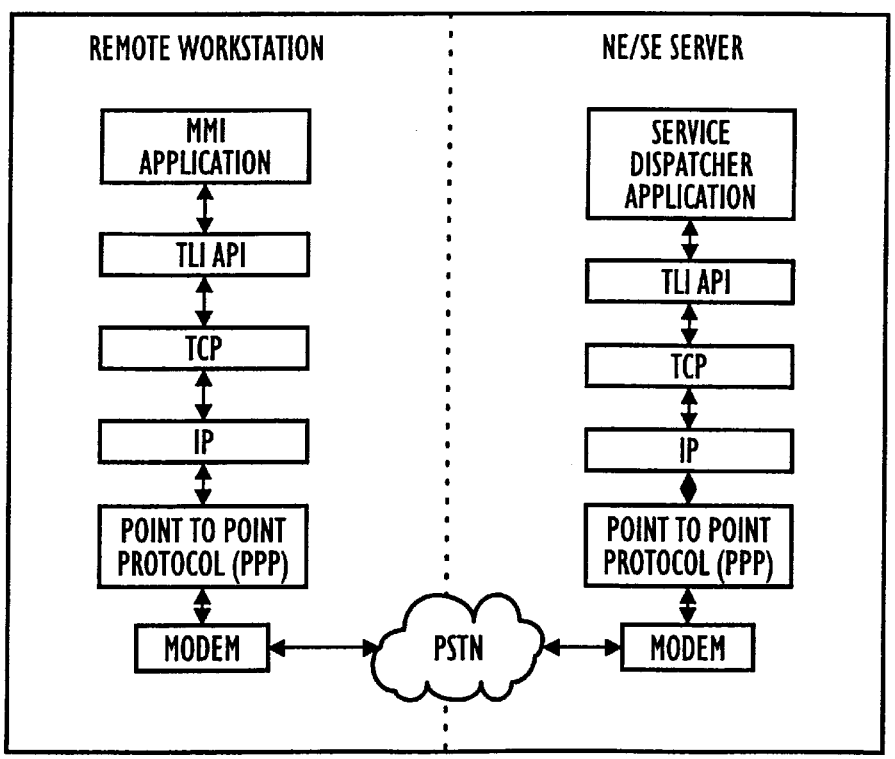
FIG. 44 is an illustration of the remote client-server inter-process protocol.

For optional remote workstations, the upper layer communication is the same, however the physical and link level are achieved via modems and point-to-point protocol (PPP). FIG. 44 is an illustration of an exemplary remote client-server inter-process protocol.

Figure 45:
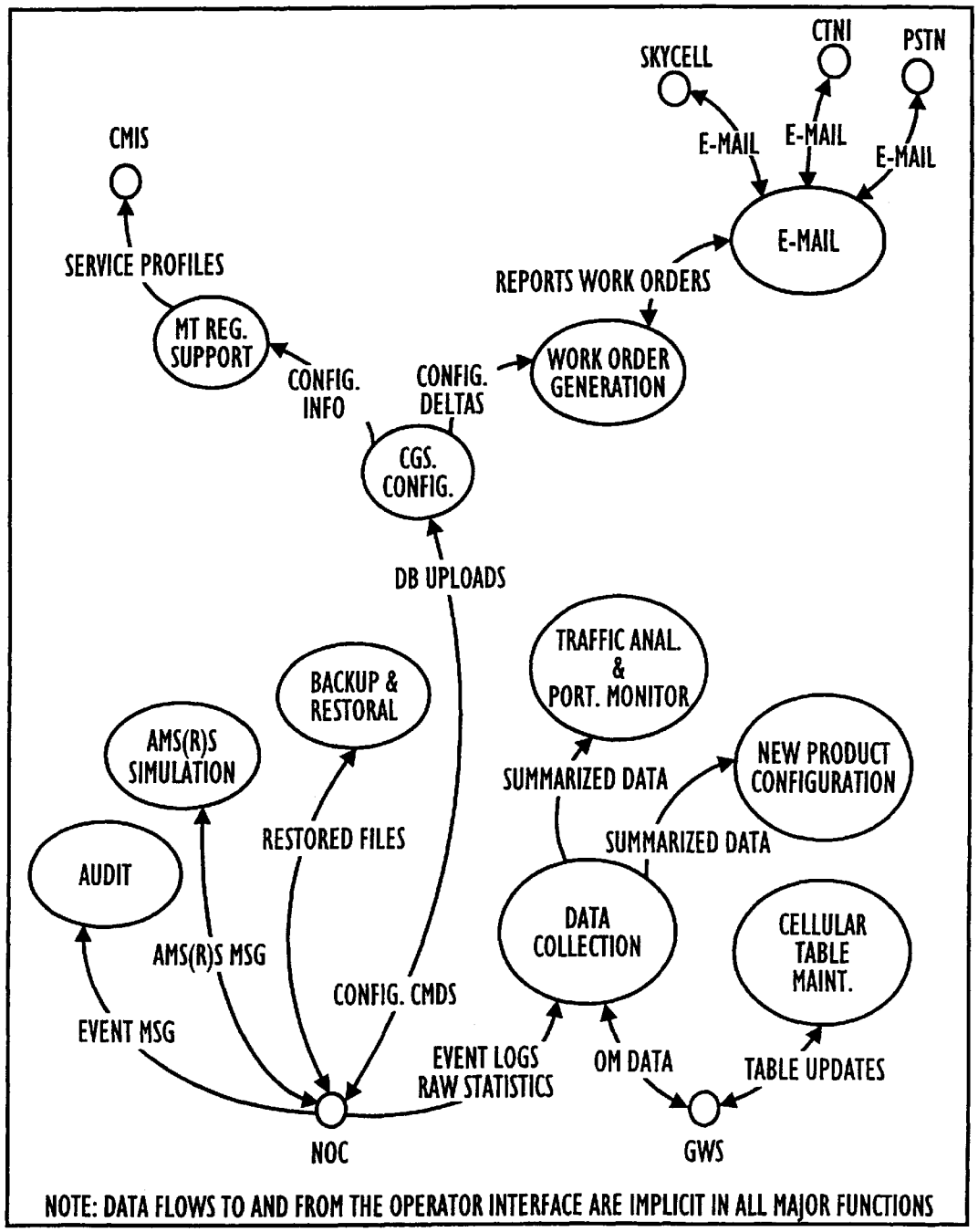
FIG. 45 illustrates the functional relationships and primary data flows between the major NE/SE functions.

FIG. 45 illustrates the functional relationships and primary data flows between the major NE/SE functions. Configuration of the CGS is central to NE/SE functionality. The outputs of the configuration functions, either directly or via engineering reports, provide information for the Work Order Generation, MET Registration Support, and Cellular Table Maintenance functions. CGS configuration updates are sent to the NOC for distribution.

Figure 46:
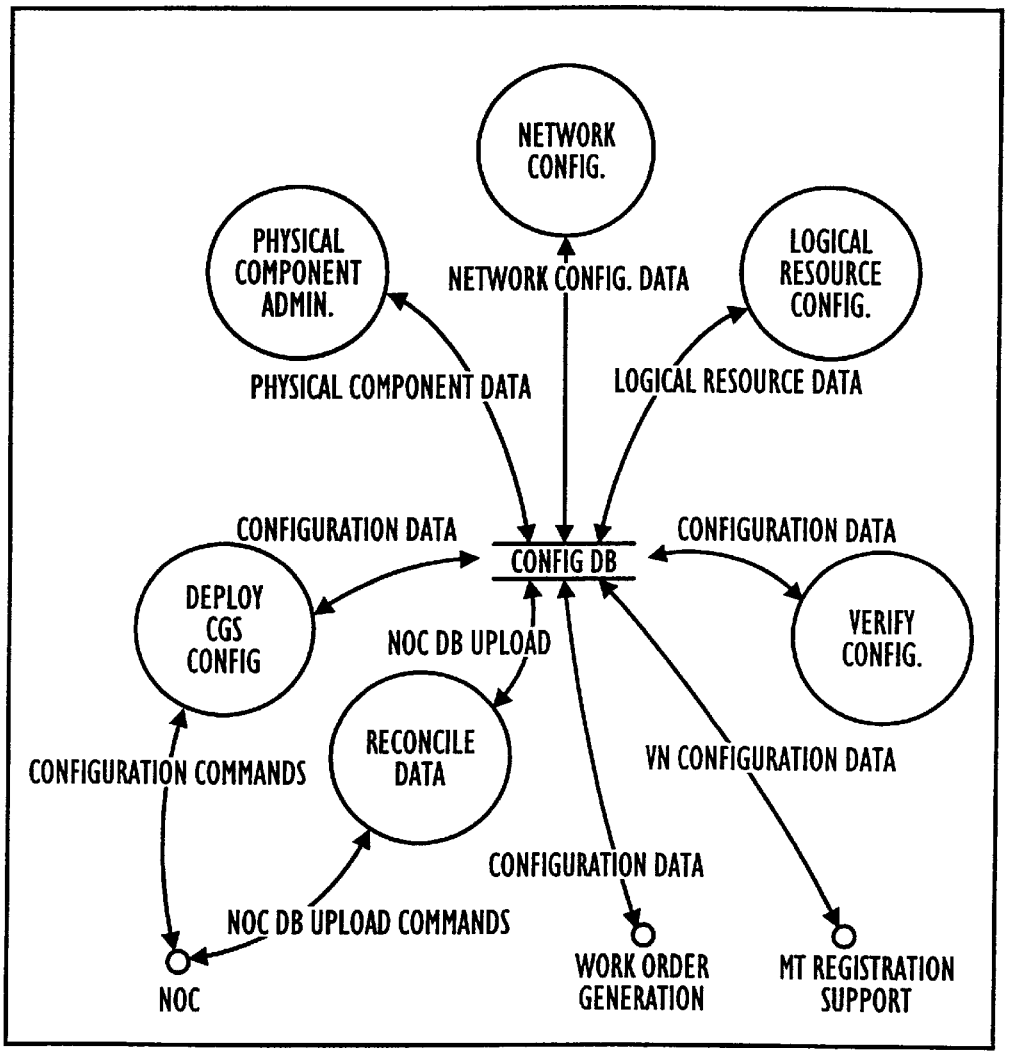
FIG. 46 is a data diagram on the interactions among configuration functions.

The NE/SE also optionally collects and analyzes traffic and performance data from CGS network components and provides engineering reports, management reports, and input to the New Product Configuration process. The NE/SE organization also optionally communicates with Cellular Telephone Network Associations, and Public Switched Telephone Network agency's via Electronic Mail. FIG. 46 is an exemplary data diagram on the interactions among configuration functions.

The CGS Configuration function configures the CGS network, the logical resources of the network, and the physical components of the network by creating and making available this configuration data in the configuration database. Once provisioned, a set of configuration data can be verified against user defined "configuration rules, then deployed to the NOC for distribution. The Reconcile Data function is then called to maintain consistency between the NOC database and the NE/SE database.

Logical Resource Configuration

The Logical Resource Configuration function is broken down into two activities: administration task which is concerned with creating and making a particular resource available and provisioning task which defines the behavior of a resource. The major traffic bearing service elements of CGS (satellites, beams, and control groups) are partitioned into resources such as circuit pools, virtual networks and frequency plans. The Logical Resource Configuration function, administers and provisions the above resources by performing the following tasks:

Assigning identifiers or key values during resource creation
Asserting attribute values to establish the behavior of the resource
Updating a local version of the CGS configuration database.

An updated CGS configuration database, stored within the NE/SE system, is implemented by instructing the NOC to update the configuration of the affected service elements.

Network Backup and Restoral Support

Network configuration data stored within the NE/SE system is partitioned in such a manner that multiple versions of the network configuration can be pre-defined and deployed in cases of disaster, equipment outage, or overload conditions. Traffic data analysis and performance reports support the engineer in planning for such conditions.

Mobile Terminal (MT) Registration Support

The NE/SE system administers and provisions a set of service offerings called Service Profiles which associate attribute values for various service elements with Virtual Network (VN) dialing plans (e.g., NCC information, GWS default parameters, etc . . . ) This is done by:

Creating a Service Profile via operator input;
Instructing the NOC to configure affected service elements
Making the new profile available to CMIS for assignment.

The NE/SE system defines MT PVT parameters (limits, thresholds, etc . . . ) on a per Control Group (CG) basis and pass these parameters to the NOC as a part of the CG configuration process.

Cellular Table Maintenance

The NE/SE engineer administers routing and dialing plans that are embedded within the GWS by using a remote Maintenance Administrative Position (MAP) terminal emulation device. The interaction is done manually by performing table edits in the "native mode" language of the GWS.

Aeronautical Mobile Satellite (Route) Service (AMS(R)S) Planning

The CGS system can be requested to relinquish control of portions of its allocated frequency spectrum to the Aeronautical Mobile Satellite (Route) Service (AMS(R)S). Using the resource configuration capabilities of the NE/SE system, a block of full period channels and a reserve pool of channels are allocated for use by AMS(R)S. To test the NOC's ability to respond to AMS(R)S requests both for allocated channels and for emergency channels, the NE/SE simulates AMS(R)S requests to the NOC.

Physical Component Administration

The NE/SE system administrates network components such as NAPs, Channel Units, etc., by providing the NOC with the information required to communicate with the component via the MSS inter-network. It also makes components known to other services via the Digital Name Server (DNS) network address, queue name, and/or unique name.

Audit and Reconciliation of Data

The NE/SE system uploads databases in bulk form from the NOC for comparison purposes. It also reads data on an item by item (or record by record) basis. To view existing NOC data, NE/SE engineering will use the remote NOC operator console. The NE/SE system will audit the CGS system by uploading NOC logs containing configuration events.

Network Configuration

The Communications Ground Segment is broken down into Network Communications Controllers (NCC), Feederlink Earth Stations (FES), and other major components. The NE/SE system will support the creation and provisioning of these network elements and their sub-systems to meet the traffic demands of a growing customer base. These major network elements represent the top-level view of the network, from a configuration perspective, and must be provisioned before any of their subtending resources can be configured.

NE/SE provisions the network logical and physical components to support the following functions:

New Products and Services Configuration
New Facilities Introduction and Validation
FES PVT Support
Data Collection NE/SE collects traffic and performance data from the GWS via the NOC. Data from the NCC, FES, TMS and DEC_VAX Performance statistics (PS) is forwarded to the NOC and collected via the NOC to NE/SE interface. This data is collected by using a (setable) polling schedule at the NE/SE and sending an "Unload Statistics" command to the NOC. The NE/SE polling schedule takes advantage of and conforms with the NCC/FES statistics collection interval at the NOC.

Traffic Analysis

Collected traffic data are summarized (hourly, daily and monthly) to provide engineering reports of network traffic. A pre-defined set of reports will be available as well as ad-hoc reporting capability. The summarized data can be stored/archived and available for off-line processing to system modeling, long term trading, and engineering reports.

Performance Monitoring

Performance data from the GWS, NCC, FES and Test and Monitoring Stations (TMS) are summarized hourly and daily to provide a short term view of network component performance. Event data from network components are also used for performance monitoring. The summarized data is stored and available to produce management and engineering reports. A predefined set of reports are available as well as ad-hoc reporting capability.

The following sub-sections describe the logical NE/SE external interfaces depicted in FIG. 25, NE/SE external interfaces. The NE/SE system contains three distinct physical LAN interfaces: CGS, CMIS, and Operator Interfaces (Workstations).

Customer Management Information System (CMIS) Interface

The NE/SE supports MET registration and new service offerings by associating virtual network characteristics, such as dialing and routing plans with a "Service Profile". The CMIS uses this Service Profile to supply Communications Ground Segment (CGS) with customer parameters when a new customer is added to the network. The NE/SE system defines a set of Service Profiles, and forward them to CMIS as new, or specialized service offerings are implemented.

Communications Ground Segment (CGS) Interface

The NE/SE communicates with the CGS Network Operations Center (NOC) via the Mobile Satellite Service (MSS) inter-network using Abstract Syntax Notation One (ASN.1) messages over DECnet Phase V Open Systems Interconnection (OSI) protocols. These messages are used to send configuration updates to the NOC as well as receive bulk file transfers and events from the NOC. Remote NOC (RNOC) operator (RNO) Man Machine Interface (MMI) is accomplished in an NE/SE workstation.

Gateway Switch (GWS) Interface

The NE/SE system uses terminal evaluation capabilities over the MSS inter-network to communicate with the GWS in its native mode MMI. The NE/SE engineer/planner queries and updates GWS tables manually via a remote Maintenance Administrative Position (MAP). Information received from the GWS will be printed or stored. The NE/SE system automatically polls for traffic and performance data by using a pre-defined schedule. The textual information received will be parsed and stored in a database for analysis and report generation. A single communications port on the GWS can be shared for NE/SE polling and remote MAP sessions.

NE/SE Operator Interface

The NE/SE engineers and planners will communicate with the NE/SE system via workstations connected to an NE/SE Local Area Network (LAN). This LAN will also be connected to the MSS inter-network. The workstation functions as operator interface for NE activities, SE activities, Remote NOC (RNOC) operator sessions, or remote terminal sessions with any other host system on the MSS internetwork given that the user has proper security authorization. In this document the operator, i.e. the person manning the NE/SE MMI, may also be referred to as "the engineer" or "the planner".

NE/SE Remote Workstation Interface

The NE/SE system includes "dial-up" capability to enable an engineer to communicate via a remote location. Using this interface the engineer is able to access a limited set of NE/SE functions that will be determined jointly by the customer and vendor during system design.

NE/SE groups similar resources into functional tasks to facilitate the management of CGS system level logical resources. This gives the NE/SE engineer the capability to configure the CGS network without regard to the data structures of the lower level support resources.

Satellite Power Management

The following functions define the manner in which resources are managed to allocate satellite power. Channel resources refers to the following resources: GC-S Channel, MT-SR Channel, MT-ST Channel, and Circuit Pool Segment.

1. The NE/SE provides the capability for the engineer to create and provision up to 8 Satellite Payloads per working configuration.

2. The NE/SE provides the capability for the engineer to create and provision up to 32 Satellite Beam Groups (SBGs) per Satellite Payload.

3. The NE/SE provides the capability for the engineer to create and provision up to 32 Beams per Satellite Payload.

4. The NE/SE provides the capability for the engineer to create and provision leased Frequency Usage Blocks (FUBs). Leased FUBs are FUBs whose fubType attribute equals "Leased".

5. The NE/SE insures that the sum of the power allocated to all SBGs associated with a Satellite Payload does not exceed the total power available to the Satellite Payload.

6. The NE/SE insures that the sum of the power allocated to all Beams associated with a SBG does not exceed the total power available to the SBG.

7. The NE/SE insures that the sum of the power allocated to all CG Beams and leased FUBs belonging to the same Beam does not exceed the total power available to the Beam.

8. The NE/SE provides the capability for the engineer to perform Beam power balancing by calculating CG Beam power for each CG Beam associated with a Beam based on the ratio of channels associated with the CG Beam vs. channels associated with the Beam.

9. The NE/SE provides the capability for the engineer to perform SBG power balancing by calculating Beam power for each Beam associated with an SBG based on the ratio of channels associated with the Beam vs. channels associated with the SBG.

10. The NE/SE provides the capability for the engineer to perform Satellite Payload power balancing by calculating SBG power for each SBG associated with a Satellite Payload based on the ratio of channels associated with the SBG vs. channels associated with the Satellite Payload.

11. The NE/SE permits the engineer to perform Beam, SBG, and Satellite Payload power balancing at any time during Satellite Power Management resource provisioning.

12. When SBG power balancing is performed, the NE/SE also performs Beam power balancing on al Beams within the selected SBG.

13. When Satellite Payload power balancing is performed, the NE/SE also performs SBG power balancing on all SBGs within the selected Satellite Payload.

14. The NE/SE permits the engineer to override the power values generated by power balancing.

15. The NE/SE provides the engineer with the capability to delete instances of the following resources from the working configuration, subject to referential integrity requirements: Beam, SBG, and FUB.

Satellite power allocation graph

The satellite power allocation graphs are used as an aid to the engineer during satellite power allocation.

1. The NE/SE provides the capability to generate graphical displays that show relative power allocated to:
  a. SBGs associated with a Satellite Payload
  b. Beams associated with a SBG
  c. CG Beams and leased FUBs associated with a Beam
  d. Control Groups within a Satellite Payload.

2. While the satellite power allocation graph is being displayed, the NE/SE maintains the display so that it constantly reflects the status of the working configuration.

Channel power allocation graph

The channel power allocation graph is used as an aid to the engineer during satellite power allocation—unlike the satellite power allocation graph described above, it is anticipated that this display would not be directly manipulated by the engineer.

1. The NE/SE provides the capability to generate a graphical display of power allocation to the individual channels defined by GC-S channels, and Circuit Pool Segments.

2. While the channel power allocation graph is being displayed, the NE/SE maintains the display so that it constantly reflects the status of the working configuration.

Control Group (CG) Configuration

This following processes describe the creation and provisioning of Control Groups (CGs).

1. The NE/SE provides a Control Group to be created only if there are Group Controllers (GC) already committed to the working configuration.

2. The NE/SE provides the capability for the engineer to create and provision up to 16 Control Groups per working configuration.

3. The NE/SE provides the engineer with the capability to delete instances of Control Groups from the working configuration, subject to referential integrity requirements.

L-Band Frequency Allocation

These requirements describe the allocation of signaling channel and communication channel frequencies in the CGS L-band frequency spectrum. Channel resources refers to the following resources: GC-S Channel, MT-SR Channel, MT-ST Channel, and Circuit Pool Segment.

1. The NE/SE provides the capability for the engineer to create and provision up to 32 Frequency Plans per Beam resource.

2. The NE/SE restricts the values of a Frequency Plan's minKuFreq, maxKuFreq, minL-Freq, and maxLFreq attributes according to the value of the Frequency Plan's fpDirection attribute as per the following relationships and the values defined in the table below, Table 1:

$$Ku_{min} \leq minKuFreq < maxKuFreq \leq Ku_{max}$$

$$L_{min} \leq minLFreq < maxLFreq \leq L_{max},$$

TABLE 1

| fpDirection | Frequency (MHz) | | | |
| --- | --- | --- | --- | --- |
| | $Ku_{min}$ | $Ku_{max}$ | $L_{min}$ | $L_{max}$ |
| Forward (a) | 13,000 | 13,150 | 1530 | 1559 |
| Forward (b) | 13,200 | 13,250 | 1530 | 1559 |
| Return | 10,750 | 10,950 | 1631.5 | 1660.5 |

3. The NE/SE permits a Frequency Plan to be committed to the working configuration only if the following relationship holds:

minKuFreq(n)−minLFreq(n)=minKuFreq(i)−minLFreq(i)

where minKuFreq(n) and minLFreq(n) represent the attribute values for Frequency Plan n that is being committed, and minKuFreq(i) and minLFreq(i) are the attribute values for any other Frequency Plan i in the working configuration having the same satelliteID, beamID, and fpDirection value as Frequency Plan n.

4. The NE/SE permits a Frequency Plan to be committed to the working configuration only if its Ku-band bandwidth does not overlap the Ku-band bandwidth of any other Frequency Plan previously committed to the working configuration that does not have the same satelliteID and beamID as the Frequency Plan being committed, i.e. the Ku-band bandwidth of Frequency Plans may only overlap if they are within the same satellite and beam. A Frequency Plan whose bandwidth ends at exactly N Hz is not considered to overlap a Frequency Plan whose bandwidth begins at exactly N Hz.

5. The NE/SE provides the capability for the engineer to create and provision up to a total of 5000 Frequency Usage Blocks (FUBs) per Beam research.

6. The NE/SE permits a FUB to be committed to the working configuration only if the frequency segment defined by the FUB does not overlap the frequency segment of any other FUBs which belong to the same beam. A FUB whose frequency segment ends at exactly N Hz is not considered to overlap a FUB whose frequency segment begins at exactly N Hz.

7. The NE/SE provides the capability for the engineer to create and provision GC-S Channels, MT-ST Channels, and MT-SR Channels up to the maximum shown below:

| Resource | Maximum per workinq configuration |
| --- | --- |
| GC-S Channel | 24 per Control Group |
| | 16 per Beam |
| | 256 total |
| MT-SR Channel | 48 per Beam per Control Group |
| | 72 per Control Group |
| | 1024 total |
| MT-ST Channel | 5 per GC-S Channel |

8. The NE/SE provides the capability for the engineer to create and provision up to 2048 Circuit Pools per working configuration.

9. The NE/SE provides the capability for the engineer to create and provision up to 40,000 Circuit Pool segments per working configuration.

10. The NE/SE permits a channel resource to be committed to the working configuration only if a Frequency Plan exists for the channel resource.

11. The NE/SE permits a channel resource to be committed to the working configuration only if the channel resource's channel bandwidth is fully contained within the frequency band defined by the channel's Frequency Plan.

12. The NE/SE permits a channel resource to be committed to the working configuration only if its Ku-band bandwidth does not overlap the Ku-band bandwidth of any other channel resource previously committed to the working configuration. A channel resource whose bandwidth ends at exactly N Hz is not considered to overlap a resource whose bandwidth begins at exactly N Hz.

13. The NE/SE provides the capability for the engineer to create and provision External Frequency Segments (XFSs). XFSs may overlap other XFSs both in frequency and in geography.

14. The NE/SE permits the bandwidths of channel resources and FUBs to overlap the frequency bandwidths defined by XFSs, subject to channel resource and FUB restrictions described above.

15. The NE/SE provides the engineer with the capability to delete instances of the following resources from the working configuration, subject to referential integrity requirements; Frequency Plan, Circuit Pool, Circuit Pool Segment, GC-S Channel, MT-SR Channel, MT-ST Channel, FUB, and XFS.

L-Band frequency allocation graphical display

The L-band frequency allocation graph is used as an aid to the engineer during frequency planning.

1. The NE/SE provides the capability of generating an L-band frequency allocation graph showing all allocated channel resources, FUBs, and XFSs in the working configuration across the CGS L-band frequency spectrum defined by Frequency Plans. At a minimum, the graph includes a horizontal axis indicating the range of frequencies being displayed and shaded blocks to indicate the position and extend of channel resources, FUDs, and XFSs relative to their frequency bandwidths.

2. When displaying the L-band frequency allocation graph, the NE/SE provides the engineer with the capability to select (i.e. filter) resources based on resource characteristics.

3. When displaying the L-band frequency allocation graph, the NE/SE provides the engineer with the capability to highlight the filtered resources or to display only the filtered channels.

4. While it is being displayed, the NE/SE maintains the L-band frequency allocation graph so that it constantly reflects the working configuration.

Beam geography graphical display:

The beam geography graph is used as an aid to the engineer during frequency planning.

1. The NE/SE provides the capability of generating a beam geography graph showing the geographical position of all Beams and XFSs in the working configuration. At a minimum the geographical display shall show a map of major North American land masses and bodies of water, with Beam and XFS positions superimposed over the map.

2. When displaying the beam geography graph, the NE/SE provides the engineer with the capability to select (i.e. filter) Beams and XFSs based on resource characteristics.

3. When displaying the Beam geography graph, the NE/SE provides the engineer with the capability to highlight the filtered channels or to display only filtered resource.

4. While the beam geography graph is being displayed, the NE/SE maintains the display so that it constantly reflects the working configuration.

Network Control Center (NCC) Configuration

The following processes describe the provisioning of an NCC. A NCC is responsible for managing the real time allocation of circuits to mobile terminals for the purposes of supporting communications. The available circuits are held in circuit pools assigned to group controllers (GC's) within the NCC.

1. The NE/SE configures a NOC and creates an NCC prior to beginning the configuration of the selected NCC.

2. The NE/SE provides the capability for the engineer to assign a configured RFE to the selected NCC.

3. The NE/SE provides the capability for the engineer to create and provision at least one Group Controller per NCC.

4. The NE/SE provides the engineer with the capability to delete an instance of a GC resources from the working configuration, subject to referential integrity requirements.

5. The NCC and its resources are displayed and manipulated in graphical form with the use of icons.

Feederlink Earth Station (FES) Configuration

The following processes describe the provisioning of an FES. The FES establishes communications links between Mobile Terminal's (MT's), public service telephone networks (PSTN's)/private networks (via GWS's), and other MT's. The FES/GWS is the portal through which a call is connected to/from the satellite and terrestrial resources.

1. The NE/SE provides the capability for the engineer to assign a configured RFE to the selected FES.

2. The NE/SE provides the capability for the engineer to create, provision and assign a GWS with all its subtending resources (Log and CDR).

3. The NE/SE provides the capability for the engineer to create and provision up to 16 FES Routing List resources per FES.

4. The NE/SE provides the capability for the engineer to create and provision up to 16 FES Routing List Items per FES Routing List.

5. The NE/SE provides the capability for the engineer to assign the above GWS to the selected FES.

6. The NE/SE provides the engineer with the capability to delete instances of the following resources from the working configuration, subject to referential integrity requirements: GWS, Log, CDR, FES Routing List, and FES Routing List Item.

7. The FES and its resources are displayed and manipulated in graphical form with the use of icons.

Radio Frequency Equipment (RFE) Configuration

The following processes outline the provisioning of an RFE. An RFE is associated with a group of channel units and may be assigned to an individual FES/NCC or shared by each. The main function of the RFE is to receive signals from the satellite and pass them on to a channel unit and to take signals from channel units and send them to the satellite.

Channel Unit Subsystem (CUS) Configuration

The following processes describe the provisioning of resources associated with the physical and logical allocation of channel unit subsystems (CUSs). A CUS contains 2 NAP's (primary and backup) and a bank of 24 IM channel units. Channel units can be configured as communication channel units (CCUs) in a FES; Cell sites and Cell Site Sectors define a Gateway Switch's (GWS) logical view of the CCUs while Channel Unit Pools (CUPs) define the CGS's logical view of the CCUs. Channel units are also configured for use as signaling channel units (SCUs) in an NCC.

1. The NE/SE provides the capability for the engineer to create and provision CUSs, CUS CUs, Channel Unit Pools, and Cell Sites in an FES per the limits shown blow in Table 3:

TABLE 3

| RESOURCE | MAXIMUM |
|---|---|
| Cell Sites | 13 per FES |
| Cell Sites Sector | 6 per Cell Site |
| CUS | 5 per Cell Site |
| CUS CU | 24 per CUS |
| | 118 per Cell Site |
| | 118 per Cell Site Sector |
| Channel Unit Pool | 256 per FES |

2. For any Cell Site whose cellSiteType=OMNI, the NE/SE provides the capability for the engineer to create and provision 1 Cell Site Sector per Cell Site; for any Cell site whose cellSiteType=Sectored, the NE/SE provides the capability for the engineer to create and provision 6 Cell Site Sectors per Cell Site. Although in the GWS, an OMNI cell site has no sectors, for the purposes of provisioning NE/SE resources an OMNI cell site is considered to be a cell site with a single sector.

3. The NE/SE provides the capability for the engineer to create and provision CUSs and CUS CUs in an NCC as per the limits shown in Table 4.

TABLE 4

| RESOURCE | MAXIMUM |
|---|---|
| CUS | 65 per NCC |
| CUS CU | 24 per CUS |

4. The NE/SE provides the capability for the engineer to modify instances of the following resources in the working configuration, subject to referential integrity requirements: CUS, CUS CU, Channel Unit Pool, Cell Site, and Cell Site Sector.

5. The NE/SE provides the capability for the engineer to delete instances of the following resources from the working configuration, subject to referential integrity requirements: CUS, CUS, CUS CU, Channel Unit Pool, Cell Site, and Cell Site Sector.

Test and Monitor Station (TMS) Configuration

These processes describe the creation and provisioning of a TMS resource. This includes establishing the identity of a TMS (RFM, RMS, STS) and assigning the resources it needs so it can be used for a specified purpose. For example, an RFM may be used in the calibration of an RFE. It may be also used in the commissioning of the channel units assigned to an FES and or NCC. A TMS may also be used to validate MT's and test call routing through satellite and terrestrial links. An RMS monitors L-Band RF spectrum and transmission performance in specific L-band beams. The STS provides an L-Band network access capability to support FES commissioning tests and network service diagnostic tests.

1. The NE/SE provides the capability for the engineer to create and provision a TMS.

2. The NE/SE provides the capability for the engineer to assign this TMS to a fully provisioned RFE.

3. The NE/SE provides the capability for the engineer to assign this TMS to a fully provisioned FES (or NCC), in conjunction with the assignment of an RFE.

4. The NE/SE provides the engineer with the capability to create and provision a TMS Satellite resource per TMS.

5. The NE/SE provides the engineer with the capability to create and provision a TMS MT Calibration resource per TMS.

6. The NE/SE provides the engineer with the capability to delete instances of the following resources from the working configuration, subject to referential integrity requirements: TMS, TMS Satellite, and TMS MT Calibration.

Support Resources

Each individual resource configuration requirement contains a Provisioning Criteria Table (PCT) that defines the manner in which the resource's attribute values are set. The NE/SE creates an interim instance of a resource that is provisioned and which can then be committed to the working configuration. The PCT contains column headings defined as follows:

Attribute Name of an attribute of the resource. An asterisk ("*") next to an attribute name indicates that the attribute is a key for the resource in the NOC database. A number sign ("#") next to an attribute name indicates that the attribute is a suggested key for a resource that is only managed by the NE/SE.

Generation Defines how the value of the attribute is generated for each new instance of the resource; a resource's PCT entry for Generation will be either Manual or Automatic.

Modify Indicates whether the attribute value may be modified once the resource is committed to the working configuration; a resource's PCT entry for Modify will be either Yes or No.

Selection Indicates the manner in which the entry of the attribute's value is performed by the engineer; a resource attribute's PCT entry of Selection will be either Range, test, or Choice, unless the attribute's Modify field is No, in which case Selection will be n/a.

Significantly, the NE/SE systems includes the following rule based processes for provisioning specific resources pertaining thereto.

1. When a new interim resource is created, the NE/SE provides a default value to each attribute whose PCT Generation field is "Manual". The default value of an attribute is either Last Used or the Template Value. Last Used indicates that the default value of an attribute is the last value of the attribute committed to the working configuration. Template Value indicates that the default value of the attribute is defined for the attribute in a template of attribute defaults.

2. The NE/SE allows the engineer to specify whether a new interim resource's attributes default to Last Used or Template Value. The NE/SE engineer has the capability of switching between Last Used and Template Value at any time during resource provisioning. Until an attribute's value is committed (when its owner resource is committed), the attribute defaults to Template Value, even if the engineer specifies Last Used.

3. The NE/SE indicates to the engineer an attribute's default value when an interim resource is created for the attribute's resource. (To further clarify; this requirement indicates that if attributes are entered via a data entry screen, the data fields for each attribute on the screen contain a default value when a new interim resource's screen is first displayed.)

4. The NE/SE provides a means for the engineer to load attribute default templates. The NE/SE provides a means for the engineer to copy and modify existing attribute default templates.

5. The NE/SE provides a baseline attribute default template which is loaded at NE/SE startup. It is desirable to restrict write access to this baseline template to engineers with special access privilege.

6. When a new interim resource is created, the NE/SE automatically generates a value for each resource whose PCT Generation field is "Automatic". An attribute value that is automatically generated adheres to the value constraints contained in both the Attribute Dictionary (AD) and the PCT for the attribute.

7. When the NE/SE automatically generates an attribute value for a new interim resource, the attribute value is the smallest valid attribute value that is not currently in use in the working configuration, as constrained by the attribute's PCT Additional Constraints entry and the attribute's AD entry, unless this requirement is explicitly superseded by a resource's requirements.

8. When the NE/SE automatically generates an attribute value for a new interim resource, the attribute value meets any further constraints imposed upon the attribute value by the resource's requirements.

9. The NE/SE does not permit modification of the attribute value of a committed resource if the attribute's PCT Modify field contains "No". An attribute in a newly-created interim resource whose PCT Modify field contains "No" may be modified before the resource is committed for the first time.

10. The NE/SE permits modification of the attribute value of a committed resource if the attribute's PCT Modify field contains "Yes". Any modification of a committed resource's attributes adheres to the resource's constraints, and shall not be considered part of the working configuration until the changes to the resource are committed to the working configuration.

11. The NE/SE displays a textual list of choices instead of (or in addition to) a range of numeric values for any attribute whose Value Constraints field in the AD contains quoted text associated with discrete integer values. For example, a cpType prompt should present to the user a list of the choices "Demand Period—Free Pool", "Demand Period—Reserved Pool", and "Full Period", not only the range or list of the values 0, 1, and 2 which correspond to these choices.

12. The NE/SE commits an interim resource to the working configuration by explicit command. This is separate from the action of creating the resource. The NE/SE allows an interim resource to be committed to the working configuration only if each attribute in the interim resource meets the constraints defined for that resource and its attributes.

13. The NE/SE satisfies all dependency relationships between resources in a working configuration when adding, modifying, or deleting resources. A parent resource is deleted if it has children resources only after requesting confirmation from the engineer. A resource is not deleted if another resource has foreign keys that associated with the resource to be deleted, except as described above.

14. The NE/SE maintains a template of component constraints for all attributes. It is required that the NE/SE permit modification of component constraint templates only by an individual with proper privileges.

15. For those attributes whose Resolution field in the AD contains an entry, the NE/SE prompts the engineer for the attribute value in the resolution units of the attribute, or in a scalar variation of the resolution units. For example, consider an attribute which has an AD Value Constraint entry of "1,000,000 thru 60,000,000" and a Resolution entry of "100 nsecs" (100 nanoseconds). Rather than request that the engineer provide an attribute value in 1,000,000 to 60,000,000 100 nanosecond units, the NE/SE may request a float value of 0.1 seconds to 6.0 seconds, or an integer value of 100 milliseconds to 6000 milliseconds, however, the attribute's value is entered, it is ultimately converted to a value in the range 1,000,000 to 60,000,000 before being downloaded to the NOC.

16. The NE/SE provides an indication of the value constraints and (for those attributes whose Resolution field in the AD contain an entry) the resolution of an attribute. For example, the AD shows that the tml attribute has a resolution of 0.5 seconds and a value constraint (expressed in terms of the range of values that can be sent to the NOC) of 0 thru 15. The NE/SE indicates to the engineer that tml may be entered as a value from 0.0 to 7.5 seconds in discrete 0.5 second increments. (For an attribute with such a relatively small number of discrete values in the range, a menu listing all possible values would be acceptable). The value entered is converted to a value of 0 to 15 before it is downloaded to the NOC.

17. The NE/SE permits an attribute's value to be entered only via selection from a list of explicit choices if the attribute's Selection entry in the PCT is "Choice".

18. The NE/SE permits the engineer to enter ASCH text for attributes whose Selection entry in the PCT is "Text". The maximum length of the text field that may be entered by the engineer for a given attribute shall be the length of the character array defined for the attribute in the AD, less one character for a terminating NULL (ASCH value 0), which must terminate all text entries sent to the NOC.

19. The NE/SE indicates to the engineer the permitted range of values for an attribute whose Selection entry in the PCT is "Range". A PCT Selection entry of Range is not precluded entry of the attribute's value from a list of choices.

20. When an attribute's Additional Constraint PCT entry has the form "Select from R resources" (where R names a resource), the NE/SE provides the capability for the engineer to specify the attribute's value by selecting from the list of the attribute's values defined in the R-type resources already committed to the working configuration. For example, the Antenna resource's rfeID additional Constraint states "Select from RFE resources"; this indicates that the value of rfeID in the Antenna resource is selected from the list defined by the values of rfeID in all of the RFE resources currently committed to the working configuration.

21. When an attribute's Additional Constraint PCT entry has the form "not used when A=v" (where A names another attribute and v is a value of attribute A), the NE/SE does not require the engineer to enter a value for the attribute if the condition A=v exists in the interim resource.

23. When an attribute's value is not required to be supplied by the engineer, the NE/SE supplies a valid value for the attribute when the attribute's resource data is sent to the NOC if the NOC requires that the attribute value be provided in the message.

The following describes the basic considerations for the NE/SE system when creating and provisioning specific resources including components in the CGS system, components of the MET, and the like.

The NE/SE system provisions an antenna (ANT) resource. An antenna is the part of the RFE that is used to interface with the satellite. The NE/SE provides the capability for the engineer to provision an antenna by setting the values of the standard attributes. The attributes include, for example, rfeID, antID, antDeicingMode, antDeicingRflType, and the like.

The antenna control unit (ACU) is the part of the RFE that controls the functioning of the antenna. The NE/SE provides the capability for the engineer to provision the antenna control unit by setting the values of the attributes listed in the ACU Provisioning Criteria Table (PCT). The NE/SE also provides the engineer with the capability to add an ACU to the working configuration. Attributes include rfeID*, acuID*, acuControl, acuOnlineState, ephempointl, and the like.

A Beam resource identifies characteristics about a particular satellite beam. The NE/SE provides the capability for the engineer to provision a Beam by setting the values of the attributes listed in the Beam Provisioning Criteria Table (PCT). The NE/SE also provides the engineer with the capability to add Beams to the working configuration. Attributes include satelliteID*, beamID*, beamGroupID, beamEIRP, sbgID, beamGeography, minLatitude, maxLatitude, minLongitude, maxLongitude, and the like.

A call detail record (CDR) represents a gateway switch (GWS) defined 'Call Record ID' for CDR's sent from the GWs to the NOC. The NE/SE provides the capability for the engineer to provision a CDR Control by setting the values of the attributes listed in the CDR Control Provisioning Criteria Table (PCT). The NE/SE also provides the engineer with the capability to add a CDR Control to the working configuration. Attributes include gwsID*, cdrControlID*, and the like.

A Cell Site defines a logical grouping of channel unit subsystems (CUSs) used by the Gateway Switch (GWS) to identify channel units. The Cell Site resource is generally maintained only at the NE/SE—it is not downloaded to the NOC. The NE/SE provides the capability for the engineer to provision a Cell Site by setting the values of the attributes listed in the Cell Site Provisioning Criteria Table (PCT). The NE/SE also provides the engineer with the capability to add Cell Sites to the working configuration. Attributes include fesID#, cellSiteID#, cellSiteType, and the like.

A Cell Site Sector defines a logical grouping of channel units (CUS) within a cell site—for sectored Cell Sites, the Gateway Switch (GWS) uses Cell Site Sectors to identify channel units. The Cell Site Sector resource is generally maintained only at the NE/SE—it is not downloaded to the NOC. The NE/SE provides the capability for the engineer to provision a Cell Site Sector by setting the values of the attributes listed in the Cell Site Sector Provisioning Criteria Table. The NE/SE also provides the engineer with the capability to add Cell Site Sectors to the working configuration. If the Cell Site Sector is associated with a Cell Site whose cellSiteType=OMNI, then the NE/SE automatically provisions the cuSector attribute to a value of 0. ii Although in the real world an OMNI cell site has no sector, for the purposes of provisioning NE/SE resources an OMNI cell site is considered to be a cell site with a single sector. If the Cell Site Sector is associate with a Cell Site whose cellSiteType—Sectored, then the NE/SE automatically provisions the cuSector attribute with a value that is unused by any other Cell Site Sector having the same fesID and cellSiteID attribute values. Attributes include fesID#, cellSiteID#, cuSector#, cupID, and the like.

The following describes the creation and provisioning of a CG (Control Group) Beam resource. A CG Beam identifies the beams that are available to a control group and serves as a junction between control group and beam. It is used to accommodate the many-to-many relationship that exists between control groups and beams—each control group may use resources provided by many beams and each beam may provide resources to many control groups. A CG Beam is also used to define power allocation to a CG within a Beam. The NE/SE provides the capability for the engineer to provision CG Beam by setting the values of the attributes listed in the CG Beam Provision Criteria Table (PCT). Each time a fully provisioned Control Group is committed to the working configuration, the NE/SE creates and provision CG Beams as required to insure that there is a CG Beam for every possible combination of Control Groups and Beams in the working configuration—i.e., a CG Beam is defined for every possible combination of the new Control Group's controlGroupID attribute with each existing Beam's beamID/satelliteID attribute pair. Each time a fully provisioned Beam is committed to the working configuration, the NE/SE creates and provisions CG Beams as required to insure that there is a CG Beam for every possible combination of Beams and Control Groups in the working configuration—i.e., a CG Beam is defined for every possible combination of the new Beam's beamID/satelliteID attribute pair with each existing Control Group's controlGroupID attribute. Attributes include satelliteID*, beamID*, controlGroupID*, beamGroupID, cgEIRP, and the like.

A Channel Unit Pool contains the channel unit group configuration and status for an FES. Channel Unit Pool represents the availability and usage profile for communications channels. Channel Unit Pools consists of one or more communications channel units that are physically identical and co-located at one FES. These communications channel units have access to only one satellite. Information maintained for Channel Unit Pools in the NOC configuration database consists of the number of communications channel units configured for a Channel Unit Pool. The NE/SE provides the capability of the engineer to provision a Channel Unit Pool by setting the values of the attributes listed in the Channel Unit Pool Provisioning Criteria Table (PCT). The NE/SE provides the engineer with the capability to add Channel Unit Pools to the working configuration. A Channel Unit Pool is committed to the working configuration only when it is fully provisioned. Attributes include cupID*, fesID*, cupType, cuConfigurationCount, cuAvailableCount, controlGroupID, satelliteID, and the like.

A Channel Unit Subsystem (CUS) consists of a number of channel units. A duplex NAP (one on-line and one as backup) with associated channel units, is required to provide minimum signal processing functions. The NE/SE provides the capability of the engineer to provision a CUS by setting the values of the attributes listed in the CUS Provisioning Criteria Table (PCT). The NE/SE provides the engineer with the capability to add a CUS to the working configuration. Attributes include nccID, fesID, cellSiteID, cellSiteType, cusIDInCell, napvar, and the like.

A Channel Unit Subsystem Channel Unit (CUS CU) provides baseband signal processing functions for the data stream and the modulation/demodulation of these signals to an IF carrier for transmission/reception via the satellite. The NE/SE provides the capability of the engineer to provision a CUS CU by setting the values of the attributes listed in the CUS CU Provisioning Criteria Table (PCT). CUS CUs belonging to an FES may be associated with Cell Sites—the CUS CU's fesID and cellSiteID are defined by the values of fesID and cellSiteID in the CUS selected by the value of cusID in the CUS CU interim resource. The NE/SE permits the engineer to provision the CUS CU attributes cuSector and bstNumber only if the following conditions are met in the interim resource:

a. associateType=FES in the CUS specified by cusID b. cuSoftwareType=CCU or cuSoftwareType=NRCU When the engineer is permitted to provision the bstnumber attribute, the NE/SE insures that each CUS CU has a unique bstnumber value within the CUS CU's Cell Site. A CUS CU's Cell Site is defined by the CUS CU;s fesID and cellSiteID. When the engineer is permitted to provision the cuSector attribute, the NE/SE allows the engineer to select the cuSector from the cuSector values defined by the Cell Site Sectors associate with the CUS CU's Cell Site. The Cell Site Sectors associated with the CUS CU's Cell Site are defined as those Cell Site Sectors having the same fesID and cellSiteID as the CUS CU resource. When the engineer is permitted to provision the cuSector attribute, the NE/SE automatically provisions the value of cupID using the value of cupID defined by the CUS CU's Cell Site Sector. The CUS CU's Cell Site Sector is selected by the CUS CU's fesID, cellSiteID, and cuSector values. When the NE/SE automatically provisions the CUS CU's cupID, it also automatically provisions the value of controlGroupID using the value of controlGroupID defined by the CUS CU's channel Unit Pool. The CUS CU's Channel Unit Pool is selected by the CUS CU's cupID and fesID. Attributes include cusID*, cuID*, cuSoftwareType, cuCommandedState, bstNumber, cuSector, cupID, controlGroupID, serialNumber, sparingMask, rxCGID, txCGID, satelliteDelay, and the like.

A circuit pool represents one or more frequency segments from which calls can be set up. There are three different circuit pool types: 1) Demand Period—Free Pool; 2) Demand Period—Reserved Pool; 3) Full Period. Each pool type is made available to one or more virtual networks. The NE/SE provides the capability of the engineer to provision a Circuit Pool by setting the values of the attributes listed in the Circuit Pool Provisioning Criteria Table (PCT). The NE/SE provides the engineer with the capability to add Circuit Pools to the working configuration. Attributes include controlGroupID*, cpID*, cpType, cpCommandedState, and the like.

A Circuit Pool Segment describes the size and usage characteristics of a specific frequency segment within a circuit pool. Usage characteristics include base frequency channel size, number of channels, source, intended destination, and actual destination for a specific frequency segment. For Circuit Pool Segments, if this frequency value will always represent a Ku-band value. The GC will take the Ku-band value in the segment and translate it to a corresponding L-Band value using the Frequency Plan as a translation table. For Circuit Pool Segments whose cpDirection="Forward/Reverse", the Circuit Pool Segment defines forward and reverse channel pairs, with each reverse channel's Ku-band frequency offset by the value of the revFreqOffset attribute from the forward channel frequency. The NE/SE provides the capability of the engineer to provision a Circuit Pool Segment by setting the values of the attributes listed in the Circuit Pool Segment Provisioning Criteria Table (PCT). Attributes include cpSegmentID*, cpID*, satelliteID*, beamID*, controlGroupID*, cpDirection, frequency, revFreqOffset, freqStepSize, channelspacing, numberOfChannels, withheldChannels, conditionFlag, cpSource, cpCurrentDestination, cpOriginalDestination, allocationOrderFlag, collectionID, and the like.

A Control Group is a means of partitioning the resources and elements of the MSS system. It consists of a pool of satellite resources and METs and FESs that use those resources. In particular, a control group describes circuit pools, signaling channels, virtual networks, and control group operating parameters. The NE/SE provides the capability of the engineer to provision a Control Group by setting the values of the attributes listed in the Control Group Provisioning Criteria Table (PCT). Attributes include controlGroupID*, gcID*, nccID, cgCommandedState, circuitPoolQueueing, mgspGCS, mtPVT, mtinitialization, mtAuth, callAnnounce, circuitPoolMonitorInterval, virtualNetMonitorInterval, outOfBandMonitorInterval, interstationMonitorInterval, mtLogonMonitorInterval, mtTestMonitorInterval, mtCommCUMonitorInterval, and the like.

The down converter (DCN) is the part of the RFE that receives the incoming signal from the low noise amplifier and passes it to the IF subsystem. The NE/SE provides the capability for the engineer to provision a DCN by setting the values of the attributes listed in the DCN Provisioning Criteria Table (PCT).

The FES Configuration describes physical and administrative attributes, and current commanded state data for an FES. The NE/SE provides the capability for the engineer to provision a FES Configuration by setting the values of the attributes listed in the FES Configuration Provisioning Criteria Table (PCT). Attributes include fesID*, alternateFES, gciChannelID, fesiChannelID, rfeID, numberOfChannelUnits, earthStationCmdedState, earthStationEIRP, earthStationFrequency, earthStationPointingData, fesResource, fullName, location, implementationDesc, and the like.

An FES-I Channel is used to transmit information from a FES to a GC. The NE/SE provides the capability for the engineer to provision a FES-I Channel by setting the values of the attributes listed in the FES-I Channel Provisioning Criteria Table (PCT). Attributes include fesiChannelID*, satelliteID*, controlGroupID*, interstationLinkType, frequency, fesiBW, commandedChannelState, and the like.

A Frequency Plan represents a translation table that is used to define Ku-to-L and L-to-Ku frequency translations for each Control Group within a Beam. The NE/SE provides the capability for the engineer to provision a Frequency Plan by setting the values of the attributes listed in the Frequency Plan Provisioning Criteria Table (PCT). Attributes include satelliteID*, beamID*, controlGroupID*, fpDirection#, minKuFreq*, maxKuFreq, minLFreq, maxLFreq, numberOfChannels, fpType, fpRank, and the like.

A GWS refers to the subscribers preferred ground carrier. This is the subscribers access into the terrestrial telecommunications networks. The NE/SE provides the capability for the engineer to provision a GWS by setting the values of the attributes listed in the GWS Provisioning Criteria Table (PCT). Attributes include gwsID*, fullName, implementationDesc, location, and the like.

A GC-I Channel is used to transmit information from a GC to an FES. The NE/SE provides the capability for the engineer to provision a GC-I Channel by setting the values of the attributes listed in the GC-I Channel Provisioning Criteria Table (PCT). Attributes include gciChannelID*, satelliteID*, controlGroupID*, interstationLinkType, frequency, gciBW, commandedChannelState, and the like.

GC-S channels are used to transmit information to a MET about MSS configuration, call announcements for incoming calls, and status information from bulletin board signaling units. GC-S channels are out-of-band signaling channels that transport fixed size (96-bit) signaling units. The NE/SE provides the capability for the engineer to provision a GC-S Channel by setting the values of the attributes listed in the GC-S Channel Provisioning Criteria Table (PCT). Attributes include gcsChannelID*, satelliteID*, beamID*, controlGroupID*, frequency1, frequency2, currentFreqDesig, gcsBW, uplinkPowerLevel, commandedChannelState, cusID, cuID, txType, callblocking, tdmChangeEnableFlag, and the like.

A GC consists of two major categories of functions: Group Resource Management Functions and Virtual Network Management Functions. A GC will interface to the MSS Internetwork to receive configuration definition for its Control Group (CG) from the NOC and to report Control Group operations status and service utilization back to the NOC. The NE/SE provides the capability for the engineer to provision a GC by setting the values of the attributes listed in the GC Provisioning Criteria Table (PCT). Attributes include nccID*, gcID*, gcCommandedState, and the like.

A high power amplifier (HPA) is a part of the RFE that takes the signal from the upconverter and passes it to the antenna subsystem for transmission to the satellite. The NE/SE provides the capability for the engineer to provision a HPA by setting the values of the attributes listed in the HPA Provisioning Criteria Table (PCT).

MT-SR channels are used by MTs to initiate MT originated actions such as call requests. MT-SR channels are out-of-band signaling channels. The NE/SE provides the capability for the engineer to provision a MT-SR Channel by setting the values of the attributes listed in IQ the MT-SR Channel Provisioning Criteria Table (PCT). Attributes include mtsrChannelID*, satelliteID*, beamID*, controlGroupID*, frequency, mtsrBW, commandedChannelState, cusID, cuID, channelFunction, and the like.

MT-ST Channels are used by MTs to transmit responses to messages received on a GC-S channel. Each MT-ST Channel is assigned to a specific GC-S channel. MT-ST Channels are out-of-band signaling channels. The NE/SE provides the capability for the engineer to provision a MT-ST Channel by setting the values of the attributes listed in the MT-ST Channel Provisioning Criteria Table (PCT). Attributes include gcsChannelID*, satelliteID*, beamID*, controlGroupID*, frequency, mtstBW, commandedChannelState, cusID, cuID, and the like.

A network control center (NCC) is responsible for providing overall Mobile Satellite Services (MSS) network management and central control of customer communications networks. The NCC manages access of users to the space resources allocated by the NE/SE to the NOC and on to the NCC. The NE/SE provides the capability for the engineer to provision an NCC by setting the values of the attributes listed in the NCC Provisioning Criteria Table (PCT). Attributes include nccID, rfeID, implementationDesc, location, nccCommandedState, and the like.

Network Operations Center (NOC)—The primary functions of a NOC will be to manage and control the resources of the MSS system. A NOC interfaces with internal and external elements. The NE/SE provides the capability for the engineer to provision a NOC by setting the values of the attributes listed in the NOC Provisioning Criteria Table (PCT). Attributes include nocID*, implementationDesc, location, nocCommandedState, and the like.

Radio Frequency Equipment (RFE)—A RFE contains all the equipment necessary to uplink signals to/receive signals from the satellite. It also passes signals to/receives signals from the NAP's (CU's). The NE/SE provides the capability for the engineer to provision a RFE by setting the values of the attributes listed in the RFE Provisioning Criteria Table (PCT). Attributes include rfeID*, implementationDesc, location, rfeControl, rfeOnlineState, and the like.

A Satellite Beam Group defines the power allocated to a group of beams on the satellite. The Satellite Beam Group resource is generally maintained only at the NE/SE—it is not downloaded to the NOC. The NE/SE provides the capability for the engineer to provision a Satellite Beam Group by setting the values of the attributes listed in the Satellite Beam Group Provisioning Criteria Table (PCT). Attributes include sbgID#, satelliteID#, sbgEIRP, and the like.

A Service Profile is a default set of customer assignment parameters. CMIS uses Service Profiles during MT registration. This information is not forwarded to the NOC by NE/SE. The NE/SE defines a Service Profile by setting the values of the attributes listed in the Service Profile Provisioning Criteria Table (PCT). Attributes include serviceProfileID#, creationDate, virtualNetworkID, controlGroupID, custgrp, msa, msr, profileDescription, and the like.

A test and monitor station (TMS) is used in the testing and calibration of the systems resources. Variants of a TMS are RFM, RMS, and STS. The NE/SE provides the capability for the engineer to provision a TMS by setting the values of the attributes listed in the TMS Provisioning Criteria Table (PCT). Attributes include tmsID*, tmsType, tmsCommandedState, tmsBeamID, intrusionAlarmCapable, smokeAlarmCapable, temperatureAlarmCapable, mtconfig, mtPhoneNumber, pstn1PhoneNumber, pstn2PhoneNumber, and the like.

A RMS (Remote Monitor Station) type TMS Satellite is used to pass the signals between the mobile terminal(s) (MT's) and the ground station(s). The NE/SE provides the capability for the engineer to provision a TMS Satellite by setting the values of the attributes listed in the TMS Satellite Provisioning Criteria Table (PCT). Attributes include tmsID*, satelliteID*, and the like.

A Virtual Network resource describes routing attributes, feature set permissions, and address screening attributes for virtual networks. The NE/SE provides the capability for the engineer to provision a Virtual Network by setting the values of the attributes listed in the Virtual Network Provisioning Criteria Table (PCT). Attributes include virtualNetworkID*, controlGroupID*, mtPSTNListID, mtMTMTListID, vnCommandedState, testVNFlag, msr, msa, custgrp, cpID, and the like.

Verify Configuration

These processes describe a means of performing verification checks on the configuration beyond the normal data integrity checking that is done when resources are committed to or deleted from the working configuration. These checks are intended to be performed on the overall configuration to provide a means of implementing general configuration integrity constraints. Usually these general integrity constraints will involve errors of omission rather than errors of commission. An example of an error of omission is if a GC-S channel is defined but there are no MT-ST channels assigned to the GC-S channel—this error would not be detected as part of the data integrity constraints applied to the creation and provisioning of the GC-S channel. NE/SE configuration verification does not mandate that errors be corrected—the engineer is free to ignore the warnings and implement the configuration.

1. The NE/SE provides the engineer with the capability to perform a configuration verification on the working configuration. The configuration verification check is based on a rules set in which each rule specifies the following:
   a. The range of resources or attributes to be considered;
   b. one or more conditions of the working configuration specified in terms of resources and resource attributes;
   c. a warning message generated if the condition is met.

For example, the following pseudo-code shows a configuration verification rule which is used to determine whether there is at least one MT-ST channel assigned to every GC-S Channel:

FOR all GC-S Channels
   IF GC-S Channel attribute gcsID is not a member of
     any MT-ST Channel THEN RING "GC-S Channel"
     gcsID" has no MT-ST Channels:
   END IF
END FOR In this example, there is a single condition (the line beginning with IF) which, if met, generates a warning message. Standard boolean conditional modifiers (e.g. AND,OR) are used to generate compound conditions for a single rule.

2. The NE/SE provides the capability for the engineer to add, modify, and delete individual rules in the configuration verification rules set.

3. An updated rule set is usable without requiring the modification of any other NE/SE source code.

4. The NE/SE provides the capability for the engineer to add, modify, and delete individual rules in the configuration verification rules set.

3. An updated rule set is usable without requiring the modification of any other NE/SE source code.

4. The NE/SE provides the capability for the engineer to assign a severity level to each rule set. At a minimum, there shall be at least 3 levels of severity.

5. The NE/SE provides the capability for the engineer to select a subset of the rules set to be used in a configuration verification check by specifying the minimum severity level of the rules that are applied to the configuration verification check.

6. When the NE/SE detects a violation of a verification rule, it issues an exception message to indicate that an error has been detected. The message contains enough information to identify the verification rule that was violated, the severity level of the rule, and the resource or resources for which the exception was generated.

7. The NE/SE provides the engineer with the capability to review the full list of exceptions generated by the most recent configuration verification.

8. The NE/SE allows the engineer to perform a configuration verification check on the working configuration at any time during resource provisioning.

Deploy CGS Configuration Function

This task allows the engineer to deploy a specified configuration on the CGS by creating and downloading database change requests to the NOC for distribution to the affected CGS network elements.

1. The NE/SE provides the capability for the engineer to deploy a working configuration.

2. The NE/SE is capable of determining the comparative difference (between the working and current configuration) in provisioned resources and their attributed values.

3. From the above difference, the NE/SE creates a set of messages required to transform the NOC's database to reflect the working configuration.

4. The NE/SE ensures that a verification of the working configuration has been completed before requesting the NOC perform a configuration database change.

5. The NE/SE is able to display the success or failure of the configuration data sent to the NOC.

Audit and Reconciliation

The NE/SE is responsible for establishing the configuration of the CGS that is sent to the NOC and distributed to the CGS elements. However, the CGS system configuration may be modified by operators of the NOC or other CGS elements. The NE/SE audits the CGS system by providing the capability to store and review event messages. The NE/SE performs reconciliation by attempting to maintain an up-to-date record of the current configuration of the CGS system. The local operators of the CGS system have the capability to modify system resources, so there can be no guarantee that at a given instant in time the current configuration maintained by the NE/SE exactly matches the real configuration of the CGS system.

The NE/SE receives event messages from the NOC. "Event Message" refers to any such event message received by the NE/SE. The NE/SE and the NOC exchange configuration management and data management messages. "Config/Data Message" refers to any message exchanged across either NOC or NE/SE.

1. The NE/SE stores Event Messages received from the NOC for 10 days. Each stored Event Message shall include a time stamp to indicate the date and time at which it was received by the NE/SE.

2. The NE/SE provides the capability for the engineer to display a list of the stored Event Messages. This list includes an entry for each message that displays the time at which the NE/SE received the message and the type of message.

3. When displaying a list of stored Event Messages, the NE/SE shall provide the engineer with the capability to identify (i.e. filter) which messages are displayed based on the following message characteristics:
   a. message type(s);
   b. date/time range of message receipt by the NE/SE.

4. The NE/SE provides the capability for the engineer to display the contents of stored Event Messages.

5. The NE/SE provides the capability for the engineer to generate reports summarizing Event Message counts based on the following message characteristics:
   a. message type(s)
   b. date/time range of message receipt by the NE/SE 6. The NE/SE stores Config/Data Messages that are exchanged between the NE/SE and the NOC for 10 days. Each stored Config/Data Message includes a time stamp to indicate the date and time at which it was transmitted by the NE/SE or received by the NE/SE.

7. The NE/SE provides the capability for the engineer to display a list of the stored Config/Data Messages. This list shall include an entry for each message that displays the time at which the NE/SE transmitted or received the message and the type of message. Where applicable for NE/SE-initiated messages, the list also includes whether the NOC has sent a response to the NE/SE-initiated message, and the status reported by the response.

8. When displaying a list of stored Config/Data Messages, the NE/SE provides the engineer with the capability to identify (i.e. filter) which messages are displayed based on the following message characteristics:
   a. message type(s)
   b. date/time range of message transmission or receipt by the NE/SE.

9. The NE/SE provides the capability for the engineer to display the contents of stored Config/Data Messages.

NOC Database Upload

The NE/SE requests that the NOC upload data from the NOC local database and perform a bulk data transfer of this information to the NE/SE. In the following, this capability is referred to as a "NOC data-base upload".

1. The NE/SE provides the capability to perform a NOC database upload.

2. The NE/SE provides the capability for the engineer to schedule requests for NOC database uploads to occur at the following instances:
   a. immediately;
   b. at a specific date/time;
   c. on a daily basis;
   d. on a weekly basis;
   e. on a monthly basis.

3. The NE/SE has the capability to convert the data contained in the NOC database upload into a working configuration. The working configuration is populated by creating and provisioning NE/SE resources described by the data in the NOC database upload.

4. When a resource defined in the NOC database upload can not be fully provisioned using the data contained in the NOC database upload, the NE/SE
   a. issues a warning to the engineer indicating that invalid data was received from the NOC;
   b. provides the capability for the engineer to examine the affected resource's data;
   c. provides the capability for the engineer to abort continued processing of the NOC database upload.

5. Upon completing generation of a working configuration from the NOC database upload, the NE/SE verifies that the configuration meets data integrity requirements. The NE/SE issues a warning to the engineer for each data integrity anomaly detected in the configuration as part of this check.

6. Upon completing the data integrity check of the working configuration created from the NOC database upload, the NE/SE updates the current configuration with the working configuration unless data integrity anomalies were detected, in which case the NE/SE shall provide the engineer with the option to abort the update and leave the current configuration unchanged.

MT Registration Support

The following describes creation, deletion, and modification of Service Profile resources within the NE/SE, used to support MT Registration. A Service Profile provides CMIS the information required to associate customer service order parameters, required by the GWS, with Virtual Network definitions. This association is necessary when registering a MT to ensure consistency of dialing and routing plans that exist in both the GWS and GC databases.

1. The NE/SE provides the capability for the engineer to create, delete, and provision Service Profile Resource, per the provisioning criteria requirements described previously.

2. Once this resource is fully provisioned, the NE/SE is capable of sending the completed profile to CMIS via ASN.1 PDUs over a DECnet link.

3. The CMIS transaction is considered complete when NE/SE receives a positive response from CMIS.

4. The NE/SE displays to the operator the success or failure of the CMIS transaction.

Data collection

Traffic, performance and statistic data are collected from the NOC and GWS on a scheduled basis. The collected data are stored in raw (unprocessed) and summarized (hourly, daily, and monthly) form for traffic and performance reporting purposes.

Statistics Collected from the NOC

1. The NE/SE has the capability to collect NOC Event Logs and statistics (NCC, FES, DEC, (VAX) performance statistics [DECPS]) from the NOC.

2. The NE/SE schedules requests for statistic data using a polling schedule generated by the engineer.

3. When collecting data more than once per day, the NE/SE does not store redundant (overlapping hours) data.

4. The NE/SE has the capability to process "running counter" data collected from the NOC into hourly, daily, and monthly values and store them for summarization. A running counter is a raw statistic which is only reset to zero at specific initialization periods, thus it is continually incrementing.

5. The DECPS data are stored on an as-received basis. Redundant data (data already received or second copies of the data) is not be stored.

Statistics Collected from the GWS

1. The NE/SE collects raw Operational Measurement (OM) data from the Gateway Switch (GWS) via the NOC directly by emulating a Maintenance Administrative Position (MAP) remotely over the MSS inter-network link.

2. At a minimum, OM data from the following OM groups, are collected from the GWS.

a. OFZ (call statistics)
   b. OFZ2 (switch statistics)
   c. TRK (trunk group (PSTN) statistics)
   d. UTR (universal tone receiver statistics)
   e. CF3P (conference for 3 port statistics)

3. The NE/SE schedules requests for OM data using a polling schedule generated by the engineer.

Component Performance Log Reports

The DEC VAX computer system has Performance Management Tools that are optionally run on the system. The NOC provides NE/SE with DEC Performance Solution (DECps) reports that provide capabilities for performance measurement and capacity management.

1. The NE/SE collects the following DECps reports on a scheduled basis and make them available for display and hardcopy output.

a. Full Analysis Report
   b. Performance Evaluation Reports
   c. Tabular Reports
   d. Histogram Reports.

Traffic Analysis

The following describes the traffic data analysis and reporting capabilities of the NE/SE system. Traffic statistics are collected and summarized per the requirement in the Data Collection sub-section, and stored for calculation and reporting as specified below.

Calculation Requirements

1. The NE/SE is capable of calculating the following is values for report output, as defined below, based on hourly summarized data:

a. Average Busy Hour (ABH)—a statistics average highest hourly value per day during the reporting period.
   b. Daily Total—the 24 hour total of a statistic
   c. Monthly Totals—the monthly aggregate of daily totals.
   d. Peak Value—the highest value of a statistic during the reporting interval.
   e. Current Value—the most recent value collected.

2. FIGS. 47–51 comprise the CGS statistics and reflect the method(s) of calculation required for each statistic (variations of course, may also be used).

The following is a list of some of the basic commands used in the NE/SE system:

Configuration Manager

Function: Allow the operator to perform system configuration and provisioning tasks Work Order Generation Function: Automatically generate necessary work orders in order to bring the NOC configuration into agreement with the configuration loaded in the application.

Provisioning

Function: Allows operator to configure system by creating instances of the system entities and provisioning those instances. The configuration state is represented by a directed graph consisting of entity icons at the nodes connected with directed line segments. The line segments represent the parent-child relationship between entities with the line pointing from the parent to the child. The number appearing in the upper right of the entity icon represents the number of instances of the entity. The number appearing in the lower right corner represents the number of instances for the currently selected parent instance(s). The number appearing in the lower left represents the instance currently selected. Instances of a child are relative to the currently selected instance of its parent. For example, there may be three instances of a child entity for instance one of its parent and two instances of the child for instance two of the parent. This relationship holds true for combinations of multiple parents. A configuration is provisioned by working through the graph from top to bottom. At least one instance of each parent must exist and be selected before an instance of a child can be created and provisioned. To select an entity, the operator will activate the icon. Upon activation, a Dialog box will be displayed. The currently selected instance will be highlighted in the List. The operator will select the desired instance and then activate the PushButton for the desired action. If the Select PushButton is activated, the selected instance will be made the current instance. A sample provisioning screen is illustrated in FIG. 52.

Retrieve NOC Configuration State

Function: Retrieves the configuration database currently in use by the NOC.

Deploy Restoral Plan

Function: Retrieve the name of a restoral plan to be deployed and then deploy it. A SelectionDialog was selected so that the restoral plan file names could be presented without permitting the operator to move to other directories as would be the case with a FileSelectionDialog. The system will check that the restoral plan name selected is actually a restoral plan in the proper directory prior to deploying it.

Communications

Function: Start NE/SE communication applications

Remote NOC Session

Function: Provide the operator with network management capabilities. Activation of Remote NOC Session PushButton will execute a script which will log into the proper host, start Polycenter, and redirect its X Windows displays back to the NE/SE workstation GWS MAP Session Function: Provide operator access to the MAP display on the switches. When the GWS MAP Session is activated, a SelectionDialog will be displayed with the available switches listed. Once the is operator selects the desired switch, a script will be executed to start the XTerm session and establish the connection to that switch.

AMS(R)S Simulation
Function: Allows NE/SE operator to send and receive AMS (R)S messages Establish AMS(R)S Links
Function: Causes simulation to attempt establish AMS(R)S connections to NOC when activated. Component is disabled when the simulation has already established connections with the NOC. If the operator activates this component and it is found that the AMS(R)S has already connected to the NOC, an InformationDialog will be presented advising the operator of the previous connection and the simulation will discontinue its connection attempt.

CGS Events Display
Function: Display incoming CGS events in a window

NE/SE Messages Display
Function: Display config/data message traffic between NOC and NE/SE in a window.

Report Generation
Function: Allow operator to generate event, message, traffic, and performance reports based on historical data.

NE/SE Administration
Function: Start NE/SE administrative applications including schedule generation application, NE/SE file manager application, NE/SE security application, DBMS administration application, dconfiguration rule editor application, NE/SE startup script, NE/SE shutdown script, etc.

DBMS Administration
Function: Manage and monitor NE/SE databases.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

Dictionary Items and Definitions

Actual GSI
Definition: Current GSI based on TDM changes during MET operation. This field is populated by the NOC based on actions on the CGS. The CMIS cannot create or update this field.

Call Barring Inbound/Outbound Flag
Definition: Describes the call barring entry as applying to incoming or outgoing calls. If the Call Barring List is flagged as Inbound, it applies to calls the MET is receiving. If the Call Barring List is flagged as Outbound, it applies to calls the MET is making.

Call Barring Include/Exclude Flag
Definition: Describes the call barring entry as an included (legal) call or an excluded (illegal) call. When a Call Barring List is flagged as Include, the MET may only make calls to the numbers or NPAs on the list. Any other call would be denied. Conversely, if a Call Barring List is flagged as Exclude, the MET may make calls to any number or NPA except those on the list.

Call Barring List Value
Definition: Numbering plan area or phone number in the call barring list. The values that appear in the list are the phone numbers or NPAs that the MET's restriction apply to. The types of restrictions are dictated by the flags for Include/Exclude and Inbound/Outbound Call Barring.

Call Trap Flag
Definition: Indicates call trapping has been initiated for the MET. The GC will trap MET states as they change during MET CGS activity. This information will be provided to the CMIS on a call record.

Call Type
Definition: Service available on the MET. There are four service types: voice data (2400 or 4800 baud), fax, and alternate voice data (avd). For each service the mobile is registered, a service record is created with a single call type indicated. This call type in turn has a unique mobile identification number (min) associated with it.

Carrier
Definition: Name of preferred IXC carrier. This field is a switch field used to support equal access to long distance carriers.

Cellular ESN
Definition: 32 bit ESN that is used by the switch. For dual mode cellular/satellite phones it is the ESN for the cellular portion of the phone and would match the ESN used by the home cellular carrier to identify that mobile terminal.

CGS Time Stamp
Definition: Time stamp was created/modified. Part of the notification of success or failure of CGS action. Not created or updated by CMIS.

Channel Spacing
Definition: Multiple of frequency step size. This element is a characteristic of the MET Class. CMIS will only have the MET Class ID that a particular METs equipment maps to. NE originates this and other data that describes the MET Class and sends it to the NOC.

Check String
Definition: Constant used by the GC to validate the encryption/decryption algorithm. This element is related to the ASK.

Commanded GSI
Definition: Set by CMIS this is the original GSI stored as a NVRAM (non-volatile RAM) parameter by the MET. Required for each new MET registered for service. This element is used by the MET to tune to a GC-S channel during commissioning on the CGS. Without the GSI the MET is incapable of logging on to the CGS.

Configuration File
Definition: A file containing the contents of a working configuration that has been saved to disk under a unique name.

Current Configuration
Definition: The set of resources that exist in the configuration most recently sent to or received from the NOC. This is assumed to be the actual configuration of the traffic bearing network at any given time.

Commit a Resource
Definition: Explicit engineer action to add a fully provisioned interim resource to the working configuration.

Control Group ID
Definition: The CGS is divided into Control Groups that contain circuit pools, signaling channels, bulletin boards, METs, and VNs. A MET may only belong to one Control Group. The control Group assignment is based on the virtual network membership. All VNs a MET is a member of must be in the same control group.

Cust Group
Definition: Identifier for a specialized routing information used at the switch (e.g., 1024 available cust groups per MSR). Dialing plans will be implemented for groups of customers through a Customer Group (Cust Group).

Data Hub Id
Definition: Used to route messages during PSTN to IVDM call setup to the proper data hub. This is only applicable for METs that are participating in the Mobile Packet Data Service.

Date Last Tested
Definition: Time stamp of most recent commissioning test. This field is populated by the NOC and cannot be created or updated by CMIS.
Default VN
Definition: VN selected if user does not specify VN during dialing. For METs that belong to only one VN, this can be populated with the VN ID the MET is assigned to by default.
EIRP
Definition: Equivalent Isotropic Radiated Power—power level required for a MET to receive a satellite signal. This element is a characteristic of the MET Class. CMIS will only have the MET Class ID that a particular METs equipment maps to. NE/SE originates this and other data that describes the MET Class and sends it to the NOC.
Event Argument Id
Definition: Part of the Event Record received from the NOC. CMIS has no part in creating or updating events-they arrive unsolicited from the NOC.
Event Argument Type
Definition: Part of the event Record received from the NOC. CMIS has no part in creating or updating events-they arrive unsolicited from the NOC.
Event Argument Value
Definition: Part of the Event Record received from the NOC. CMIS has no part in creating or updating events-they arrive unsolicited from the NOC.
Event Argument VMS Type
Definition: Part of the Event Record received from the NOC. CMIS has no part in creating or updating events-they arrive unsolicited from the NOC.
Event Code
Definition: Part of the Event Record received from the NOC. CMIS has no part in creating or updating events-they arrive unsolicited from the NOC.
Event Severity
Definition: Network impact assessment of the trouble event.
Event Time
Definition: Time the event occurred within the network.
Event Type
Definition: Part of the Event Record received from the NOC. CMIS has no part in creating or updating events-they arrive unsolicited from the NOC.
External Date Time Stamp
Definition: CMIS generated time stamp used for CMIS audit purposes in exchanging messages with the CGS.
External Transaction Id
Definition: CMIS generated transaction id used for CMIS audit purposes in exchanging messages with the CGS.
Feature Set
Definition: Identifies MET features within a specific VN.
  Fixed features are set up during order processing and require no action by the MET user to invoke a feature. MET activated features must also be set up during order processing but will only be available through some action on the part of the MET use during call process.
  FIXED FEATURES include:
    Calling Line Id Presentation (CLIP)—display the calling party's number to a MET.
    Calling Line Id Restriction (CLIR)—prohibition from displaying the METs number when it is calling another party.
    Connected Line Id Presentation (COLP)—display the number the calling MET is connected to.
    Connected Line Id Restriction (COLR)—prohibit display of the connected MET's number to the calling party.
    Sub-addressing (SA)—allows one or more attachments to the MET to be addressed. This is being accomplished through unique phone numbers for service types requiring different equipment.
    Call Waiting (CW)—notification to a MET engaged in the call that another call is waiting. MET may accept the other call or ignore it.
    Call Barring (CB)—restricts the MET user's from making or receiving one or more types of calls.
    Operator intervention (OI)—allows an operator to break into a call in progress for the MET.
    Operator Assistance (OA)—allows the MET to access an MSAT operator to receive assistance
    Call Priority (CP)—used in conjunction with the system's call queuing function (trunk access priority) presence of this feature gives a MET access to channels at times of congestion ahead of MET's with lower priority. Priority applies only to MET initiated calls.
  MET ACTIVATED (dynamic) FEATURES include:
    Call Transfer (CT)—allows sa MET user to transfer an established call to a third party.
    Call Forwarding Unconditional (CFU)—permits a MET to have all calls forwarded to another MET or PSTN number.
    Call Forwarding Busy (CFB)—permits a MET to have all incoming calls attempted when the MET is busy to another MET or PSTN number.
    Call Forward Congestion (CFC)—permits the MET to have all incoming calls attempted when the signaling channels are congested answered with a recorded announcement intercept.
    Call Forward No Reply (CFN)—permits a MET to have all incoming calls attempted when the MET is not answering to another MET or PSTN number. This applies if the MET is blocked, turned off or not answering.
    Call Holding (CH)—allows a MET to interrupt call communication on an existing connection and then re-establish communications.
    Alternate Voice Data Operation (AVD)—allows a MET user to toggle between voice and data mode during a call. Requires that the call be initiated in voice mode. Only the MET user may toggle between voice and data. This requires a special service type in addition to the activation at set-up of the feature.
    Conference calling (CC)—allows a MET to communicate with multiple-parties including METs and PSTN concurrently.
    Three Party Service (3PS)—allows a MET to who is active on a call to hold that call, make an additional call to a third party, switch from one call to the other (privacy being provided between the calls) and/or release one call and return to the other.
    Malicious Call Trace (MCT)—enables an MSAT operator to retrieve the complete call record at a MET's request for any terminated call in real-time. The operator can then identify the calling party to the MET and take appropriate action.
    Voice Mail (VM)—allows call forwarding to a voice mail box and retrieved of messages by the MET.
    Alternate Accounts Charging (ACC)—allows the MET user to enter in an account code to charge the call to after entering the dialed digits
Fully Provision
Definition: Supply values to all attributes of a resource
Frequency Step Size
Definition: Minimum tuning increment acquired for a MET to tune in an assigned channel. CMIS will only have the MET Class ID that a particular MET's equipment maps to. NE originates this and other data that describes the MET Class and sends it to the NOC.

From MET Call Barring Flags

Definition: Describe actions available to a user originating a call from a MET. These call Barring flags relate to specific types of calls at an aggregate level to indicate if the MET can make or receive a call of a particular type. When this list indicates that an Inclusion or Exclusion to particular numbers or area codes is allowed, the values for those restrictions are indicated on a Call Barring List.

FTIN

Definition: Forward Terminal Identification Number—Downloaded to MET from NOC during commissioning. Used for MET to GC signaling.

Internal Data Time Stamp

Definition: NOC generated time stamp used for NOC audit purposes.

Internal Transaction Id

Definition: NOC generated transaction is used for NOC audit purposes.

Interim resource

Definition: The resource currently being modified by the engineer. Changes made to an interim resource are not added to the working configuration until the resource is committed to the working configuration L Band Beam Definition: Current beam MET is logged into. Determined by the GC during commissioning. CMIS has no role in creating or updating this field.

LCC

Definition: Line Class Code—type of phone, required by the switch.

MCC Class Id

Definition: Part of the Event Record received from the NOC. CMIS has no part in creating or updating events—they arrive unsolicited from the NOC.

MCC Instance

Definition: Part of the Event Record received from the NOC. CMIS has no part in creating or updating events—they arrive unsolicited from the NOC.

MCC Instance Id

Definition: Part of the Event Record received from the NOC. CMIS has no part in creating or updating events—they arrive unsolicited from the NOC.

MCC Instance Type

Definition: Part of the Event Record received from the NOC. CMIS has no part in creating or updating events—they arrive unsolicited from the NOC.

Message Status 1

Definition: Used in the message initiated by the NOC to acknowledge success or failure of a previously transmitted CMIS request. Used by the DM.

Message Status 2

Definition: Used in the message initiated by the NOC to acknowledge success or failure of a previously transmitted CMIS request. Will be used by the DM.

Message Verb

Definition: Action required at the NOC on data passed in a message from CMIS. This field is in the message relaying the results of a CMIS request.

Modulation Scheme

Definition: Non-standard modulation schemes. CMIS will only have the MET Class ID that a particular MET's equipment maps to. NE/SE originates this and other data that describes the MET Class and sends it to the NOC.

MSA

Definition: Mobile Servicing Area—identifies the last call's servicing area. Atomic data element within MSR. Transient data maintained in call processing not on the cellular switch table. Same as MSR.

MSR

Definition: Mobile Servicing Region id (table) contains multiple MSA assignments for the MET. For a roamer, the operator will input the MSR for temporary assignment. Allows up to 1024 cust groups—At CGS startup there will be 1 MSR.

MET ASK

Definition: Access Key MET must match during call setup/validation.

MET Class ID

Definition: Identifies the operating characteristics of the MET. Associated to MET by CMIS during registration from data supplied by NE/SE. The technical characteristics the MET Class ID encompasses are not needed by CMIS. These are stored on a table in the NOC and referenced by having the ID on the MET Information record. This ID applies to MET level regardless of how many services, etc. the MET has tied to it.

MET Commanded State

Definition: Current CGS status of MET.

MET Fraud Flag

Definition: Indicates fraud has been detected on the MET. Updated by GC and CMIS only. This field is set at the MET level regardless of the number of services, etc. the MET has.

MET ID

Definition: CMIS assigned unique MET identifier. This can be a unique random number assigned to each MET registered for service. This is a MET level characteristic set once for the MET regardless of how many services, etc. the MET has. The MET ID is used by the NOC to identify METs. It does not have to be used within CMIS as a key field. MET ID cannot be updated once it has been assigned. A MET that requires a new MET ID for any reason would have to go through the registration process anew.

MET Signaling Code

Definition: Dialed digits from MET that identifies VN selection. Signaling codes would be assigned when a MET has multiple Virtual Network memberships. After the MET user enters the destination phone number, the pound key is hit and then the signaling code is entered if the caller wants to associated the outbound call with a particular virtual network. When no signaling code is entered, implies default VN be associated with the call.

Net Radio Monitor Code

Definition: Controls MET responses to specific channels after hang time limit is exceeded. A NR Net selection is made at the MET by the user.

Net Radio MET Directory Number

Definition: Net radio MET directory number. Assigned during registration.

Net Radio Net Id

Definition: Net ID

Net Radio MET Directory Number

Definition: Tag number on the MET equipment that identifies a particular net radio net.

Pending NVRAM Init Flag

Definition: Instructs the GC to download/initialize parameters for a MET.

Pending PVT Flag

Definition: This flag indicates that a PVT is required following next MET access. If CMIS requests a PVT to help diagnose customer troubles, an update would be sent to NOC with the Flag set to Perform PVT after Next MET access (1).

Picsel
Definition: Flag indicating if user has asked for a preferred IXC carrier. Carrier name is contained in CARRIER field.
Record Type
Definition: Type of record defined by object. Part of the Update Results Record.
Remote
Definition: Remote user—not required by the switch for MSAT Application.
Recent Configuration Event
Definition: This is a serial list of events received from the NOC that pertain to configuration database changes.
Referential Integrity
Definition: Database "key field" relationships that bind record within the databases, and create dependencies for additions and deletions of table instances.
RF Pin
Definition: Remote feature personal identification number. A user is prompted for a pin when attempting to use a remote feature.
Roam
Definition: Roam Capable—not required by the switch for MSAT Application.
RTIN
Definition: Reverse Terminal Identification Number which is also the satellite electronic serial number on satellite only and dual mode cellular/satellite METs. This is a unique identifier assigned by manufacturer for each piece of equipment. Within CGS processing the RTIN is used by the GC to signal the MET.
Satellite Id
Definition: Satellite Id of current L-band beam. The NOC populates this field based on MET commissioning. CMIS does not ever create or update this field.
SCM
Definition: Station Class Mark.
Secure Disable Flat
Definition: Channel Unit security check flag. Setting this flag to bypass security would disable ASK verification during call processing for a MET. CMIS cannot change this flag.
Signaling Priority
Definition: Number of MET signaling requests to the GC during network congestion. Assigned at the MET level— each MET may have only one signaling priority regardless of the number of VN memberships it has. The highest priority level is 0 and the lowest is seven.
TDM Change Enable Flat
Definition: Restriction on MET from changing TDM (TDM is the GSI)
Telephone Number
Definition: Phone number associated with a call type (voice, data, fax, avd) in a given virtual network.
Template
Definition: An initial set of default attribute values for each resource being added.
To MET Call Barring Flags
Definition: Describes actions available to a user receiving a call at their MET.
Trunk Access Priority
Definition: Satellite trunk queuing priority used during network congestion. Determines access to channels.
Virtual Network Id
Definition: Identifies the Virtual Network that the service and feature profiles relate to. Within a single VN a MET may have one voice, data, fax and/or avd service type. Features and restrictions for those services are defined on the basis of the METs membership in that VN. If the MET required an additional instance of a service that it already subscribed to, (e.g. a second voice number), a second virtual network assignment would be required. Features and restrictions for that second membership can be defined with no relation to the existing VN membership, but all elements that relate to the MET level cannot change without a ripple effect to the other services.
VMS Instance Type
Definition: Part of the Event Message
Vocoder Id
Definition: Vocoder version currently installed in the MET. CMIS will only have the MET Class ID that a particular METs equipment maps to. NE/SE originates this and other data that describes the MET Class and sends it to the NOC.
Working Configuration
Definition: The set of resources currently being modified by the engineer. This may be an existing, complete configuration which the engineer is modifying, or may be a new, partial (or initially empty) configuration.

Glossary

A Availability
AAC Airline Administrative Communications
AARM Access Authentication Request
ABH Average Busy Hour
AC Alternating Current
ACU Access Channel Unit
ACU Antenna Control Unit
AD Attribute Dictionary
AEDC After Effective Date of Contract
AFC Automatic Frequency Control
AFS Antenna/Front-end Subsystem
AGC Automatic Gain Control
AIOD Automatic Number Identification Outward Dialing
AMI Alternative Mark Inversion
AMPS North American Analog and Digital Cellular Networks
AMSC American Mobile Satellite Corporation
AMS(R)S Aeronautical Mobile Satellite (Route) Service
AMSS(R) Aeronautical Mobile Satellite Services (Reserved)
ANI Automatic Number Identification
ANSI American National Standards Institute
ANT Antenna
AOC Aircraft Operational Communications
APC Airline Passenger Communications
API Applications Program Interface
AR Automatic Roaming
ARC Atlantic Research Corporation
ASK Access Security Key
ASN.1 Abstract Syntax Notation One
AT Command set for a DTE to communicate with asynchronous host
ATC Air Traffic Control
AVD Alternate Voice/Data Calls
AWGN Additive White Gaussian Noise
AZ Azimuth
B8ZS Bipolar with 8 Zeros Substitution
BB Bulletin Board
BBS Bulletin Board Service
BER Bit Error Rate
BERT Bit Error Rate Tester
BID Beam Identifier Code
BIT Built In Test
BITE Built-In Test Equipment
BPS Bits Per Second BS Base Station
BSPU Baseband Signaling Processing Unit
BSS Base Station Switch
C/No Carrier to Noise Power Density Ratio
CAC Channel Access and Control
CAF Call Failure Message
CCCS Command, Control, and Communications Subsystem
CCIR Consultative Committee International de Radio
CCITT Consultative Committee International Telegraph and Telephone
CCU Communications Channel Unit
CD Call Delivery
CDR Call Detail Record
CDR Critical Design Review
CDRL Contract Data Requirements List
CE Common Equipment
CG Control Group
CGID Control Group Identification Number
CGS Communications Ground Segment
15. CHA Channel Assignment Message
CHREL Channel Release Message
CHREQ Channel Request Message
CI Configuration Item
CIDER Cellular Intercarrier Billing Exchange Roamer
CIC Carrier Identification Code
cm Configuration Management
CMIP Common Management Information System
CMIS Configuration Management Information System
CMIS Customer Management Information System
COTS Commercial off-the-Shelf
CP Circuit Pool
CPD Call Processing Demonstration
CPS Circuit Pool Segment
CPU Central Processing Unit
C/PV Commissioning/Performance Verification
CRC Cyclic Redundancy Check
CS Communications System
CSC Computer Software Component
CSCI Computer Software Configuration Item
CSDT Channel Switchover Detection Time
CSF Critical System Functionality
CSMA/CD Carrier Sense Multiple Access with Collision Detection
CSMP Circuit Switch Management Processor
CSMPCS Circuit Switch Management Data Processor Equipment Communications System
CSPU Channel Signal Processing Unit
CSR CAC Statistics Request
CSREP Call Status Reply Message
CSREQ Call Status Request Message
CSU Computer Software Unit
CSUG Computer Software Unit Group
CTB Customer Test Bed
CTN Cellular Telephone Network
CTN Cellular Terrestrial Network
CTNI Cellular Telephone Network Interface
CU Channel Unit
CUD Call User Data
CUG Closed User Group
CUP Channel Unit Pool
CUS Channel Unit Subsystem
CVR Cellular Visitor Registration
CVRACK Cellular Visitor Registration Acknowledge
CW Carrier Wave
CWCHA Call Waiting Channel Assignment Message
DAMA Demand Assignment Multiple Access
db Database
dbc Decibel Relative to Carrier
dB decibels
dBi dB Relative to Isotropic
dBm dB relative to 1 milli watt
dBW decibels relative to 1 watt
D bit 'Data Configuration' bit in X.25
DBMS DataBase Management System
dBw dB Relative to 1 Watt
DC Direct Current
DCE Data Circuit Terminating Equipment
DCE Data Communications Equipment
DCL Digital Command Language
DCN Down CoNverter
DCR# Document Control Release #
DCU Data Channel Unit
DD Design Document
DDCMP Digital Data Communications Message Protocol
DDS Direct Digital Synthesis
DEC Digital Equipment Corporation
DECmcc Digital's Network Management System
DEQPSK Differential Encoded Quadrature Phase Shift Keying
DET Data Equipment Terminal
DFD Data Flow Diagram
DH Data Hub
DH-D Outbound Time Division Multiplex Channel from Data Hub to Mobile Terminal
DHP Data Hub Processor
DHSI DH-D Selector Identification Code
DID Direct Inward Dialing
DIDs Data Item Descriptions
DME Dial-Up Modem Emulation
DMQ DEC Message Queue
DMS Digital Multiplex System
DN Directory Number
DNS Digital Name Service
DOC Canadian Department Of Communications
DOD Direct Outward Dialing
DPSK Differential Phase Shift Keying
DQPSK Differentially Encoded Quadrature Phase Shift Keying
DSO Digital Service Level Zero (single 64K b/s channel)
DS 1 Digital Service Level One (twenty four voice channels)
DSP Digital Signal Processing
DSSS 1 Digital Subscriber Signaling System 1
DTC Digital Trunk Controller
DTE Data Terminal Equipment
DTE Data Terminal Element
DTMF Dual Tone Multiple Frequency
DVSI Digital Voice Systems, Inc.
Eb/No Bit Energy to Noise Power Density Ratio
ECN Engineering Change Notice
EFD EF Data, Inc.
EFTIN Encrypted Forward Terminal Identification Number
E-I Exchange—Interexchange
EIA Electronic Industries Association
EICD Element Interface Control Document
EIE External Interface Equipment
EIRP Equivalent Isotropic Radiated Power
El Elevation
EMC ElectroMagnetic Compatibility
EMI ElectroMagnetic Interference
eng engineer or engineering
EO End Office
EO External Organizations
EOD End of Data ESN Electronic Serial Number
FAX Facsimile
FCA Functional Configuration Audit
FCC Federal Communications Commission
FCS Fading Channel Simulator
mS FDMA Frequency Division Multiple Access
FEC Forward Error Correction
FES Feederlink Earth Station
FES-C Inbound Communication channel from Feederlink Earth Station to Mobile Terminal
FES-I Interstation signaling channel from Feederlink Earth Station to Group Controller
FES/MT Feederlink Earth Station/Mobile Terminal
FES-RE Feederlink Earth Station-Radio Frequency Equipment
FES-TE Feederlink Earth Station Terminal Equipment
FFT Fast Fourier Transform
FIS Feederlink Earth Station Interface Simulator
FIT Fault Isolation Tests
FIU Fax Interface Unit
FMT Fixed Mobile Terminal
FMA Field Programmable Gate Array
FPMH Failures per Million Hours
FRO Frequency Reference Oscillator
FT Fault Tolerant
FTE Fax Terminal Equipment
FTIN Forward Terminal Identification Number
G/T Gain to System Noise Ratio
GBF Gateway/Base Function
GBS Gateway Base System
GC Group Controller
St GC-I Interstation signaling channel from Group Controller to Feederlink Earth Station
GC-S Time Division Multiplex Signaling channel from Group Controller to Mobile Terminal
GCSST GC-S Search Time
GEN Generator
GHz Giga (1,000,000,000) Hertz (cycles per second)
GMACS Graphical Monitor And Control System
GPIB General Purpose Instrument Bus
GPS Global Positioning System
GS Gateway Station
GSI GC-S Selector Identifier
GW Gateway
GWS Gateway Switch
GWS/BSS Gateway Switch/Base Station Switch
H/W Hardware
HCHREQ Handoff Channel Request
HDP Hardware Development Plan
HLR Home Location Register
HMI Human Machine Interface
HOT Hand-off Test
HPA High Power Amplifier
HRS Hardware Requirements Specification
HWCI Hardware Configuration Item
HW/SW Hardware/Software
Hz Hertz
I In Phase channel
IAW In Accordance With
IC Interexchange Carrier
ICD Interface Control Document
ICI Instrument Control Interface
ICP Intelligent Cellular Peripheral
ICU Interstation Channel Unit
ICWG Interface Control Working Group/Interface Coordination Working Group
ID Identification
IEEE Institute of Electrical and Electronics Engineers
IF Intermediate Frequency
IFIS Intermediate Frequency Subsystem
IFL Interfacility Link
IF IFL Intermediate Frequency Internal Facility Link
IHO Interstation Hand-Off
IICD Internal Interface Control Document
IICWG Internal Interface Control Working Group
IM Intermodulation
IMBE Improved Multiband Excitation
IOC Input/Output Controller
IP Internet Protocol
ISCU Interstation Signaling Channel Unit/Interstation Channel Unit
ISDN Integrated Services Digital Network
ISL Interstation Signaling Link
ISO International Standards Organization
IVDCPD Integrated Voice & Data Call Processing Demonstration
IVDM Integrated Voice/Data Mobile Terminal
KBPS Kilo (1,000) Bits per Second
kHz Kilohertz
KLNA K-band Low Noise Amplifier
KP Key Pulse
LAN Local Area Network
LAP Link Access Procedure
LAPB Link Access Procedure using a balanced mode of operation
LATA Local Access and Transport Area
LBP Local Blocking Probability
LCN Logical Channel Number
LLCSC Lower Level Computer Software Component
LLNA L-band Lowe Noise Amplifier
LLS Lower Level Specification
LNA Low Noise Amplifier
LOI Level of Integration
LPP Link Peripheral Processor
LRU Line Replaceable Unit
LRU Lowest Replaceable Unit
LSSGR Loval Access and Transport Area Switching Systems Generic Requirements
MAP Maintenance Administrative Position
MAP Mobile Application Part
M bit 'More Data' bit in X.25
M&C Monitor and Control
MCC Management Control Center
MCGID Mobile Data Service Control Group Identification Number
MDLP Mobile Data Service Data Link Protocol
MDS Mobile Data Service
MDSR MDLP Statistics Request
MEA Failure Modes and Effects Analysis
MEF Minimum Essential Functionality
MELCO Mitsubishi Electronic Company
MET Mobile Earth Terminal (a.k.a. MT)
MET-C Communication Channel Between Mobile Terminal and Feederlink Earth Station
MET-DRd Inbound Slotted Aloha Data Channel
MET-DRr Inbound Slotted Aloha Reservation Channel
MET-DT Inbound Packet Time Division Multiple Access Channel
MET-SR Random Access Signaling Channel from Mobile Terminal to Group Controller
MET-ST Time Division Multiple Access signaling channel from Mobile Terminal to Group Controller
MF Multiple Frequency
MFID Manufacturer Identification MGSP Mobile Terminal to Group Controller Signaling Protocol
MHz Mega Hertz (cycles per second)
MIB Management Information Base
MIR Management Information Region
MIRQ MT Initialization Request
MIS Mobile Terminal Interface Simulator
MIS Mobile Earth Terminal Interface Simulator
ML Message Layer
MLCSC Mid Level Computer Software Component
MLP Multilink Procedure
MMI Man Machine Interface
MMRS Mobile Road Service
MMSS Maritime Mobile Satellite Services
MNMS Mobile Data Service Network Management Subsystem
MNP Multi Network Protocol
MODEM MODulator/DEModulator
MOS Mean Opinion Score
MOV Method of Verification
MPLP Mobile Data Service Packet Layer Protocol
MPR MPR Teltech Inc.
MRI Minimum Request Interval
MRS Mobile Radio Service
MSAT Mobile Satellite
MSC Mobile Switching Center
MSS Mobile Satellite Service
MSSP Mobile Terminal Specialized Services Protocol
ms millisecond
MT Mobile Terminal
MT-C Communication Channel Between Mobile Terminal and Feederlink Earth Station
MT-DRd Inbound Slotted Aloha Data Channel
MT-DRr Inbound Slotted Aloha Reservation Channel
MT-DT Inbound Packet Time Division Multiple Access Channel
MT/NR Mobile Terminal/Net Radio
MT ASK Mobile Terminal Access Security Key
MTBF Mean-Time Between Failures
MTBRA Mean-Time Between Restoral Actions
MTCRS Mobile Telephone Cellular Roaming Service
MT-MET Mobile Terminal to Mobile Terminal
MT-MT Mobile Terminal to Mobile Terminal
MTP Mobile Data Service Transaction Protocol
MT-PSTN Mobile Terminal/Public Switched Telephone Network
MTS Mobile Telephone Service
MT-SR Random Access Signaling Channel from Mobile Terminal to Group Controller
MTSR MTP Statistics Request
MT-ST Time Division Multiple Access Signaling Channel from Mobile Terminal to Group Controller
MTTR Mean-Time to Repair
MTX Mobile Telephone Exchange
MULP Mobile Data Service Unacknowledged Link Protocol
MUSR MULP Statistics Request
NACN North American Cellular Network
NADP North American Dialing Plan
NANP North American Numbering Plan
NAP Network Access Processor
NAP-C Network Access Processor for the Communications Channel
NAP-CU Network Access Processor-Channel Unit
NAP-D Network Access Processor for the Data Channel
NAP-N Network Access Processor for the Network Radio Channel
NAP-S Network Access Processor for the Signaling Channel
NAS Network Access Subsystem
NASP National Aerospace Plan
NCC Network Communications Controller
NCC Network Control Center
NCC-RE Network Communications Controller Radio frequency Equipment
NCC-TE Network Communications Controller Terminal Equipment
NCS Network Control System
NCU Net Radio Control Unit
NCU Net Radio Channel Unit
NE Network Engineering
NEBS New Equipment Building System
NE/SE Network Engineering/System Engineering
NIM Network Module
NM Network Module
NMP Network Management Process
NMS Network Management System
NMS/CMIS Network Management System/Customer Management Information System
NOC Network Operations Center
NOC-FES Network Operations Center-Feederlink Earth Station
NPA Numbering Plan Area
NR Net Radio
NRCHA Net Radio Channel Assignment
NRCHREL Net Radio Channel Release
NRCHREQ Net Radio Channel Request
NRDVI Net Radio Dispatcher Voice Interface
NRS Net Radio Service
NRZ Non-Return to Zero
NT Northern Telecom
NTL Northern Telecom Limited
NTP Northern Telecom Practice
NVM Non-Volatile Memory
OA&M Operation, Administration, and Maintenance
O&M Operations and Maintenance
OJJ On the Job Training
OM Operational Measurements (from GWS)
OS Operating System
OSF Open Software Foundation
OSI Open Systems Interconnection
OSR Operational Support Review
PA Product Assurance
PAC Pre-emption Acknowledge Message
PAD Packet Assembler/Disassembler
PAP Product Assurance Plan
PBX Private Branch Exchange
PC Process Control
PCM Pulse Code Modulation
PC-RFMCP PC Based RFM Control Processor
PC-SCP PC Based Systems Control Processor
PCSTR Physical Channel Statistics Request
PCT Provisioning Criteria Table
PCU Pilot Control Unit
PCU Pilot Channel Unit
PDAMA Priority Demand Assignment Multiple Access
PDN Packet Data Network
PDR Preliminary Design Review
PDU Protocol Data Unit
PE Protocol Extension
PER Packet Error Rate
PERSP Packet Error Rate Sample Period
PERT Packet Error Rate Threshold
PIP Program Implementation Plan
PLP Packet Layer Protocol
PLT Pilot PMR Project Management Review
PMT Pre-emption Message
PN Private Network
PN Pseudo Noise
PNIC Private Network Identification Code
PPM Pulses per Minute
PS Processor Subsystem
PSDN Private Switched Data Network
PSDN Public Switched Data Network
PSTN Public Switched Telephone Network
PTT Push-To-Talk
PVC Performance Virtual Circuit
PVT Permanent Verification Test/Performance Verification Test
Q Quadrature Phased Channel
QA Quality Assurance
Q bit 'Qualified Data' bit in X.25
QPSK Quadrature Phase Shift Keying
RAM Random Access Memory
RAM Reliability, Availability, Maintainability
RDB Relational DataBase
REMS Remote Environmental Monitoring System
Req Requirement
Rev Revision
RF Radio Frequency
RFE Radio Frequency Equipment
RF IFL Radio Frequency Inter Facility Link
RFM Radio Frequency Monitor
RFP Request For Proposal
RFS Radio Frequency Subsystem
RHCP Right Hand Circularly Polarized
RMS Remote Monitoring Station
RMS Remote Monitor Subsystem
RNO Remote NOC Operator
ROM Read Only Memory
RR Receiver Ready
RS Requirements Specification
RS-232C Electronics Industry Standard for unbalanced data circuits
RSP Radio Standard Procedure
RTIN Reverse Terminal Identification Number
ik RTM Requirements Traceability Matrix
RTP Reliable Transaction Protocol
RTR Reliable Transaction Router
RTS Reliable Transaction Service
RTS Receiver/Tuner System
Rx receive
S/W Software
SCADA Supervisory Control and Data Acquisition
SCCP Signaline Connection Control Part
SCPC Single Channel Per Carrier
SCR Software Change Request
SCS System Common Software
SCU Signaling Channel Unit
SDD Software Design Description
SDID Seller Data Item Description
SDLC Synchronous Data Link Control
SDP Software Development Plan
SDPAP Software Development Product Assurance Plan
SDR System Design Review
SDRL Seller Data Requirements List
SE Systems Engineering
SEC Setup Complete Message
SEDP Software Engineering Development Plan
SEE Software Engineering Environment
SEEP Software Engineering Environment Plan
SID System Identifier Code
SIF System Integration Facility
SIT Special Information Tones
SLOC Source Lines of Code
SLSS Station Logic and Signaling Subsystem
SM Site Manager
SMAC Station Monitor Alarm and Control Subsystem
SMDS Satellite Mobile Data Service
SMP Software Management Plan
SMRS Satellite Mobile Radio Service
SMSC Satellite Mobile Switching Center
SMTS Satellite Mobile Telephone Service
SNA Systems Network Architecture
SNAC Satellite Network Access Controller
SNACS Satellite Network Access Controller Subsystem
SNMP Simple Network Management Protocol
SNR Signal to Noise Ratio
Soc Satellite Operation Center
SOW Statement of Work
SP Start Pulse
SPAP Software Product Assurance Plan
SPP Satellite Protocol Processor
SQL Software Query Language
SRR Systems Requirements Review
SRS Software Requirements Specification
SS7 Signaling System No. 7
SSA Sloppy Slotted Aloha
SSTS Satellite Transmission Systems, Inc.
STP Signal Transfer Point
STP System Test Program
STS System Test Station.
STSI Satellite Transmission Systems, Inc.
SU Signaling Unit
SUES Shared-Use Earth Station
SVC Switched Virtual Circuit
SVVP Software Verification and Validation Plan
SVVPR Software Verification and Validation Plan Review
S/W Software
[TI] Top Level Specification
T-1 Digital Transmission link, 1.544 Mega-bits per second
TCP/IP Transmission Control Protocol/Internet Protocol
TCAP Transactions Capabilities Application Part
TCF Training Check Frame
TD Transmission Demonstration
TDM Time Division Multiplex
TDMA Time Division Multiple Access
TDMSI Time Division Multiplex Selector ID
TE Terminal Equipment
Telecom Telephonic Communications
TDM Time Division Multiplex
TDMA TDM Access
TID Terminal Identification
TIM Timing
TIM Technical Interchange Meeting
TIN Terminal Identification Number
TIS Terrestrial Interface Subsystem
TLCSC Top Level Computer Software Component
TLS Top Level Specification
TMI Telesat Mobile Incorporated
TMS Test and Monitor Station
TNI Terrestrial Network Interface
TPP Test Plan and Procedure
TT&C Telemetry, Tracking and Control
Tx Transmit
UCN Up CoNverter
UDS Unacknowledged Data Delivery Service
UIS User Interface Subsystem
UPC Uplink Power Control UTR Universal Tone Receiver
UW Unique Words
V&V Verification and Validation
VAC Value-Added Carrier
VAX Model Identification of a Digital Equipment Corporation system
VAX Virtual Address extension (proprietary name used by DEC for some of its computer systems)
VCN Virtual Circuit Number
VF Voice Frequency
VLR Visitor Location Register
VN Virtual Network
VPN Virtual Private Network
VUP VAX Unit of Processing
V.22bis Modem Standard for 24()0 Baud Service Over Telephone Lines
V.25 Procedure for setting up a data connection on the Public Switched Telephone Network
V.26, V.28 Electrical specification of interchange circuits at both the Data Terminal Equipment and Data Communications Equipment sides of the interface (similar to RS-232-C)
V.32 high speed serial link, physical layer definition
V.35 X.25 physical layer interface used to access wideband channels (at data rates up to 64 kbit/s)
wan wide area network
XCR x.25 configuration request
XICD external interface control document
XICWG external interface control working group
X.3 specification for facilities provided by the Packet assembler/disassembler
X.21 X.25 physical layer interface for data terminal equipment and data communications equipment using synchronous transmission facilities
X.21bis X.25 physical layer interface for data terminal Equipment designed for interfacing to synchronous V-series modems to access data networks
X.25 specification for interface between data terminal Equipment and data communications equipment for terminals operating in packet mode
X.28 specification for interaction between loval terminal and packet assembler/disassembler
X.29 specification for interaction between packet assembler/disassembler and remote packet mode terminal

What is claimed is:

1. A mobile satellite system having at least one satellite therein in operative communication with at least one mobile earth terminal (MET), comprising:

at least one network operations controller (NOC) managing and controlling the resources of the mobile satellite system including the at least one satellite;

at least one feederlink earth station (FES) managing communications links between the MET, at least one public switched telephone network (PSTN), and optionally at least one private network once a communication channel is established with the MET, and performing call management therefor;

at least one network control center (NCC), operatively connected to said FES and said NOC, said NCC managing real time allocation of communication channels between the MET and said FES in at least one circuit pool; and at least one network engineering/systems engineering (NE/SE) system operatively connected to said NOC, said NE/SE system performing the following processes:

comparing expected traffic loads for mobile satellite system including the at least one satellite with capability and availability of space and ground resources;

formulating tactical plans to maximize available resources of the at least one satellite;

producing frequency plans for different geographical regions;

configuring the mobile satellite system including resources and components generating configurations, the configurations designed to expand the mobile satellite system capacity for increases in traffic demand, while also supporting new features and services of the mobile satellite system; and configuring communication paths to external organizations operatively connected to the mobile satellite system.

2. A mobile satellite system according to claim 1, wherein communication between said NE/SE and said NOC is accomplished for at least one of the following messages:

event messages, configuration updates, restoral plan download file name messages, logs and statistics collection requests, and file transfer requests.

3. A mobile satellite system according to claim 2, wherein said NE/SE further comprises an NE/SE server, and wherein an event listener process is initiated by said NE/SE server at startup of said NE/SE and said NE/SE server listens for the event messages sent to said NE/SE by said NOC regarding events occurring in the mobile satellite system.

4. A mobile satellite system according to claim 1, wherein communication between said NE/SE and said NOC is accomplished for at least one of the following messages:

NOC configuration uploads,

NOC configuration downloads,

NOC logs and statistics, and restoral plan.

5. A mobile satellite system according to claim 1, wherein said NE/SE is operatively connected to, and further communicates with:

a Customer Management Information System; and a Gateway Switch.

6. A mobile satellite system according to claim 5, wherein said Gateway Switch (GWS) comprises a GWS Maintenance Administrative Position (MAP), and a GWS Traffic Data Collection system, and said NE/SE communicates with the GWS MAP, and the GWS Traffic Data Collection system.

7. A mobile satellite system according to claim 1, wherein said NE/SE configures the mobile satellite system including the at least one satellite, the resources and the components including at least one of the following:

Satellite Power Management,

Satellite power allocation graph,

Channel power allocation graph,

Control Group (CG) Configuration,

L-Band Frequency Allocation,

Beam geography graphical display,

Network Control Center (NCC),

Feederlink Earth Station (FES),

Radio Frequency Equipment (RFE),

Channel Unit Subsystem (CUS),

Test and Monitor Station (TMS),

Support Resources, and

Audit and Reconciliation.

8. A mobile satellite system according to claim 1, wherein said NE/SE configures the mobile satellite system including the at least one satellite, the resources and the components therein using configuration data, and said NE/SE verifies the configuration data against user defined configuration rules and deploys the configuration data to said NOC for distribution when verified, and said NE/SE maintains consistency between databases associated with said NOC and said NE/SE.

9. A mobile satellite system according to claim 1, wherein said NE/SE comprises a client-server architecture.

10. A mobile satellite system according to claim 1, further comprising a customer management information system (CMIS) operatively connected to said NE/SE, providing customers and service providers with assistance and information including at least one of problem resolution, and service changes, and wherein said NE/SE provides at least one of registration support to CMIS and consistency checks on the configuration data sent to said CMIS from said NE/SE.

11. A mobile satellite system according to claim 1, wherein said NE/SE initiates NOC database uploads.

12. A mobile satellite system according to claim 1, wherein said NE/SE partitions at least one of the at least one satellite, satellite beams of the at least one satellite, and control groups into resources including at least one of the circuit pools, virtual networks and frequency plans.

13. A mobile satellite system according to claim 1, wherein the at least one satellite includes a plurality of satellites in the mobile communication system that are communicable with at least one of each other, said NOC, said NCC, and said FES.

14. In a mobile satellite system having at least one satellite, a method of engineering the mobile satellite system, comprising the steps of:
 (a) comparing expected traffic loads with capability and availability of space and ground resources in the mobile satellite system including the at least one satellite;
 (b) formulating plans to maximize available resources of the at least one satellite;
 (c) producing frequency plans for one or more different geographical regions;
 (d) configuring the mobile satellite system including the at least one satellite, resources and components generating configurations; and
 (e) configuring communication paths to external organizations operatively connected to the mobile satellite system.

15. A method for engineering a mobile satellite system according to claim 14, further comprising the step of communicating between the NE/SE and the NOC for at least one of the following messages:
 event messages,
 configuration updates,
 restoral plan download file name messages,
 logs and statistics collection requests, and
 file transfer requests.

16. A method for engineering a mobile satellite system according to claim 14, wherein the NE/SE further comprises an NE/SE server, and wherein said method further comprising the step of initiating an event listener process by the NE/SE server at startup of the NE/SE, and listening by the NE/SE server for the event messages sent to the NE/SE by the NOC regarding events occurring in the mobile satellite system.

17. A method for engineering a mobile satellite system according to claim 14, further comprising the step of communicating between the NE/SE and the NOC for at least one of the following messages:
 NOC configuration uploads,
 NOC configuration downloads,
 NOC logs and statistic, and
 restoral plans.

18. A method for engineering a mobile satellite system according to claim 14, further comprising the step of communicating with:
 a Customer Management Information System; and
 a Gateway Switch.

19. A method for engineering a mobile satellite system according to claim 18, wherein the Gateway Switch (GWS) comprises a GWS Maintenance Administrative Position (MAP), and a GWS Traffic Data Collection system, and said method further comprising the step of communicating with the GWS MAP, and the GWS Traffic Data Collection system.

20. A method for engineering a mobile satellite system according to claim 14, wherein said configuring step (d) further comprises the step of configuring the mobile satellite system including the at least one satellite, the resources and the components including at least one of the following:
 Satellite Power Management,
 Satellite power allocation graph,
 Channel power allocation graph,
 Control Group (CG) Configuration,
 L-Band Frequency Allocation,
 Beam geography graphical display,
 Network Control Center (NCC),
 Feederlink Earth Station (FES),
 Radio Frequency Equipment (RFE),
 Channel Unit Subsystem (CUS),
 Test and Monitor Station (TMS),
 Support Resources, and
 Audit and Reconciliation.

21. A method for engineering a mobile satellite system according to claim 14, wherein said configuring step (d) further comprises the step of configuring the mobile satellite system including the at least one satellite, the resources and the components therein by creating and making available configuration data, verifying the configuration data against user defined configuration rules and deploying the configuration data to the NOC for distribution when verified, and maintaining consistency between databases associated with the NOC and the NE/SE.

22. A method for engineering a mobile satellite system according to claim 14, wherein the NE/SE comprises a client-server architecture for implementing said method.

23. A method for engineering a mobile satellite system according to claim 14, wherein the mobile satellite system further comprises a customer management information system (CMIS) operatively connected to the NE/SE, and said method further comprising the step of providing customers and service providers with assistance and information including at least one of problem resolution, service changes, registration support and consistency checks on the configuration data sent to the CMIS from the NE/SE.

24. A method for engineering a mobile satellite system according to claim 14, further comprising the step of initiating NOC database uploads from the NE/SE.

25. A method for engineering a mobile satellite system according to claim 14, further comprising the step of partitioning at least one of the at least one satellite, satellite beams of the at least one satellite, a nd control groups into resources including at least one of the circuit pools, virtual networks and frequency plans.

26. A method for engineering a mobile satellite system according to claim 14, wherein the at least one satellite includes a plurality of satellites in the mobile communication system that are communicable with at least one of each other, said NOC, said NCC, and said FES.

27. A method for engineering a mobile satellite system according to claim 26, wherein said comparing step (a) further comprises the step of comparing expected traffic loads with capability and availability of space and ground resources in the mobile satellite system including the plurality of satellites.

28. A method for engineering a mobile satellite system according to claim 26, wherein said formulating step (b) further comprises the step of formulating plans to maximize available resources of the plurality of satellites.

29. A method for engineering a mobile satellite system according to claim 26, wherein said configuring step (c) further comprises the step of configuring the mobile satellite system including the plurality of satellites, resources and components associated therewith.

30. In a mobile satellite system including at least one satellite, at least one network operations controller (NOC) managing and controlling the resources of the mobile satellite system and the at least one satellite, and at least one network engineering/systems engineering (NE/SE) system operatively connected to the NOC, said NE/SE system performing the following sequential or nonsequential processes: comparing expected traffic loads with capability and availability of resources in the mobile satellite system; formulating plans to utilize available resources of the at least one satellite; producing frequency plans for one or more different geographical regions; configuring the mobile satellite system including the at least one satellite and the resources; and configuring communication paths to external organizations operatively connected to the mobile satellite system.

31. A method for engineering a mobile satellite system according to claim 30, wherein the at least one satellite includes a plurality of satellites in the mobile communication system that are communicable with at least one of each other, said NOC, said NCC, and said FES.

32. A method for engineering a mobile satellite system according to claim 31, wherein said comparing step further comprises the step of comparing expected traffic loads with capability and availability of space and ground resources in the mobile satellite system including the plurality of satellites.

33. A method for engineering a mobile satellite system according to claim 31, wherein said formulating step further comprises the step of formulating plans to maximize available resources of the plurality of satellites.

34. A method for engineering a mobile satellite system according to claim 31, wherein said configuring the mobile satellite system step further comprises the step of configuring the mobile satellite system including the plurality of satellites and the resources associated therewith.

35. In a mobile satellite system including at least one satellite and at least one network engineering/systems engineering (NE/SE) system, said NE/SE system performing the following sequential or nonsequential processes of comparing expected traffic loads with the capability and availability of space and ground resources in the mobile satellite system; formulating tactical plans to maximize available resources of the at least one satellite, and producing frequency plans for different geographical regions; performing the processes of defining contingency for failure situations, including failure in the at least one satellite or ground-based equipment outage; configuring the mobile satellite system including logical resources and physical components; and configuring communication paths to external organizations operatively connected to the mobile satellite system.

* * * * *